United States Patent
Nam et al.

(10) Patent No.: US 12,062,377 B2
(45) Date of Patent: Aug. 13, 2024

(54) APPARATUS AND METHOD FOR PROCESSING AUDIO

(71) Applicant: SAMSUNG ELECTRONICS CO., LTD., Suwon-si (KR)

(72) Inventors: Woohyun Nam, Suwon-si (KR); Sangchul Ko, Suwon-si (KR); Kyungrae Kim, Suwon-si (KR); Jungkyu Kim, Suwon-si (KR); Yoonjae Son, Suwon-si (KR); Tammy Lee, Suwon-si (KR); Hyunkwon Chung, Suwon-si (KR); Sunghee Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 124 days.

(21) Appl. No.: 17/722,569

(22) Filed: Apr. 18, 2022

(65) Prior Publication Data
US 2022/0246158 A1    Aug. 4, 2022

Related U.S. Application Data

(63) Continuation of application No. PCT/KR2022/001496, filed on Jan. 27, 2022.

(30) Foreign Application Priority Data

Jan. 27, 2021    (KR) ..................... 10-2021-0011915
Oct. 18, 2021    (KR) ..................... 10-2021-0138834

(51) Int. Cl.
*G10L 19/008*    (2013.01)
*G06N 3/08*    (2023.01)
*H04S 3/00*    (2006.01)

(52) U.S. Cl.
CPC .............. *G10L 19/008* (2013.01); *G06N 3/08* (2013.01); *H04S 3/008* (2013.01); *H04S 2400/01* (2013.01)

(58) Field of Classification Search
CPC .......... G06N 3/045; G06N 3/048; G06N 3/08; G10L 19/00; G10L 19/008;
(Continued)

(56) References Cited

U.S. PATENT DOCUMENTS 7,831,434 B2    11/2010   Mehrotra et al.
9,621,990 B2    4/2017   Purnhagen et al.
(Continued)

FOREIGN PATENT DOCUMENTS

CN    108694955 A    10/2018
EP    3 506 259 A1    7/2019
(Continued)

OTHER PUBLICATIONS

Communication dated Apr. 28, 2022, issued by the International Searching Authority in counterpart International Application No. PCT/KR2022/001496 (PCT/ISA/220, 210, 237).
(Continued)

*Primary Examiner* — Lun-See Lao
(74) *Attorney, Agent, or Firm* — Sughrue Mion, PLLC

(57) ABSTRACT

An audio processing apparatus may obtain second audio signals corresponding to channels included in a second channel group from first audio signals corresponding to channels included in a first channel group, downsample at least one third audio signal corresponding to at least one channel identified based on a correlation with the second channel group from among the channels included in the first channel group, by using an artificial intelligence (AI) model, and generate a bitstream including the second audio signals corresponding to the channels included in the second chan-
(Continued)

nel group and the downsampled at least one third audio signal. The first channel group includes a channel group of an original audio signal, and the second channel group is constructed by combining at least two channels from among the channels included in the first channel group.

11 Claims, 27 Drawing Sheets

(58) Field of Classification Search
CPC ............ H04S 2400/01; H04S 2400/03; H04S 2420/11; H04S 3/008; H04S 7/00
USPC ........................................ 381/18–22; 700/94
See application file for complete search history.

(56) References Cited

U.S. PATENT DOCUMENTS

| | | | |
|---|---|---|---|
| 10,839,814 | B2 | 11/2020 | Atti et al. |
| 11,922,961 | B2* | 3/2024 | Ravelli ................... G10L 19/12 |
| 2007/0233293 | A1 | 10/2007 | Villemoes et al. |
| 2009/0015714 | A1* | 1/2009 | Hendrix ................... H04N 5/60 348/484 |
| 2009/0016700 | A1* | 1/2009 | Yahata ................. G11B 27/322 386/335 |
| 2010/0169103 | A1 | 7/2010 | Pulkki |
| 2012/0288124 | A1* | 11/2012 | Fejzo ...................... H04R 5/02 381/303 |
| 2013/0066639 | A1 | 3/2013 | Lee et al. |
| 2016/0099002 | A1 | 4/2016 | Kim et al. |
| 2016/0104496 | A1 | 4/2016 | Purnhagen et al. |
| 2018/0233154 | A1 | 8/2018 | Vaillancourt et al. |
| 2019/0108843 | A1* | 4/2019 | Atti ........................ G10L 19/008 |
| 2019/0156841 | A1 | 5/2019 | Fatus et al. |
| 2020/0045494 | A1 | 2/2020 | Liu et al. |
| 2021/0174814 | A1* | 6/2021 | Suyama .................. H04S 1/007 |
| 2021/0368264 | A1* | 11/2021 | Hansen .................... G01P 15/18 |
| 2023/0269387 | A1* | 8/2023 | Cricrì .................... G06N 3/0455 375/240.03 |

FOREIGN PATENT DOCUMENTS

| | | |
|---|---|---|
| EP | 3 405 951 B1 | 11/2019 |
| KR | 10-2006-0060927 A | 6/2006 |
| KR | 10-2007-0107615 A | 11/2007 |
| KR | 10-2008-0093994 A | 10/2008 |
| KR | 10-2008-0103094 A | 11/2008 |
| KR | 10-2009-0117897 A | 11/2009 |
| KR | 10-2013-0029253 A | 3/2013 |
| KR | 10-2017-0075805 A | 7/2017 |

OTHER PUBLICATIONS

Marston et al., "Cascaded audio coding," BBC R&D White Paper, WHP 118, Sep. 2005, Total 13 pages.
"EBU Evaluations of Multichannel Audio Codecs," EBU—TECH 3324, Sep. 2007, Total 88 pages.
Communication issued on Mar. 20, 2024 by the European Patent Office in counterpart European Application No. 22746255.3.

* cited by examiner

| | L | R | MC | Ls | Rs | Lb | Rb | HFL | HFR | HBL | HBR |
|---|---|---|---|---|---|---|---|---|---|---|---|
| L3 | w1 | | | w2 | | w3 | | | | | |
| R3 | | w1 | | | w2 | | w3 | | | | |
| C | | | w8 | | | | | | | | |
| HFL3 | | | | w4 | | w5 | | w6 | | w7 | |
| HFR3 | | | | | w4 | | w5 | | w6 | | w7 |

$L3 = w_1 \cdot L + w_2 \cdot Ls + w_3 \cdot Lb$
$R3 = w_1 \cdot R + w_2 \cdot Rs + w_3 \cdot Rb$
$C = w_8 \cdot C$
$HFL3 = w_4 \cdot Ls + w_5 \cdot Lb + w_6 \cdot HFL + w_7 \cdot HBL$
$HFR3 = w_4 \cdot Ls + w_5 \cdot Rb + w_6 \cdot HFR + w_7 \cdot HBR$ Where $0 \leq w1, w2 \ldots w7 \leq 1.0$

APPARATUS AND METHOD FOR PROCESSING AUDIO

CROSS-REFERENCE TO RELATED APPLICATION

This is a bypass continuation application of International Patent Application No. PCT/KR2022/001496 filed on Jan. 27, 2022, which claims priority from Korean Patent Application No. 10-2021-0011915 filed on Jan. 27, 2021, and Korean Patent Application No. 10-2021-0138834 filed on Oct. 18, 2021, in the Korean Intellectual Property Office, the disclosures of which are incorporated herein by reference in their entireties.

BACKGROUND

1. Field

The disclosure relates to an apparatus and method for processing audio. More particularly, the disclosure relates to an apparatus and method for encoding an audio signal or an apparatus and method for decoding an audio signal.

2. Description of the Related Art

With developments in technology, stereoscopic sound devices composed of a larger and clearer display and a plurality of speakers have become widely used. At the same time, research has been actively conducted on video coding technology for transmitting and receiving more vivid images and on audio coding technology for transmitting and receiving more realistic and immersive audio signals. For example, immersive audio signals may be encoded by a codec following a predetermined compression standard, e.g., an advanced audio coding (AAC) standard or an OPUS standard, and is then stored in a recording medium or is transmitted via a communication channel in the form of bitstreams. Stereoscopic sound devices may reproduce an immersive audio signal by decoding a bitstream generated according to a predetermined compression standard.

Audio content may be reproduced through various channel layouts according to an environment in which the audio content is consumed. For example, audio content may be reproduced through a 2 channel layout implemented through a sound output device such as a headphone, a 3.1 channel layout, or a 3.1.2 channel layout implemented with speakers mounted on a display device such as a TV, or a 5.1 channel layout, a 5.1.2 channel layout, a 7.1 channel layout, or a 7.1.4 channel layout implemented with a plurality of speakers arranged around a viewer.

In particular, with the expansion of an Over-The-Top (OTT) service, an increase in the resolution of TVs, and the enlargement of the screens of electronic devices such as tablets, the needs of viewers who want to experience immersive sound like in a theater are increasing. Accordingly, there is a need for audio processing apparatuses to support a three-dimensional (3D) channel layout in which a sound image is implemented based on a display screen.

SUMMARY

There is a need for an encoding and decoding method capable of increasing transmission efficiency while supporting conversion between various channel layouts. In particular, there is a need for an audio encoding and decoding method capable of accurately reproducing an original audio signal even when audio content of a predetermined channel layout is converted into another channel layout having a different sound image and output.

According to an embodiment of the disclosure, an audio processing apparatus may include: a memory storing one or more instructions; and a processor configured to execute the one or more instructions to: obtain, from first audio signals corresponding to first channels included in a first channel group of an original audio signal, second audio signals corresponding to second channels included in a second channel group, the second channels being obtained by combining at least two channels of the first channels included in the first channel group, downsample at least one third audio signal corresponding to at least one channel that is identified, from among the first channels included in the first channel group, based on a correlation between the at least one channel and the second channel group, by using an artificial intelligence (AI) model, and generate a bitstream including the second audio signals corresponding to the second channels included in the second channel group and the downsampled at least one third audio signal.

The processor may be further configured to identify the at least one channel of which the correlation with the second channel group is lower than a predetermined value, from among the first channels included in the first channel group.

The processor may be further configured to: allocate weight values to the first channels included in the first channel group, based on the correlation of each of the first channels included in the first channel group with the second channel group; obtain the second audio signals from the first audio signals by computing a weighted sum of at least two first audio signals from among the first audio signals, based on the weight values allocated to the first channels included in the first channel group; and identify the at least one channel from among the first channels included in the first channel group, based on the weight values allocated to the first channels included in the first channel group.

The processor may be further configured to: obtain an audio signal corresponding to one channel from among the second channels included in the second channel group, by summing audio signals corresponding to the at least two channels from among the first channels included in the first channel group, based on the weight values allocated to the at least two channels; and identify a channel having a maximum allocated weight value from among the at least two channels as a channel corresponding to a first subgroup of the first channel group, and identify a remaining channel from among the at least two channels as corresponding to a second subgroup of the first channel group.

The processor may be further configured to: extract a first audio sample group and a second audio sample group from the at least one third audio signal; obtain downsampling-related information with respect to the first audio sample group and the second audio sample group, by using the AI model; and downsample the at least one third audio signal by applying the downsampling-related information to the first audio sample group and the second audio sample group.

The AI model may be trained to obtain the downsampling-related information by minimizing an error between reconstructed audio signals reconstructed based on the second audio signals and the downsampled at least one third audio signal.

The processor may be further configured to: obtain audio signals of a base channel group and audio signals of a dependent channel group from the second audio signals corresponding to the second channels included in the second channel group; obtain a first compressed signal by compressing the audio signals of the base channel group; obtain a second compressed signal by compressing the audio signals of the dependent channel group; obtain a third compressed signal by compressing the downsampled at least one third audio signal; and generate the bitstream including the first compressed signal, the second compressed signal, and the third compressed signal.

The base channel group may include two channels for stereo reproduction, and the dependent channel group may include channels other than two channels having relatively high correlations with the two channels for stereo reproduction, from among the second channels included in the second channel group.

The first audio signals corresponding to the first channels included in the first channel group may include a listener-centered multichannel audio signal, and the second audio signals corresponding to the second channels included in the second channel group may include a listener front-centered multichannel audio signal.

The first channel group may include a 7.1.4 channel including a front left channel, a front right channel, a center channel, a left channel, a right channel, a back left channel, a back right channel, a subwoofer channel, a front left height channel, a front right height channel, a back left height channel, and a back right height channel the second channel group may include a 3.1.2 channel including a front left channel, a front right channel, a subwoofer channel, a front left height channel, and a front right height channel, and the processor may be further configured to identify, as the second channels of the second subgroup, the left channel, the right channel, the back left channel, the back right channel, the back left height channel, and the back right height channel having relatively low correlations with the second channel group, from among the first channels included in the first channel group.

According to another embodiment of the disclosure, an audio processing apparatus may include: a memory storing one or more instructions; and a processor configured to execute the one or more instructions to obtain first audio signals corresponding to first channels included in a first channel group and a downsampled second audio signal from a bitstream, obtain at least one second audio signal corresponding to at least one channel from among second channels included in a second channel group, by upsampling the downsampled second audio signal by using an artificial intelligence (AI) model, and reconstruct third audio signals corresponding to the second channels included in the second channel group from the first audio signals and the at least one second audio signal, wherein the first channel group may include a smaller number of channels than the second channel group.

The second channels included in the second channel group may be classified into channels of a first subgroup and channels of a second subgroup, based on a correlation of each of the second channels included in the second channel group with the first channel group, and the processor may be further configured to obtain second audio signals corresponding to the channels of the second subgroup.

The processor may be further configured to: obtain fourth audio signals corresponding to the channels of the first subgroup from the first audio signals and the second audio signals corresponding to the channels of the second subgroup, according to a transformation rule from the second channels included in the second channel group to the first channels included in the first channel group; refine the second audio signals and the fourth audio signals by using the AI model; and obtain the third audio signals from the refined second audio signals and the refined fourth audio signals.

The fourth audio signals may be refined through first neural network layers within the AI model, and the second audio signals are refined through second neural network layers within the AI model, the refined fourth audio signals may be obtained by inputting the first audio signals, the second audio signals, and the fourth audio signals to the first neural network layers, and the refined second audio signals may be obtained by inputting the first audio signals, the second audio signals, the refined fourth audio signals, and values output by the first neural network layers to the second neural network layers.

The processor may be further configured to: obtain audio signals corresponding to channels included in a base channel group and audio signals corresponding to channels included in a dependent channel group by decompressing the bitstream; and obtain the first audio signals, based on additional information obtained from the bitstream, the audio signals corresponding to the channels included in the base channel group, and the audio signals corresponding to the channels included in the dependent channel group.

The base channel group may include two channels for stereo reproduction, the dependent channel group may include channels other than two channels having relatively high correlations with the two channels for stereo reproduction, from among the first channels included in the first channel group, and the processor may be further configured to obtain mixed audio signals corresponding to the first channels included in the first channel group by mixing the audio signals corresponding to the channels included in the base channel group with the audio signals corresponding to the channels included in the dependent channel group, and obtain the first audio signals by rendering the mixed audio signals, based on the additional information.

The first audio signals corresponding to the first channels included in the first channel group may include a listener front-centered multichannel audio signal, and the third audio signals corresponding to the second channels included in the second channel group may include a listener-centered multichannel audio signal.

The first channel group may include a 3.1.2 channel including a front left channel, a front right channel, a subwoofer channel, a front left height channel, and a front right height channel, and the second channel group may be a 7.1.4 channel including a front left channel, a front right channel, a center channel, a left channel, a right channel, a back left channel, a back right channel, a subwoofer channel, a front left height channel, a front right height channel, a back left height channel, and a height back right height channel, and the channels of the second subgroup may include the left channel, the right channel, the back left channel, the back right channel, the upper back left height channel, and the upper back right height channel having relatively low correlations with the first channel group, from among the second channels included in the second channel group.

According to another embodiment of the disclosure, an audio processing method may include: performing audio format transformation on an original audio signal to convert the original audio signal into a converted audio signal by combining at least two channels of a plurality of channels included in the original audio signal; identifying at least one side channel signal and a plurality of base channel signals of the original audio signal, based on a correlation of each of the plurality of channels of the original audio signal with the audio format transformation; downsampling the at least one side channel signal, by using an artificial intelligence (AI) model; and generating a bitstream including the converted audio signal and the downsampled at least one side channel signal.

According to another embodiment of the disclosure, an audio processing method may include: obtaining first audio signals corresponding to first channels included in a first channel group and a downsampled second audio signal from a bitstream, obtaining at least one second audio signal corresponding to at least one channel from among second channels included in a second channel group, by upsampling the downsampled second audio signal by using an artificial intelligence (AI) model; and reconstructing third audio signals corresponding to the second channels included in the second channel group from the first audio signals and the at least one second audio signal, wherein the first channel group includes a smaller number of channels than the second channel group.

BRIEF DESCRIPTION OF THE DRAWINGS

The above and/or other aspects will be more apparent by describing certain example embodiments, with reference to the accompanying drawings, in which.

DETAILED DESCRIPTION

Figure 1A:
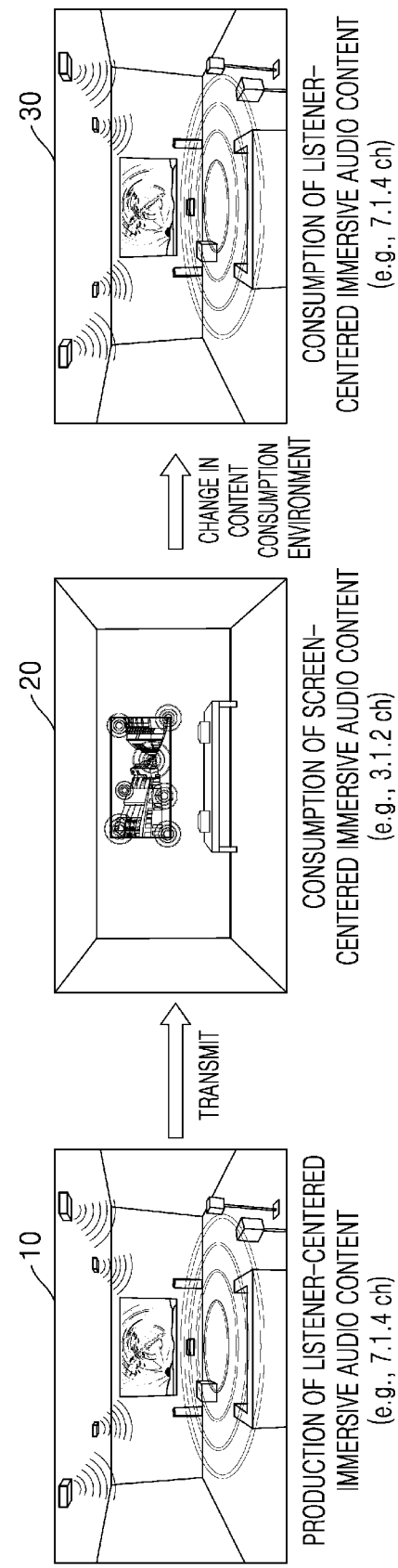
FIG. 1A illustrates an example of an audio processing system in which a sound image is transformed according to an audio content consumption environment, according to an embodiment of the disclosure.

Throughout the disclosure, the expression "at least one of a, b or c" indicates only a, only b, only c, both a and b, both a and c, both b and c, all of a, b, and c, or variations thereof.

Embodiments of the disclosure are described in detail herein with reference to the accompanying drawings so that this disclosure may be easily performed by one of ordinary skill in the art to which the disclosure pertain. The disclosure may, however, be embodied in many different forms and should not be construed as being limited to the examples set forth herein. In the drawings, parts irrelevant to the description are omitted for simplicity of explanation, and like numbers refer to like elements throughout.

Embodiments of the disclosure may be described in terms of functional block components and various processing steps. Some or all of these functional blocks may be implemented using various numbers of hardware and/or software configurations that perform specific functions. For example, the functional blocks of the disclosure may be implemented by one or more microprocessors, or by circuit configurations for a certain function. For example, the functional blocks of the disclosure may be implemented in various programming or scripting languages. The functional blocks may be implemented as algorithms executed in one or more processors. The disclosure may employ the conventional art for electronic configuration, signal processing, and/or data processing, for example.

In addition, connecting lines or connecting members between the components shown in the drawings only exemplify functional connections and/or physical or circuit connections. Connections between components may be represented by many alternative or additional functional relationships, physical connections or logical connections in a practical device.

In the disclosure, a 'deep neural network (DNN)' is a representative example of an artificial neural network model simulating a brain nerve, and is not limited to an artificial neural network model using a specific algorithm.

In the disclosure, a 'multichannel audio signal' may refer to an audio signal of n channels (where n is an integer greater than 2). A 'mono channel audio signal' or a 'stereo channel audio signal' distinguished from the 'multichannel audio signal' may be a one-dimensional (1D) audio signal or a two-dimensional (2D) audio signal, and the 'multichannel audio signal' may be a three-dimensional (3D) audio signal, but is not limited thereto, and may be a 2D audio signal.

In the disclosure, a 'channel layout', a 'speaker layout', or a 'speaker channel layout' may represent a combination of at least one channel, and may specify a spatial layout of speakers through which channels or audio signals are output. A channel used herein is a channel through which an audio signal is actually output, and thus may be referred to as a presentation channel.

For example, a predetermined channel layout may be specified as a "X.Y.Z channel layout". In the "X.Y.Z channel layout", X may be the number of surround channels, Y may be the number of subwoofer channels, and Z may be the number of height channels. The predetermined channel layout may specify a spatial location of a surround channel/subwoofer channel/height channel.

Examples of the 'channel layout' include a 1.0.0 channel (or a mono channel) layout, a 2.0.0 channel (or a stereo channel) layout, a 3.1.2 channel layout, a 3.1.4 channel layout, a 5.1.0 channel layout, a 5.1.2 channel layout, a 5.1.4 channel layout, a 7.1.0 layout, a 7.1.2 layout, and a 7.1.4 channel layout, but the 'channel layout' is not limited thereto, and there may be various other channel layouts.

The 'channel layout' may be referred to as a 'channel group', and channels constituting the 'channel layout' may be referred to as various names, but may be uniformly named for convenience of explanation. A plurality of channels constituting the 'channel layout' may be named based on respective spatial locations of the channels.

For example, a first surround channel of the 1.0.0 channel layout may be named as a mono channel. A first surround channel of the 2.0.0 channel layout may be named as an L2 channel, and a second surround channel of the 2.0.0 channel layout may be named as an R2 channel. "L" represents a channel located on the left side of a listener, and "R" represents a channel located on the right side of the listener. "2" represents that the number of surround channels is 2.

A first surround channel of the 3.1.2 channel layout may be named as an L3 channel, a second surround channel of the 3.1.2 channel layout may be named as an R3 channel, and a third surround channel of the 3.1.2 channel layout may be named as a C channel. A first subwoofer channel of the 3.1.2 channel layout may be named as an LFE channel. A first height channel of the 3.1.2 channel layout may be named as an Hfl3 channel (or a Tl channel), and a second height channel of the 3.1.2 channel layout may be named as an Hfr3 channel (or a Tr channel).

A first surround channel of the 5.1.0 channel layout may be named as an L5 channel, a second surround channel of the 5.1.0 channel layout may be named as an R5 channel, a third surround channel of the 5.1.0 channel layout may be named as a C channel, a fourth surround channel of the 5.1.0 channel layout may be named as an Ls5 channel, and a fifth surround channel of the 5.1.0 channel layout may be named as an Rs5 channel. "C" represents a channel located at the center of the listener. "s" refers to a channel located on the side of the listener. A first subwoofer channel of the 5.1.0 channel layout may be named as an LFE channel. LFE may refer to a low frequency effect. In other words, the LFE channel may be a channel for outputting a low frequency effect sound.

Respective surround channels of the 5.1.2 channel layout and the 5.1.4 channel layout may be named identically with the surround channels of the 5.1.0 channel layout. Similarly, respective subwoofer channels of the 5.1.2 channel layout and the 5.1.4 channel layout may be named identically with a subwoofer channel of the 5.1.0 channel layout.

A first height channel of the 5.1.2 channel layout may be named as an Hl5 channel. Here, H represents a height channel. A second height channel of the 5.1.2 channel layout may be named as a Hr5 channel.

A first height channel of the 5.1.4 channel layout may be named as an Hfl channel, a second height channel of the 5.1.4 channel layout may be named as an Hfr channel, a third height channel of the 5.1.4 channel layout may be named as an Hbl channel, and a fourth height channel of the 5.1.4 channel layout may be named as an Hbr channel. Here, f indicates a front channel on the basis of a listener, and b indicates a back channel on the basis of a listener.

A first surround channel of the 7.1.0 channel layout may be named as an L channel, a second surround channel of the 7.1.0 channel layout may be named as an R channel, a third surround channel of the 7.1.0 channel layout may be named as a C channel, a fourth surround channel of the 7.1.0 channel layout may be named as an Ls channel, a fifth surround channel of the 7.1.0 channel layout may be named as an Rs channel, a sixth surround channel of the 7.1.0 channel layout may be named as an Lb channel, and a seventh surround channel of the 7.1.0 channel layout may be named as an Rb channel.

Respective surround channels of the 7.1.2 channel layout and the 7.1.4 channel layout may be named identically with the surround channels of the 7.1.0 channel layout. Similarly, respective subwoofer channels of the 7.1.2 channel layout and the 7.1.4 channel layout may be named identically with a subwoofer channel of the 7.1.0 channel layout. A first height channel of the 7.1.2 channel layout may be named as an Hl7 channel, and a second height channel of the 7.1.20 channel layout may be named as a Hr7 channel.

A first height channel of the 7.1.4 channel layout may be named as an Hfl channel, a second height channel of the 7.1.4 channel layout may be named as an Hfr channel, a third height channel of the 7.1.4 channel layout may be named as an Hbl channel, and a fourth height channel of the 7.1.4 channel layout may be named as an Hbr channel.

Some channels may be named differently according to channel layouts, but may represent the same channel. For example, the Hl5 channel and the Hl7 channel may be the same channels. Likewise, the Hr5 channel and the Hr7 channel may be the same channels.

Channels are not limited to the above-described channel names, and various other channel names may be used. For example, the L2 channel may be named as an L" channel, the R2 channel may be named as an R" channel, the L3 channel may be named as an ML3 or L' channel, the R3 channel may be named as an MR3 or R' channel, the Hfl3 channel may be named as an MHL3 channel, the Hfr3 channel may be named as an MHR3 channel, the Ls5 channel may be named as an MSL5 or Ls' channel, the Rs5 channel may be named as an MSR5 channel, the Hl5 channel may be named as an MHL5 or Hl' channel, the Hr5 channel may be named as an MHRS or Hr' channel, and the C channel may be named as a MC channel.

As described above, at least one channel constituting the channel layout may be named as in Table 1.

TABLE 1

| channel layout | channel name |
| --- | --- |
| 1.0.0 | Mono |
| 2.0.0 | L2/R2 |
| 3.1.2 | L3/C/R3/Hfl3/Hfr3/LFE |
| 5.1.0 | L5/C/R5/Ls5/Rs5/LFE |
| 5.1.2 | L5/C/R5/Ls5/Rs5/Hl5/Hr5/LFE |
| 5.1.4 | L5/C/R5/Ls5/Rs5/Hfl/Hfr/Hbl/Hbr/LFE |
| 7.1.0 | L/C/R/Ls/Rs/Lb/Rb/LFE |
| 7.1.2 | L/C/R/Ls/Rs/Lb/Rb/Hl7/Hr7/LFE |
| 7.1.4 | L/C/R/Ls/Rs/Lb/Rb/Hfl/Hfr/Hbl/Hbr/LFE |

A 'transmission channel' is a channel for transmitting a compressed audio signal, and a portion of the 'transmission channel' may be the same as the 'presentation channel', but is not limited thereto, and another portion of the 'transmission channel' may be a channel of an audio signal in which audio signals of presentation channels are mixed. In other words, the 'transmission channel' may be a channel containing the audio signal of the 'presentation channel', but may be a channel of which a portion is the same as the presentation channel and the residual portion may be a mixed channel different from the presentation channel. The 'transmission channel' may be named to be distinguished from the 'presentation channel'. For example, when the transmission channel is an A/B channel, the A/B channel may contain audio signals corresponding to L2/R2 channels. When the transmission channel is a T/P/Q channel, the T/P/Q channel may contain audio signals corresponding to C/LFE/Hfl3,Hfr3 channels. When the transmission channel is an S/U/V channel, the S/U/V channel may contain audio signals corresponding to L,R/Ls,Rs/Hfl,Hfr channels. In the disclosure, a '3D audio signal' may refer to an audio signal enabling a listener to feel a sensation of height of sound around the listener to more deeply experience audio.

In the disclosure, a 'listener front-centered multichannel audio signal' may refer to an audio signal based on a channel layout in which a sound image is formed around the front (for example, a display device) of a listener. When the listener front-centered multichannel audio signal is arranged around the screen of the display device located in front of the listener, the listener front-centered multichannel audio signal may be referred to as a 'screen-centered audio signal' or a 'front-3D audio signal'.

In the disclosure, a 'listener-centered multichannel audio signal' may refer to an audio signal based on a channel layout in which a sound image is formed around a listener. Because the listener-centered multichannel audio signal is based on a channel layout in which channels are arranged omnidirectionally around the listener, the listener-centered multichannel audio signal may be referred to as a 'full-3D audio signal'.

In the disclosure a 'base channel group' may refer to a group including at least one 'base channel'. An audio signal of the 'base channel' may include an audio signal capable of composing a predetermined channel layout by being independently decoded without information about an audio signal of another channel (for example, a dependent channel). For example, an audio signal of a 'base channel group' may be a mono channel audio signal, or may include a left channel audio signal and a right channel audio signal that constitute a stereo audio signal.

In the disclosure, a 'dependent channel group' may refer to a group including at least one 'dependent channel'. An audio signal of the 'dependent channel' may include an audio signal that is mixed with the audio signal of the 'base channel' to constitute at least one channel of a predetermined channel layout.

When an encoding apparatus according to an embodiment of the disclosure encodes and outputs a multichannel audio signal of a predetermined channel layout, the encoding apparatus may obtain the audio signal of the base channel group and the audio signal of the dependent channel group by mixing the multichannel audio signal, and may compress and transmit the obtained audio signals. For example, when the base channel group includes a left channel and a right channel that constitute a stereo channel, the dependent channel group may include channels excluding the two left and right channels corresponding to the base channel group from among the channels included in the predetermined channel layout.

A decoding apparatus according to an embodiment of the disclosure may decode the audio signal of the base channel group and the audio signal of the dependent channel group from a received bitstream, and mix the audio signal of the base channel group and the audio signal of the dependent channel group to thereby reconstruct the multichannel audio signal of the predetermined channel layout.

In the disclosure, 'side channel information' is information used to reconstruct a larger number of audio signals of a first channel layout than audio signals of a second channel layout, and may refer to an audio signal regarding at least one side channel included in the first channel layout. For example, a side channel may include a channel of which a location correlation with the channels included in the second channel layout is relatively low, from among the channels included in the first channel layout. The disclosure is not limited to an example in which a side channel includes a channel of which a correlation with the channels included in the second channel layout is relatively low, from among the channels included in the first channel layout. For example, a channel satisfying a certain criterion from among the channels of the first channel layout may be the side channel, or a channel intended by a manufacturer of an audio signal may be the side channel.

Embodiments according to the technical spirit of the disclosure will be sequentially described in detail.

When a display device such as a TV reproduces immersive audio content, an audio codec for reproducing a sound image on the basis of the screen of the display device may be used. However, the display device may be used alone or used together with an additional speaker such as a sound bar, according to installation methods. For example, when a plurality of speakers for a home theater are further included in addition to the speakers mounted on the display device, a method is needed of restoring audio content having a sound image centered on the screen into audio content having a sound image centered on a listener.

FIG. 1A illustrates an example of an audio processing system in which a sound image is transformed according to an audio content consumption environment.

As shown in an image 10 of FIG. 1A, a content manufacturer may manufacture immersive audio content (for example, audio content of the 7.1.4 channel layout) having a listener-centered sound image. The manufactured audio content may be transformed into audio content having a screen-centered sound image and transmitted to a user. As shown in an image 20 of FIG. 1A, audio content (for example, audio content of the 3.1.2 channel layout) having a screen-centered sound image may be consumed through a display device such as a TV. As shown in an image 30 of FIG. 1A, in order for audio content to be consumed in an environment using an additional speaker in addition to the display device, audio content having a screen-centered sound image needs to be reconstructed to audio content having a listener-centered sound image (for example, audio content of the 7.1.4 channel layout).

In order for transmitted audio content to be transformed according to various channel layouts and output without sound quality degradation, a method of transmitting audio signals for all channel layouts included in the audio content may be used. However, this method has a problem in that transmission efficiency is low and backward compatibility with a legacy channel layout such as a mono channel or stereo channel is difficult.

Thus, an audio encoding apparatus according to an embodiment of the disclosure may divide a multichannel audio signal into audio signals of a base channel group and audio signals of a dependent channel group and encode and output the audio signals so that the multichannel audio signal is suitable for a channel layout having a screen-centered sound image and backward compatibility is possible.

Figure 1B:
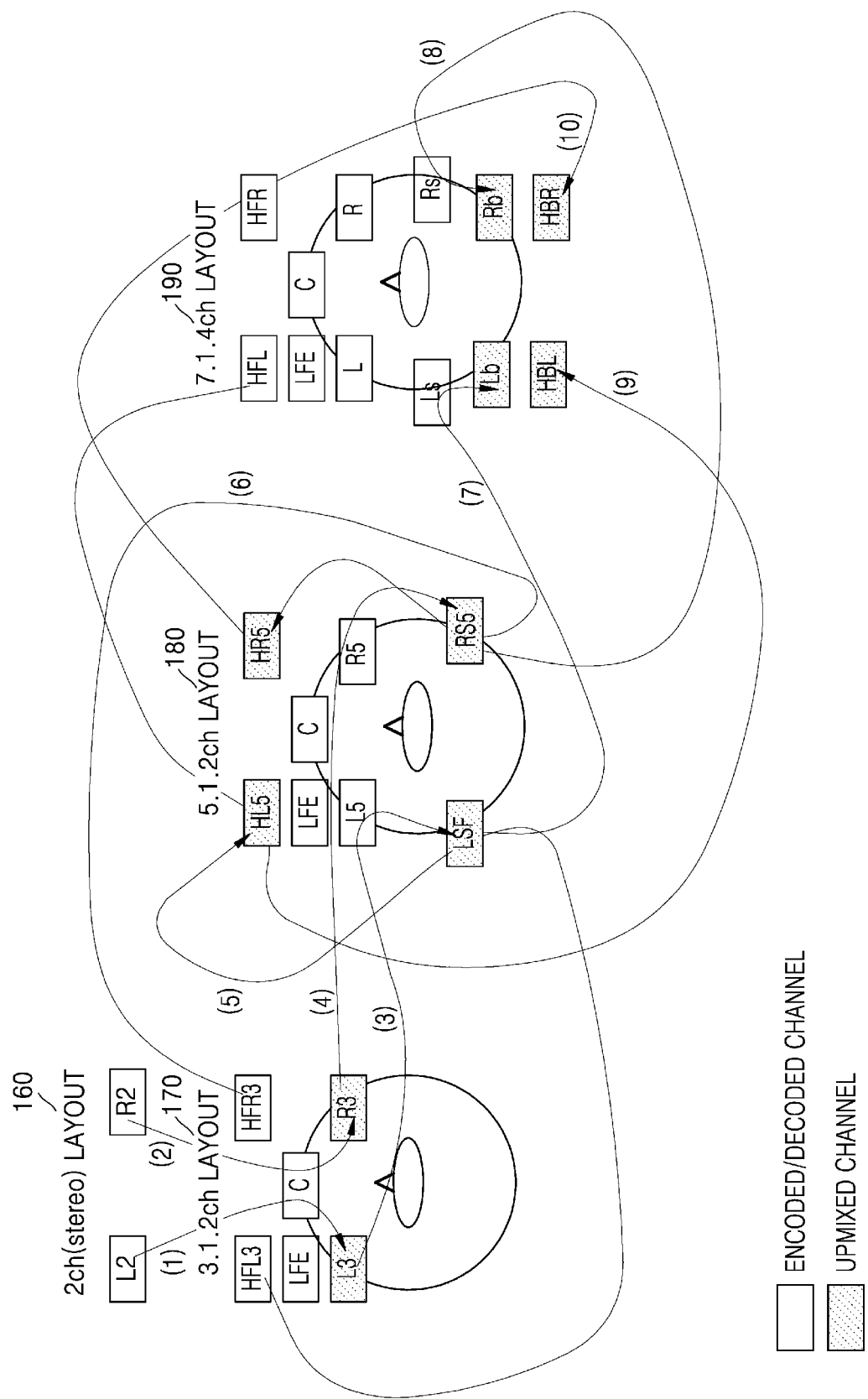
FIG. 1B illustrates a method, performed by an audio encoding apparatus and an audio decoding apparatus according to an embodiment of the disclosure, of processing the multichannel audio signal by dividing the multichannel audio signal into audio signals of a base channel group and audio signals of a dependent channel group.

FIG. 1B illustrates a method, performed by an audio encoding apparatus and an audio decoding apparatus according to an embodiment of the disclosure, of processing a multichannel audio signal by dividing the multichannel audio signal into the audio signals of the base channel group and the audio signals of the dependent channel group.

An audio encoding apparatus 200 according to an embodiment may transmit a compressed audio signal of the base channel group generated by compressing a stereo channel audio signal and a compressed audio signal of a first dependent channel group generated by compressing audio signals of some channels of the 3.1.2 channel layout, in order to transmit information about audio signals 170 of the 3.1.2 channel layout. The audio encoding apparatus 200 may generate the compressed audio signal of the base channel group by compressing an L2 channel audio signal and an R2 channel audio signal 160 of the stereo channel layout. For example, the L2 channel audio signal may be a signal of a left channel of a stereo audio signal, and the R2 channel audio signal may be a signal of a right channel of the stereo audio signal.

The audio encoding apparatus 200 may generate the a compressed audio signal of the first dependent channel group by compressing respective audio signals of the Hfl3 channel, the Hfr3 channel, the LFE channel, and the C channel from among the audio signals 170 of the 3.1.2 channel layout. The 3.1.2 channel layout may be a channel layout composed of six channels in which a sound image is formed around the front of the listener. In the 3.1.2 channel layout, the C channel may refer to a center channel, the LFE channel may refer to a subwoofer channel, the Hfl3 channel may refer to a left upper channel, and the Hfr3 channel may refer to a right upper channel.

The audio encoding apparatus 200 may transmit the compressed audio signal of the base channel group and the compressed audio signal of the first dependent channel group to an audio decoding apparatus 300 according to an embodiment.

The audio decoding apparatus 300 according to an embodiment may reconstruct the audio signals of the 3.1.2 channel layout from the compressed audio signal of the base channel group and the compressed audio signal of the first dependent channel group.

First, the audio decoding apparatus 300 may obtain the L2 channel audio signal and the R2 channel audio signal by decompressing the compressed audio signal of the base channel group. The audio decoding apparatus 300 may obtain the respective audio signals of the C, LFE, Hfl3, and Hfr3 channels by decompressing the compressed audio signal of the first dependent channel group.

As indicated by an arrow (1) in FIG. 1B, the audio decoding apparatus 300 may reconstruct an L3 channel audio signal of the 3.1.2 channel layout by mixing the L2 channel audio signal and the C channel audio signal. As indicated by an arrow (2) in FIG. 1B, the audio decoding apparatus 300 may reconstruct an R3 channel audio signal of the 3.1.2 channel layout by mixing the R2 channel audio signal and the C channel audio signal. In the 3.1.2 channel layout, the L3 channel may refer to a left channel, and the R3 channel may refer to a right channel.

The audio encoding apparatus 200 according to an embodiment may generate a compressed audio signal of a second dependent channel group by compressing audio signals of the L5 and R5 channels from among the audio signals 180 of the 5.1.2 channel layout, in addition to the compressed audio signal of the base channel group and the compressed audio signal of the first dependent channel group, in order to transmit information about the audio signals 180 of the 5.1.2 channel layout. The 5.1.2 channel layout may be a channel layout composed of eight channels in which a sound image is formed around the front of the listener. In the 5.1.2 channel layout, the L5 channel may refer to a front left channel, and the R5 channel may refer to a front right channel.

The audio encoding apparatus 200 may transmit the compressed audio signal of the base channel group, the compressed audio signal of the first dependent channel group, and the compressed audio signal of the second dependent channel group to the audio decoding apparatus 300.

The audio decoding apparatus 300 according to an embodiment may reconstruct the audio signals of the 5.1.2 channel layout from the compressed audio signal of the base channel group, the compressed audio signal of the first dependent channel group, and the compressed audio signal of the second dependent channel group.

First, the audio decoding apparatus 300 according to an embodiment may reconstruct the audio signals 170 of the 3.1.2 channel layout from the compressed audio signal of the base channel group and the compressed audio signal of the first dependent channel group.

Next, the audio decoding apparatus 300 may obtain the respective audio signals of the L5 and R5 channels by decompressing the compressed audio signal of the second dependent channel group.

As indicated by an arrow (3) in FIG. 1B, the audio decoding apparatus 300 may reconstruct an Ls5 channel audio signal of the 5.1.2 channel layout by mixing the L3 channel audio signal and the L5 channel audio signal. As indicated by an arrow (4) in FIG. 1B, the audio decoding apparatus 300 may reconstruct an Rs5 channel audio signal of the 5.1.2 channel layout by mixing the R3 channel audio signal and the R5 channel audio signal. In the 5.1.2 channel layout, the Ls5 channel may refer to a left channel, and the Rs5 channel may refer to a right channel. As indicated by an arrow (5) in FIG. 1B, the audio decoding apparatus 300 may reconstruct an Hl5 channel audio signal of the 5.1.2 channel layout by mixing the Hfl3 channel audio signal and the Ls5 channel audio signal. As indicated by an arrow (6) in FIG. 1B, the audio decoding apparatus 300 may reconstruct an Hr5 channel audio signal of the 5.1.2 channel layout by mixing the Hfr3 channel audio signal and the Rs5 channel audio signal. In the 5.1.2 channel layout, the Hl5 channel may refer to a front upper left channel, and the Hr5 channel may refer to a front upper right channel.

The audio encoding apparatus 200 according to an embodiment may generate a compressed audio signal of a third dependent channel group by compressing audio signals of an Hfl channel, an Hfr channel, an Ls channel, and an Rs channel from among audio signals 190 of the 7.1.4 channel layout, in addition to the compressed audio signal of the base channel group, the compressed audio signal of the first dependent channel group, and the compressed audio signal of the second dependent channel group, in order to transmit information about the audio signals 190 of the 7.1.4 channel layout. The 7.1.4 channel layout may be a channel layout composed of twelve channels in which a sound image is formed around the listener. In the 7.1.4 channel layout, the Hfl channel may refer to a front upper left channel, the Hfr channel may refer to a front upper right channel, the Ls channel may refer to a left channel, and the Rs channel may refer to a front right channel.

The audio encoding apparatus 200 may transmit the compressed audio signal of the base channel group, the compressed audio signal of the first dependent channel group, the compressed audio signal of the second dependent channel group, and the compressed audio signal of the third dependent channel group to the audio decoding apparatus 300.

The audio decoding apparatus 300 according to an embodiment may reconstruct the audio signals of the 7.1.4 channel layout from the compressed audio signal of the base channel group, the compressed audio signal of the first dependent channel group, the compressed audio signal of the second dependent channel group, and the compressed audio signal of the third dependent channel group.

First, the audio decoding apparatus 300 according to an embodiment may reconstruct the audio signals 180 of the 5.1.2 channel layout from the compressed audio signal of the base channel group, the compressed audio signal of the first dependent channel group, and the compressed audio signal of the second dependent channel group.

Next, the audio decoding apparatus 300 may obtain the respective audio signals of the Hfl channel, the Hfr channel, the Ls channel, and the Rs channel by decompressing the compressed audio signal of the third dependent channel group.

As indicated by an arrow (7) in FIG. 1B, the audio decoding apparatus 300 may reconstruct an Lb channel audio signal of the 7.1.4 channel layout by mixing the Ls5 channel audio signal and the Ls channel audio signal. As indicated by an arrow (8) in FIG. 1B, the audio decoding apparatus 300 may reconstruct an Rb channel audio signal of the 7.1.4 channel layout by mixing the Rs5 channel audio signal and the Rs channel audio signal. In the 7.1.4 channel layout, the Lb channel may refer to a back left channel, and the Rb channel may refer to a back right channel.

As indicated by an arrow (9) in FIG. 1B, the audio decoding apparatus 300 may reconstruct an Hbl channel audio signal of the 7.1.4 channel layout by mixing the Hfl channel audio signal and the Hbl channel audio signal. As indicated by an arrow (10) in FIG. 1B, the audio decoding apparatus 300 may reconstruct an Hbr channel audio signal of the 7.1.4 channel layout by mixing the Hfr channel audio signal and the Hr5 channel audio signal. In the 7.1.4 channel layout, the Hbl channel may refer to a back upper left channel, and the Hbr channel may refer to a back upper right channel.

As described above, the audio decoding apparatus 300 according to an embodiment may extend a reconstructed output multichannel audio signal from the stereo channel layout to the 3.1.2 channel layout, the 5.1.2 channel layout, or the 7.1.4 channel layout. However, embodiments of the disclosure are not limited to the example illustrated in FIG. 1B, and the audio signals processed by the audio encoding apparatus 200 and the audio decoding apparatus 300 may be implemented to be extendable to various channel layouts other than the stereo channel layout, the 3.1.2 channel layout, the 5.1.2 channel layout, and the 7.1.4 channel layout.

The audio encoding apparatus 200 according to an embodiment, which processes a multichannel audio signal so that the multichannel audio signal is suitable for a channel layout having a screen-centered sound image and is backward compatible, will now be described in detail.

Figure 2A:
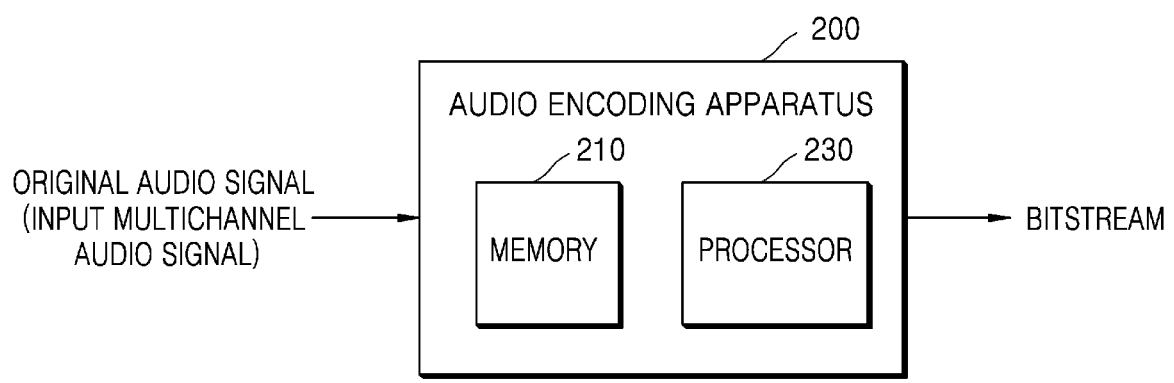
FIG. 2A is a block diagram of an audio encoding apparatus according to an embodiment of the disclosure.

FIG. 2A is a block diagram of a structure of the audio encoding apparatus 200 according to an embodiment of the disclosure.

The audio encoding apparatus 200 includes a memory 210 and a processor 230. The audio encoding apparatus 200 may be implemented as an apparatus capable of audio processing, such as a server, a TV, a camera, a mobile phone, a computer, a digital broadcasting terminal, a tablet PC, and a notebook computer.

Although the memory 210 and the processor 230 are separately illustrated in FIG. 2A, the memory 210 and the processor 230 may be implemented through one hardware module (for example, a chip).

The processor 230 may be implemented as a dedicated processor for neural network-based audio processing. Alternatively, the processor 230 may be implemented through a combination of a general-purpose processor, such as an application processor (AP), a central processing unit (CPU), or a graphics processing unit (GPU), and software. The dedicated processor may include a memory for implementing an embodiment of the disclosure or a memory processing unit for using an external memory.

The processor 230 may include a plurality of processors. In this case, the processor 230 may be implemented as a combination of dedicated processors, or may be implemented through a combination of software and a plurality of general-purpose processors such as an AP, a CPU, or a GPU.

The memory 210 may store one or more instructions for audio processing. According to an embodiment, the memory 210 may store a neural network. When the neural network is implemented in the form of an exclusive hardware chip for artificial intelligence (AI) or is implemented as a portion of an existing general-purpose processor (for example, a CPU or an AP) or a graphic-exclusive processor (for example, a GPU), the neural network may not be stored in the memory 210. The neural network may be implemented as an external apparatus (for example, a server). In this case, the audio encoding apparatus 200 may request neural network-based result information from the external apparatus and receive the neural network-based result information from the external apparatus.

The processor 230 may output a bitstream including a compressed audio signal by sequentially processing audio frames included in an original audio signal according to an instruction stored in the memory 210. The compressed audio signal may be an audio signal having the same number or a smaller number of channels as or than the number of channels of the original audio signal.

The bitstream may include a compressed audio signal of a base channel group and a compressed audio signal of at least one dependent channel group. The processor 230 may change the number of dependent channel groups included in the bitstream, according to the number of channels to be transmitted.

FIG. 2A is a block diagram of a structure of the audio encoding apparatus 200 according to an embodiment of the disclosure.

Figure 2B:
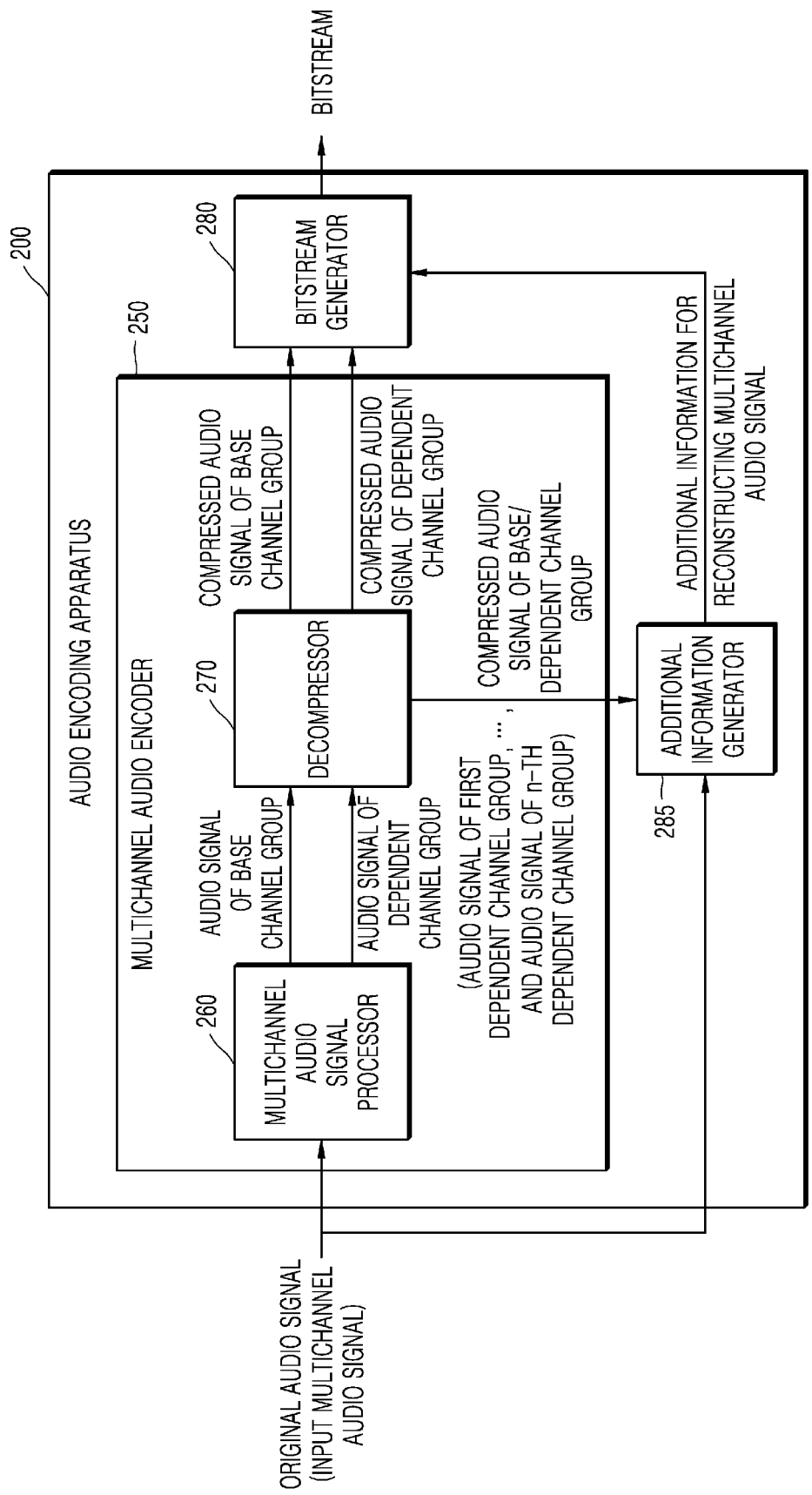
FIG. 2B is a detailed block diagram of an audio encoding apparatus according to an embodiment of the disclosure.

Referring to FIG. 2B, the audio encoding apparatus 200 may include a multichannel audio encoder 250, a bitstream generator 280, and an additional information generator 285.

The audio encoding apparatus 200 may include the memory 210 and the processor 230 of FIG. 2A, and an instruction for implementing the components 250, 260, 270, 280, and 285 of FIG. 2B may be stored in the memory 210 of FIG. 2A. The processor 230 may execute the instructions stored in the memory 210.

The multichannel audio encoder 250 of the audio encoding apparatus 200 according to an embodiment may obtain the compressed audio signal of the base channel group, the compressed audio signal of the at least one dependent channel group, and additional information by processing the original audio signal. The multichannel audio encoder 250 may include a multichannel audio signal processor 260 and a compressor 270.

The multichannel audio signal processor 260 may obtain at least one audio signal of the base channel group and at least one audio signal of the at least one dependent channel group from the original audio signal. For example, the audio signal of the base channel group may be a mono channel audio signal or an audio signal of a stereo channel layout. The audio signal of the at least one dependent channel group may include at least one audio signal among remaining channels excluding at least one channel corresponding to the base channel group, from among multichannel audio signals included in the original audio signal.

For example, when the original audio signal is the audio signals of the 7.1.4 channel layout, the multichannel audio signal processor 260 may obtain audio signals of the stereo channel layout as the audio signals of the base channel group from the audio signals of the 7.1.4 channel layout.

The multichannel audio signal processor 260 may obtain the audio signals of the first dependent channel group, which are used by a decoding stage to reconstruct the audio signals of the 3.1.2 channel layout. The multichannel audio signal processor 260 may determine, as the first dependent channel group, channels other than two channels corresponding to the channels of the base channel group from among the channels included in the 3.1.2 channel layout. The multichannel audio signal processor 260 may obtain the audio signals of the first dependent channel group from among the audio signals of the 3.1.2 channel layout.

The multichannel audio signal processor 260 may obtain the audio signals of the second dependent channel group, which are used by the decoding stage to reconstruct the audio signals of the 5.1.2 channel layout. The multichannel audio signal processor 260 may determine, as the second dependent channel group, channels other than six channels corresponding to the channels of the base channel group and the first dependent channel group from among the channels included in the 5.1.2 channel layout. The multichannel audio signal processor 260 may obtain the audio signals of the second dependent channel group from among the audio signals of the 5.1.2 channel layout.

The multichannel audio signal processor 260 may obtain the audio signals of the third dependent channel group, which are used by the decoding stage to reconstruct the audio signals of the 7.1.4 channel layout. The multichannel audio signal processor 260 may determine, as the third dependent channel group, channels other than eight channels corresponding to the channels of the base channel group, the first dependent channel group, and the third dependent channel group from among the channels included in the 7.1.4 channel layout. The multichannel audio signal processor 260 may obtain the audio signals of the third dependent channel group from among the audio signals of the 7.1.4 channel layout.

The audio signal of the base channel group may be a mono or stereo signal. Alternatively, the audio signal of the base channel group may include an audio signal of a first channel generated by mixing an audio signal L of a left stereo channel with C_1. Here, C_1 may be an audio signal of a center channel of the front of the listener. In the name ("X_Y") of an audio signal, "X" may represent the name of a channel, and "Y" may represent being decoded, being upmixed, a factor for error removal being applied (i.e., being scaled), or a gain being applied. For example, a decoded signal may be expressed as "X_1", and a signal generated by upmixing the decoded signal may be expressed as "X_2". Alternatively, a signal to which a gain is applied to the decoded signal may also be expressed as 'X_2'. A signal to which a factor for error removal is applied (i.e., scaled) to an upmixed signal may be expressed as "X_3".

The audio signal of the base channel group may include an audio signal of a second channel generated by mixing an audio signal R of a right stereo channel with C_1.

The compressor 270 may obtain the compressed audio signal of the base channel group by compressing the at least one audio signal of the base channel group, and may obtain the compressed audio signal of the at least one dependent channel group by compressing the audio signals of the at least one dependent channel group. The compressor 270 may compress the audio signals through processing such as frequency transformation, quantization, and entropy. For example, an audio signal compression method such as the AAC standard or the OPUS standard may be used.

The additional information generator 285 may generate additional information, based on at least one of the original audio signal, the compressed audio signal of the base channel group, or the compressed audio signal of the dependent channel group. The additional information may include various pieces of information used to reconstruct a multichannel audio signal in a decoding terminal.

For example, the additional information may include an audio object signal indicating at least one of an audio signal, a position, or a direction of an audio object (sound source). Alternatively, the additional information may include information about the total number of audio streams including a base channel audio stream and a dependent (or auxiliary) channel audio stream. The additional information may include downmix gain information. The additional information may include channel mapping table information. The additional information may include volume information. The additional information may include LFE gain information. The additional information may include dynamic range control (DRC) information. The additional information may include channel layout rendering information. The additional information may include information of the number of other coupled audio streams, information indicating a multichannel layout, information about whether a dialogue exists in an audio signal and a dialogue level, information indicating whether a low-frequency effect is output, information about whether an audio object exists on the screen, information about existence or absence of a continuous channel audio signal, and information about existence or absence of a discontinuous channel audio signal.

The additional information may include information about demixing including at least one demixing weight parameter of a demixing matrix for reconstructing a multichannel audio signal. Because demixing and (down)mixing correspond to each other, information about demixing may correspond to information about (down)mixing, and the information about demixing may include the information about (down)mixing. For example, the information about demixing may include at least one (down)mixing weight parameter of a (down)mixing matrix. A demixing weight parameter may be obtained based on the (down)mixing weight parameter.

The additional information may be various combinations of the aforementioned pieces of information. In other words, the additional information may include at least one of the aforementioned pieces of information.

When there is an audio signal of a dependent channel corresponding to at least one audio signal of the basic channel group, the additional information generator 285 may generate information indicating that the audio signal of the dependent channel exists.

The bitstream generator 280 may generate a bitstream including the compressed audio signal of the base channel group and the compressed audio signal of the dependent channel group. The bitstream generator 280 may generate a bitstream further including the additional information generated by the additional information generator 285.

For example, the bitstream generator 280 may generate a bitstream by performing encapsulation so that the compressed audio signal of the base channel group is included in a base channel audio stream and the compressed audio signal of the dependent channel group is included in a dependent channel audio stream. The bitstream generator 280 may generate a bitstream including a base channel audio stream and a plurality of dependent channel audio streams.

The channel layouts of the multichannel audio signal reconstructed from the bitstream by the audio decoding apparatus 300 according to an embodiment may follow the rule below.

For example, a first channel layout of the multichannel audio signal reconstructed from the compressed audio signal of the base channel group and the compressed audio signal of the first dependent channel group by the audio decoding apparatus 300 may include $S_{n-1}$ surround channels, $W_{n-1}$ subwoofer channels, and $H_{n-1}$ height channels. A second channel layout of the multichannel audio signal reconstructed from the compressed audio signal of the base channel group, the compressed audio signal of the first dependent channel group, and the compressed audio signal of the second dependent channel group by the audio decoding apparatus 300 may include $S_n$ surround channels, $W_n$ subwoofer channels, and $H_n$ height channels.

The second channel layout of the multichannel audio signal reconstructed by the audio decoding apparatus 300 by further considering the second dependent channel group in addition to the base channel group and the first dependent channel group may include more channels than the first channel layout of the multichannel audio signal reconstructed by the audio decoding apparatus 300 by considering the base channel group and the first dependent channel group. In other words, the first channel layout may be a lower channel layout of the second channel layout.

In detail, $S_{n-1}$ may be less than or equal to $S_n$, $W_{n-1}$ may be less than or equal to W, and $H_{n-1}$ may be less than or equal to $H_n$. A case where $S_{n-1}$ is equal to $S_n$, $W_{n-1}$ is equal to $W_n$, and $H_{n-1}$ is equal to $H_n$ is excluded. For example, when the first channel layout is the 5.1.2 channel layout, the second channel layout may be the 5.1.4 channel layout or the 7.1.2 channel layout.

In response to the bitstream generated and transmitted by the audio encoding apparatus 200, the audio decoding apparatus 300 may reconstruct the audio signal of the base channel group from the base channel audio stream, and may reconstruct multichannel audio signals of various channel layouts including more channels than the base channel group by further considering the dependent channel audio stream.

Figure 2C:
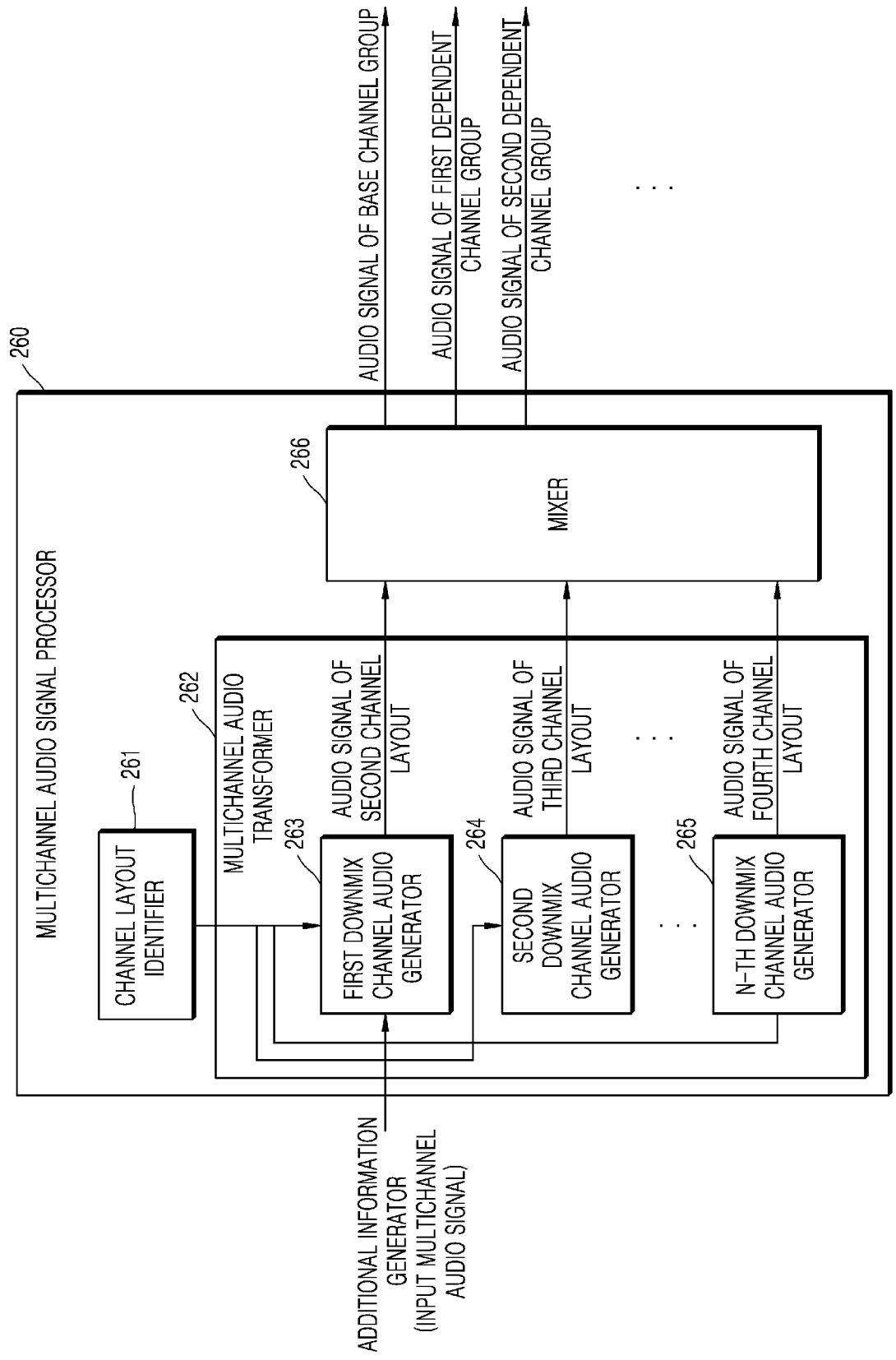
FIG. 2C is a block diagram of a multichannel audio signal processor included in an audio encoding apparatus, according to an embodiment of the disclosure.

FIG. 2C is a block diagram of a structure of the multichannel audio signal processor 260 of the audio encoding apparatus 200 according to an embodiment of the disclosure.

Referring to FIG. 2C, the multichannel audio signal processor 260 includes a channel layout identifier 261, a multichannel audio transformer 262, and a mixer 266.

The channel layout identifier 261 may identify at least one channel layout from the original audio signal. The at least one channel layout may include a plurality of hierarchical channel layouts.

First, the channel layout identifier 261 may identify the channel layout of the original audio signal and may identify a channel layout that is lower than the channel layout of the original audio signal. For example, when the original audio signal is the audio signal of the 7.1.4 channel layout, the channel layout identifier 261 may identify the 7.1.4 channel layout, and may identify the 5.1.2 channel layout, the 3.1.2 channel layout, and the 2 channel layout that are lower than the 7.1.4 channel layout.

The channel layout identifier 261 may identify, as a target channel layout, a channel layout of the audio signals included in the bitstream that is to be output by the audio encoding apparatus 200. The target channel layout may be the channel layout of the original audio signal, or a channel layout lower than the channel layout of the original audio signal. The channel layout identifier 261 may identify the target channel layout from pre-determined channel layouts.

Based on the identified target channel layout, the channel layout identifier 261 may determine a downmix channel audio generator corresponding to the identified target channel layout from among a first downmix channel audio generator 263, a second downmix channel audio generator 264, through to an N-th downmix channel audio generator 265. The multichannel audio transformer 262 may generate an audio signal of the target channel layout by using the determined downmix channel audio generator.

The first, second, and N-th downmix channel audio generators 263, 264, and 265 of the multichannel audio transformer 262 may generate an audio signal of a second channel layout, an audio signal of a third channel layout, or an audio signal of a fourth channel layout, respectively, from an original audio signal of a first channel layout, by using a downmixing matrix including a downmixing weight parameter.

FIG. 2C illustrates the multichannel audio transformer 262 including a plurality of downmix channel audio generators, namely, the first, second, and N-th downmix channel audio generators 263, 264, and 265, but embodiments of the disclosure are not limited thereto. The multichannel audio transformer 262 may transform the original audio signal into at least one other channel layout and may output the at least one other channel layout. For example, the multichannel audio transformer 262 may transform the original audio signal of the first channel layout into the audio signal of the second channel layout, which is a channel layout lower than the first channel layout, and the first channel layout and the second channel layout may include various multichannel layouts according to implementations.

The mixer 266 may obtain the audio signals of the base channel group and the audio signals of the dependent channel group by mixing the audio signals of which channel layouts have been transformed by the multichannel audio transformer 262, and may output the audio signals of the base channel group and the audio signals of the dependent channel group. Thus, according to audio reproduction environments of a decoding terminal, only the audio signals of the base channel group may be output, or the multichannel audio signal may be reconstructed and output based on the audio signals of the base channel group and the audio signals of the dependent channel group.

According to an embodiment, the 'base channel group' may refer to a group including at least one 'base channel'. An audio signal of the 'base channel' may include an audio signal capable of composing a predetermined channel layout by being independently decoded without information about an audio signal of another channel (for example, a dependent channel).

The 'dependent channel group' may refer to a group including at least one 'dependent channel'. An audio signal of the 'dependent channel' may include an audio signal that is mixed with the audio signal of the 'base channel' to constitute at least one channel of a predetermined channel layout.

The mixer 266 according to an embodiment may obtain the audio signal of the base channel by mixing audio signals of at least two channels of the transformed channel layout. The mixer 266 may obtain, as the audio signals of the dependent channel group, the audio signals of channels other than at least one channel corresponding to the base channel group from among the channels included in the transformed channel layout.

Figure 2D:
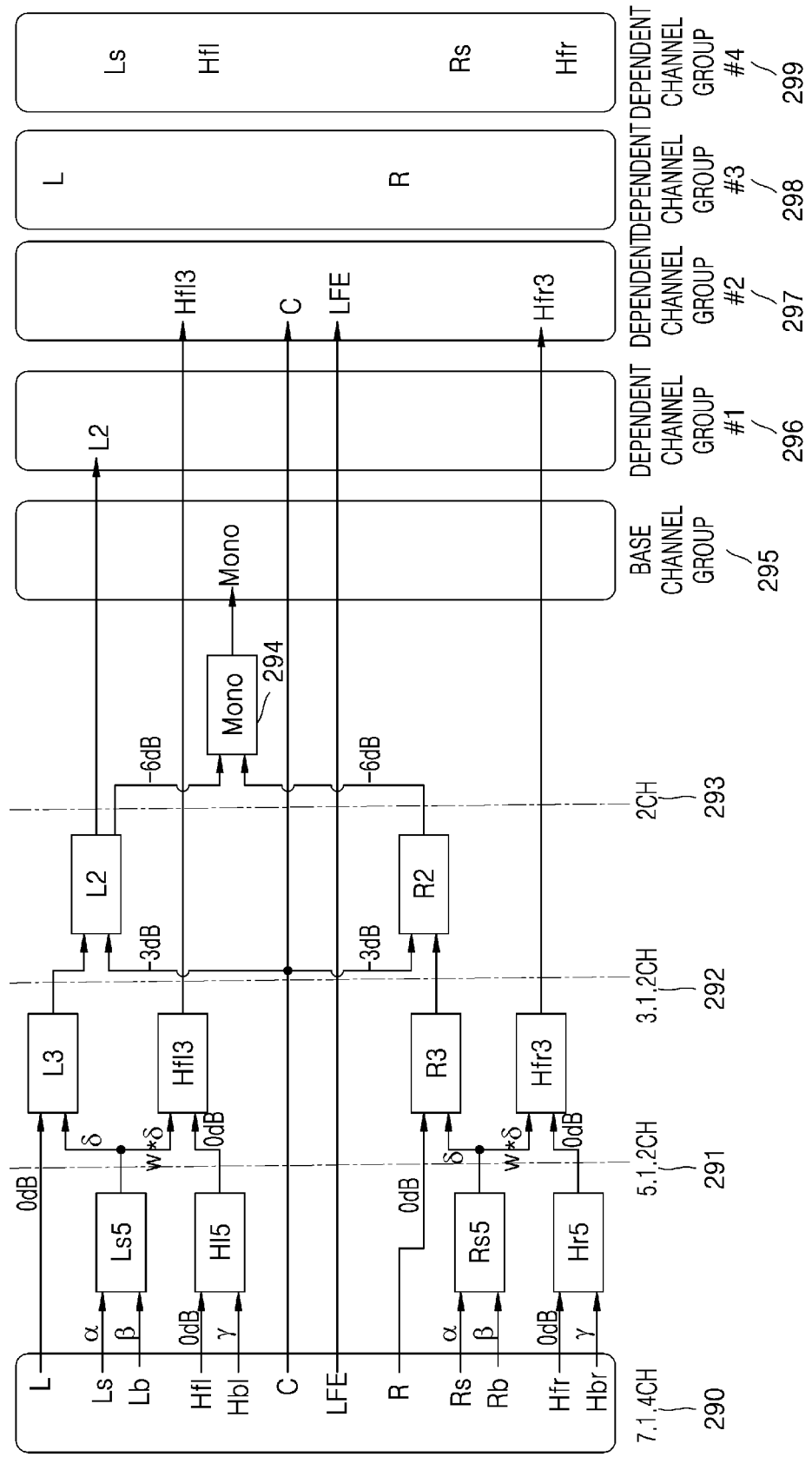
FIG. 2D is a view for explaining an operation of a multichannel audio signal processor according to an embodiment of the disclosure.

FIG. 2D is a view for explaining an operation of the multichannel audio signal processor 260 according to an embodiment of the disclosure.

Referring to FIG. 2D, the multichannel audio transformer 262 of FIG. 2C may obtain, from an original audio signal of a 7.1.4 channel layout 290, an audio signal of a 5.1.2 channel layout 291, an audio signal of a 3.1.2 channel layout 292, an audio signal of a 2 channel layout 293, and an audio signal of a mono channel layout 294, which are audio signals of lower channel layouts. Because the first, second, through to N-th downmix channel audio generators 263, 264, and 265 of the multichannel audio transformer 262 are connected to one another according to a cascade manner, the first, second, through to N-th downmix channel audio generators 263, 264, and 265 may sequentially obtain audio signals of channel layouts from a current channel layout to its directly lower channel layout.

FIG. 2D illustrates a case where the mixer 266 classifies the audio signal of the mono channel layout 294 into an audio signal of the base channel group 295 and outputs the same.

The mixer 266 according to an embodiment may classify an audio signal of the L2 channel included in the audio signal of the 2 channel layout 293 into an audio signal of a dependent channel group #1 296. As shown in FIG. 2D, the audio signal of the L2 channel and the audio signal of the R2 channel are mixed, and thus the audio signal of the mono channel layout 294 is generated. The audio decoding apparatus 300 may reconstruct the audio signal of the R2 channel by mixing the audio signal of the mono channel layout 294 (i.e., the audio signal of the base channel group 295) with the audio signal of the L2 channel of the dependent channel group #1. Accordingly, even when the audio encoding apparatus 200 transmits only the audio signal of the mono channel layout 294 and the audio signal of the L2 channel of the dependent channel group #1 296 without transmitting the audio signal of the R2 channel, the audio decoding apparatus 300 may reconstruct an audio signal with respect to the mono channel layout 294 or the stereo channel layout 293.

The mixer 266 according to an embodiment may classify audio signals of the Hfl3 channel, the C channel, the LFE channel, and the Hfr3 channel included in the audio signal of the 3.1.2 channel layout 292 into audio signals of a dependent channel group #2 297. As shown in FIG. 2D, the audio signal of the L3 channel and the audio signal of the C channel are mixed, and thus the audio signal of the L2 channel of the stereo channel layout 293 is generated. The audio signal of the R3 channel and the audio signal of the C channel are mixed, and thus the audio signal of the R2 channel of the stereo channel layout 293 is generated.

The audio decoding apparatus 300 may reconstruct the audio signal of the L3 channel of the 3.1.2 channel by mixing the audio signal of the L2 channel of the stereo channel layout 293 with the audio signal of the C channel of the dependent channel group #2 297. The audio decoding apparatus 300 may reconstruct the audio signal of the R3 channel of the 3.1.2 channel by mixing the audio signal of the L2 channel of the stereo channel layout 293 with the audio signal of the C channel of the dependent channel group #2 297. Accordingly, even when the audio encoding apparatus 200 transmits only the audio signal of the mono channel layout 294, the audio signal of the dependent channel group #1 296, and the audio signal of the dependent channel group #2 296 without transmitting the audio signals of the L2 channel and the R2 channel of the 3.1.2 channel, the audio decoding apparatus 300 may reconstruct an audio signal with respect to the mono channel layout 294, the stereo channel layout 293, or the 3.1.2 channel layout 292.

The mixer 266 according to an embodiment may transmit the audio signal of the L channel and the audio signal of the R channels, which are audio signals of some channels of the 5.1.2 channel layout 291, as an audio signal of a dependent channel group #3 298, in order to transmit the audio signal of the 5.1.2 channel layout 291. Even when the audio encoding apparatus 200 does not transmit all of the audio signals of the Ls5 channel, the Hl5 channel, the Rs5 channel, and the Hr5 channel of the 5.1.2 channel, the audio decoding apparatus 300 may reconstruct an audio signal to the 5.1.2 channel layout 291 via mixing of at least two of the audio signal of the mono channel layout 294, the audio signal of the dependent channel group #1 296, the audio signal of the dependent channel group #2 297, or the audio signal of the dependent channel group #3 298. The audio decoding apparatus 300 may reconstruct an audio signal to the mono channel layout 294, the stereo channel layout 293, the 3.1.2 channel layout 292, or the 5.1.2 channel layout 291, based on at least one of the audio signal of the mono channel layout 294, the audio signal of the dependent channel group #1 296, the audio signal of the dependent channel group #2 297, or the audio signal of the dependent channel group #3 298.

As shown FIG. 2D, when mixing of at least two of the audio signals, α, β, γ, δ, and w are used. Here, α, β, γ, and δ may indicate mixing weight parameters and may be variable. w may indicate a surround-to-height mixing weight and may be variable.

The audio encoding apparatus 200 according to an embodiment may preferentially determine channels arranged in front of the listener as dependent channels when determining audio signals of some channels of a predetermined multichannel layout as the audio signals of the dependent channel group. The audio encoding apparatus 200 may compress audio signals of the channels arranged in front of the listener without changes and transmit a result of the compression as the compressed audio signal of the dependent channel group, thereby improving the sound quality of an audio signal of an audio channel in front of the listener in a decoding terminal. Therefore, the listener may feel that the sound quality of the audio content reproduced through the display device is improved.

However, the disclosure is not limited to this embodiment, and channels that satisfy a predetermined criterion or channels set by a user from among the channels of a predetermined multichannel layout may be determined as the channels included in the dependent channel group. Channels determined to be included in the dependent channel group may be variously determined according to implementations.

FIG. 2D illustrates a case where the multichannel audio transformer 262 obtains, from the original audio signal of the 7.1.4 channel layout 290, all of the audio signal of the 5.1.2 channel layout 291, the audio signal of the 3.1.2 channel layout 292, the audio signal of the 2 channel layout 293, and the audio signal of the mono channel layout 294, which are the audio signals of lower channel layouts. However, embodiments of the disclosure are not limited to this case.

The multichannel audio transformer 262 may transform the original audio signal of the first channel layout into the audio signal of the second channel layout, which is a channel layout lower than the first channel layout, and the first channel layout and the second channel layout may include various multichannel layouts according to implementations. For example, the multichannel audio transformer 262 may transform the original audio signal of the 7.1.4 channel layout into the audio signal of the 3.1.2 channel layout.

The audio decoding apparatus 300 according to an embodiment that reconstructs an audio signal by processing the bitstream received from the audio encoding apparatus 200 will now be described in detail.

Figure 3A:
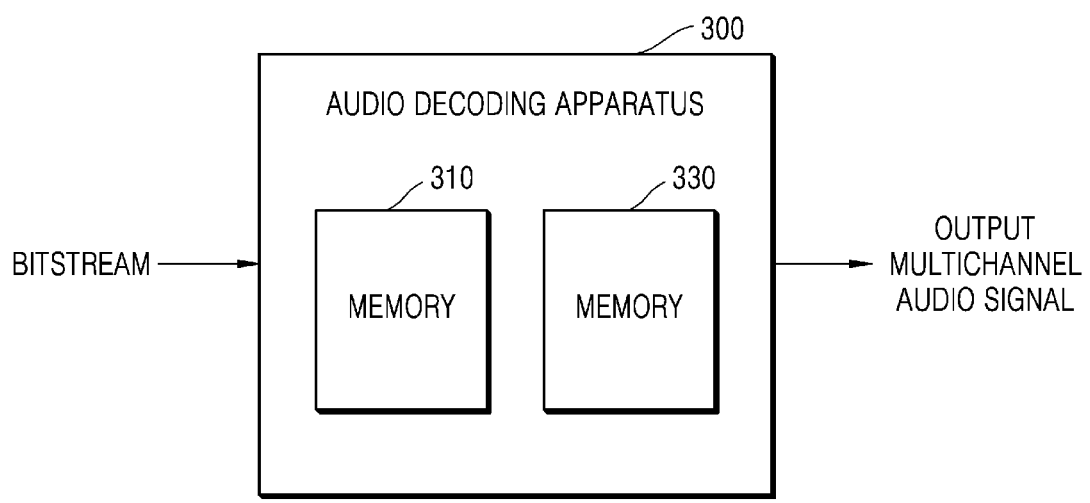
FIG. 3A is a block diagram of an audio decoding apparatus according to an embodiment of the disclosure.

FIG. 3A is a block diagram of a structure of a multichannel audio decoding apparatus according to an embodiment of the disclosure.

The audio decoding apparatus 300 includes a memory 310 and a processor 330. The audio decoding apparatus 300 may be implemented as an apparatus capable of audio processing, such as a server, a TV, a camera, a mobile phone, a computer, a digital broadcasting terminal, a tablet PC, and a notebook computer.

Although the memory 310 and the processor 330 are separately illustrated in FIG. 3A, the memory 310 and the processor 330 may be implemented through one hardware module (for example, a chip).

The processor 330 may be implemented as a dedicated processor for neural network-based audio processing. Alternatively, the processor 230 may be implemented through a combination of a general-purpose processor, such as an AP, a CPU, or a GPU, and software. The dedicated processor may include a memory for implementing an embodiment of the disclosure or a memory processing unit for using an external memory.

The processor 330 may include a plurality of processors. In this case, the processor 330 may be implemented as a combination of dedicated processors, or may be implemented through a combination of software and a plurality of general-purpose processors such as an AP, a CPU, or a GPU.

The memory 310 may store one or more instructions for audio processing. According to an embodiment, the memory 310 may store a neural network. When the neural network is implemented in the form of an exclusive hardware chip for AI or is implemented as a portion of an existing general-purpose processor (for example, a CPU or an AP) or a graphic-exclusive processor (for example, a GPU), the neural network may not be stored in the memory 310. The neural network may be implemented as an external apparatus (for example, a server). In this case, the audio decoding apparatus 300 may request neural network-based result information from the external apparatus and receive the neural network-based result information from the external apparatus.

The processor 330 sequentially processes successive frames according to an instruction stored in the memory 310 to obtain successive reconstructed frames. The successive frames may refer to frames that constitute audio.

The processor 330 may receive a bitstream, and may output a multichannel audio signal by performing an audio processing operation on the received bitstream. The bitstream may be implemented in a scalable form to increase the number of channels from the basic channel group.

The processor 330 may obtain the compressed audio signal of the base channel group from the bitstream, and may reconstruct the audio signal of the base channel group (for example, the mono channel audio signal or the stereo channel audio signal) by decompressing the compressed audio signal of the base channel group. Additionally, the processor 330 may reconstruct the audio signal of the at least one dependent channel group by decompressing the compressed audio signal of the at least one dependent channel group from the bitstream. The processor 330 may reconstruct a multichannel audio signal of an increased number of channels than the number of channels of the base channel group, based on the audio signal of the base channel group and the audio signal of the at least one dependent channel group.

The processor 330 according to an embodiment may reconstruct the audio signal of the first dependent channel group by decompressing the compressed audio signal of the first dependent channel group from the bitstream. The processor 330 may reconstruct the audio signal of the second dependent channel group by decompressing the compressed audio signal of the second dependent channel group from the bitstream. The processor 330 may reconstruct a multichannel audio signal of an increased number of channels than the number of channels of the base channel group, based on the audio signal of the base channel group and the respective audio signals of the first and second dependent channel groups.

The processor 330 according to an embodiment may decompress compressed audio signals of up to n dependent channel groups (where n is an integer greater than 2), and may reconstruct a multichannel audio signal of an increased number of channels, based on the audio signal of the base channel group and respective audio signals of the n dependent channel groups.

Figure 3B:
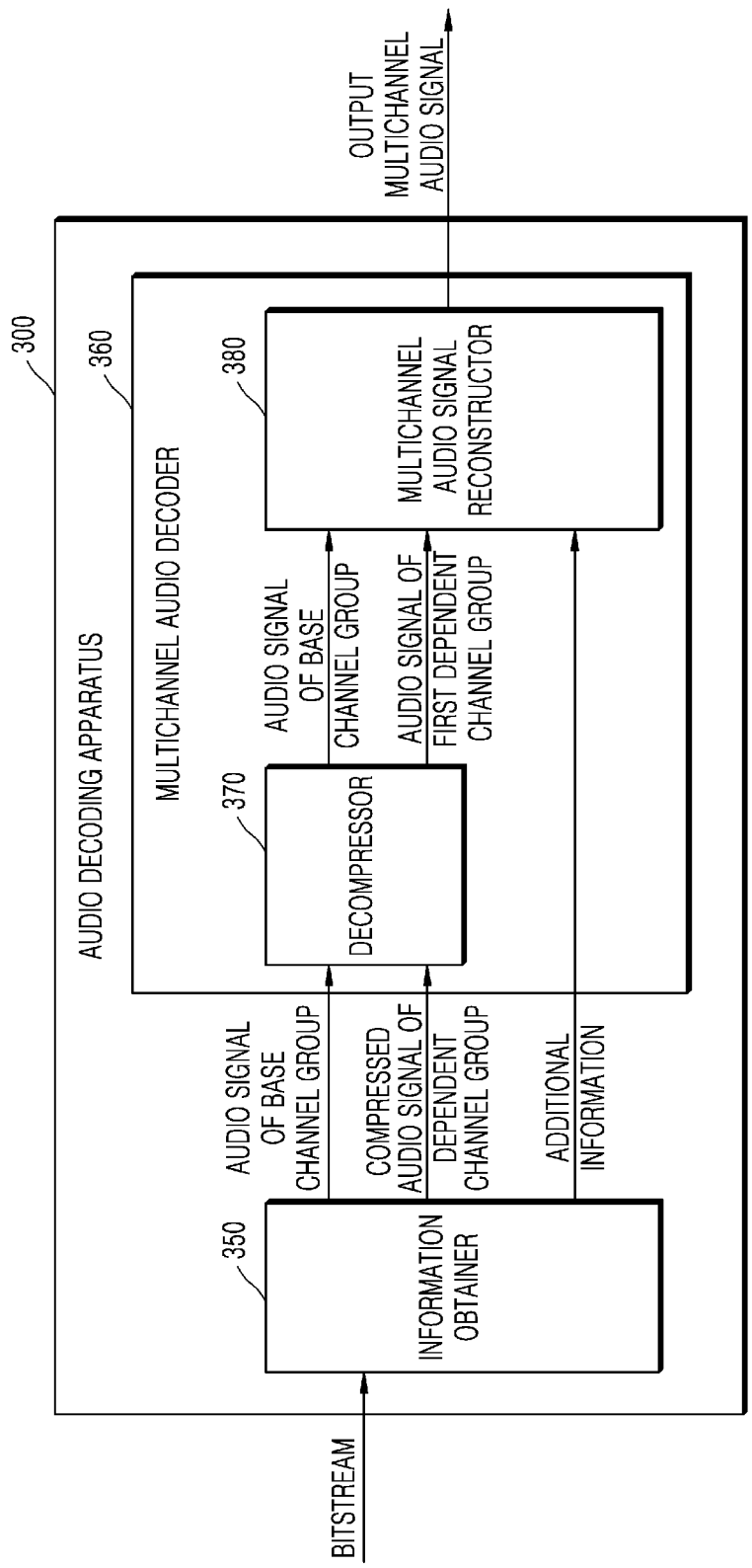
FIG. 3B is a detailed block diagram of an audio decoding apparatus according to an embodiment of the disclosure.

FIG. 3B is a block diagram of a structure of a multichannel audio decoding apparatus according to an embodiment of the disclosure.

Referring to FIG. 3B, the audio decoding apparatus 300 may include an information obtainer 350 and a multichannel audio decoder 360. The multichannel audio decoder 360 may include a decompressor 370 and a multichannel audio signal reconstructor 380.

The audio decoding apparatus 300 may include the memory 310 and the processor 330 of FIG. 3A, and an instruction for implementing the components 350, 360, 370, and 380 of FIG. 3B may be stored in the memory 310. The processor 330 may execute the instructions stored in the memory 310.

The information obtainer 350 of the audio decoding apparatus 300 according to an embodiment may obtain a base channel audio stream, a dependent channel audio stream, and metadata from the bitstream. The information obtainer 350 may obtain the base channel audio stream, the dependent channel audio stream, and the metadata encapsulated within the bitstream.

The information obtainer 350 may classify the base channel audio stream including the compressed audio signal of the base channel group from the bitstream. The information obtainer 350 may obtain the compressed audio signal of the base channel group from the base channel audio stream.

The information obtainer 350 may classify at least one dependent channel audio stream including the compressed audio signal of the dependent channel group from the bitstream. The information obtainer 350 may obtain the compressed audio signal of the dependent channel group from the dependent channel audio stream.

The information obtainer 350 may obtain additional information related to reconstruction of a multichannel audio from the metadata of the bitstream. The information obtainer 350 may classify the metadata including the additional information from the bitstream and may obtain the additional information from the classified metadata.

The multichannel audio decoder 360 of the audio decoding apparatus 300 according to an embodiment may reconstruct an output multichannel audio signal by decoding the compressed audio signals included in the bitstream. The multichannel audio decoder 360 may include the decompressor 370 and the multichannel audio signal reconstructor 380.

The decompressor 370 may obtain the at least one audio signal of the base channel group and the audio signals of the dependent channel group by performing decompression processes, such as entropy decoding, inverse-quantization, and frequency inverse-transformation, on the compressed audio signal of the base channel group and the compressed audio signal of the dependent channel group. For example, an audio signal reconstruction method corresponding to an audio signal compression method such as the AAC standard or the OPUS standard may be used.

The decompressor 370 may reconstruct at least one audio signal of the base channel group by decompressing at least one compressed audio signal of the base channel group. The decompressor 370 may reconstruct at least one audio signal of the at least one dependent channel group by decompressing the compressed audio signal of the at least one dependent channel group.

The decompressor 370 may include first through to N-th decompressors for decoding a compressed audio signal of each of a plurality of channel group (n channel groups). The first through to N-th decompressors may operate in parallel with each other.

The multichannel audio signal reconstructor 380 according to an embodiment may reconstruct the output multichannel audio signal, based on the at least one audio signal of the base channel group, the at least one audio signal of the at least one dependent channel group, and the additional information.

For example, when the audio signal of the base channel group is an audio signal of a stereo channel, the multichannel audio signal reconstructor 380 may reconstruct a listener front-centered multichannel audio signal, based on the audio signal of the base channel group and the audio signal of the first dependent channel group. For example, the reconstructed listener front-centered multichannel audio signal may be an audio signal of the 3.1.2 channel layout.

Alternatively, the multichannel audio signal reconstructor 380 may reconstruct a listener-centered multichannel audio signal, based on the audio signal of the base channel group, the audio signal of the first dependent channel group, and the audio signal of the second dependent channel group. For example, the listener-centered multichannel audio signal may be an audio signal of the 5.1.2 channel layout or the 7.1.4 channel layout.

The multichannel audio signal reconstructor 380 may reconstruct a multichannel audio signal, based on not only the audio signal of the base channel group and the audio signal of the dependent channel group but also the additional information. The additional information may be additional information for reconstructing the multichannel audio signal. The multichannel audio signal reconstructor 380 may output the reconstructed multichannel audio signal.

Figure 3C:
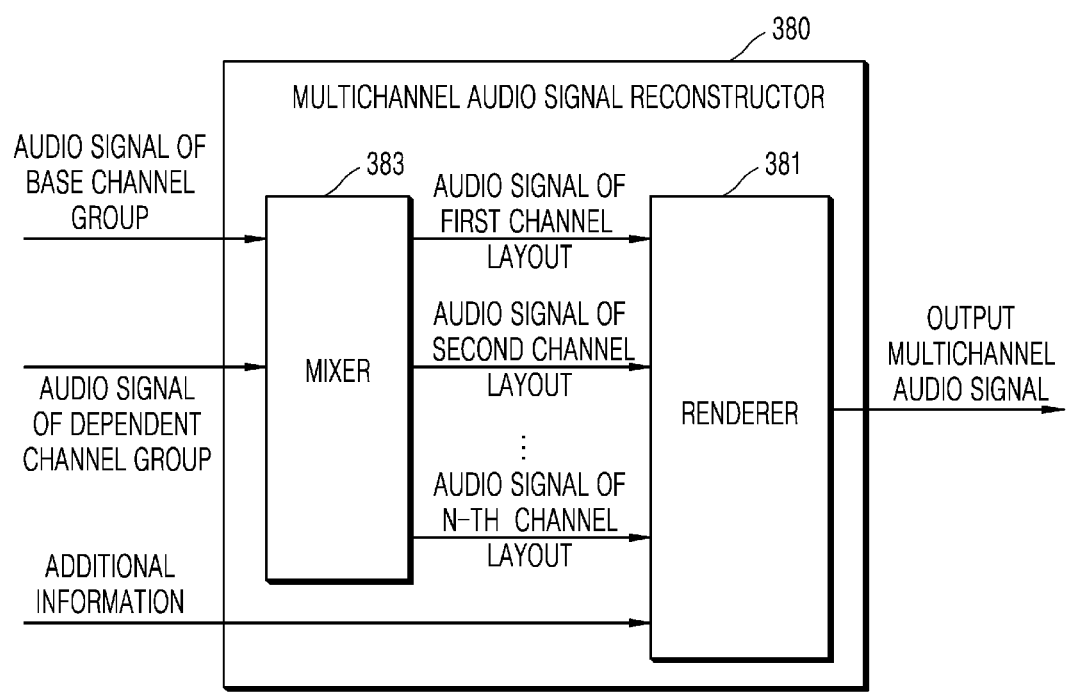
FIG. 3C is a block diagram of a multichannel audio signal reconstructor included in an audio decoding apparatus, according to an embodiment of the disclosure.

FIG. 3C is a block diagram of a structure of the multichannel audio signal reconstructor 380 according to an embodiment of the disclosure.

Referring to FIG. 3C, the multichannel audio signal reconstructor 380 may include a mixer 383 and a renderer 381.

The mixer 383 of the multichannel audio signal reconstructor 380 may obtain a mixed audio signal of the predetermined channel layout by mixing the at least one audio signal of the base channel group with the audio signal of the at least one dependent channel group. The mixer 383 may obtain a weight sum of the at least one audio signal of the base channel and the audio signal of the at least one dependent channel as the audio signal of the at least one channel of the predetermined channel layout.

The mixer 383 may generate the audio signal of the predetermined channel layout, based on the audio signal of the base channel group and the audio signal of the dependent channel group. The audio signal of the predetermined channel layout may be a multichannel audio signal. The mixer 383 may generate the multichannel audio signal by further considering the additional information (for example, information about a dynamic demixing weight parameter).

The mixer 383 may generate the audio signal of the predetermined channel layout by mixing the at least one audio signal of the base channel group and the at least one audio signal of the dependent channel group. For example, the mixer 383 may generate the audio signals of the L3 channel and the R3 channel of the 3.1.2 channel layout by mixing the audio signals of the L2 channel and the R2 channel included in the base channel group with the audio signal of the C channel included in the dependent channel group.

The mixer 383 may bypass the above-described mixing operation with respect to some of the audio signals of the dependent channel group. For example, the mixer 383 may obtain the audio signals of the C channel, the LFE channel, the Hfl3 channel, and the Hfr3 channel of the 3.1.2 channel layout without performing a mixing operation with the at least one audio signal of the base channel group.

The mixer 383 may generate the multichannel audio signal of the predetermined channel layout from the audio signal of the dependent channel not subjected to mixing and the audio signal of at least one channel obtained through mixing between the audio signal of the base channel and the audio signal of the dependent channel. For example, the mixer 383 may obtain the audio signals of the 3.1.2 channel layout from the audio signals of the L3 channel and the R3 channel obtained through mixing and the audio signals of the C channel, the LFE channel, the Hfl3 channel, and the Hfr3 channel included in the dependent channel group.

The renderer 381 may render and output the multichannel audio signal obtained by the mixer 383. The renderer 381 may include a volume controller and a limiter.

For example, the renderer 381 may control the volume of the audio signal of each channel to a target volume (for example, −24LKFS), based on volume information signalled through the bitstream. The renderer 381 may limit (for example, limit to −1dBTP) a true peak level of the audio signal after the volume control.

Figure 3D:
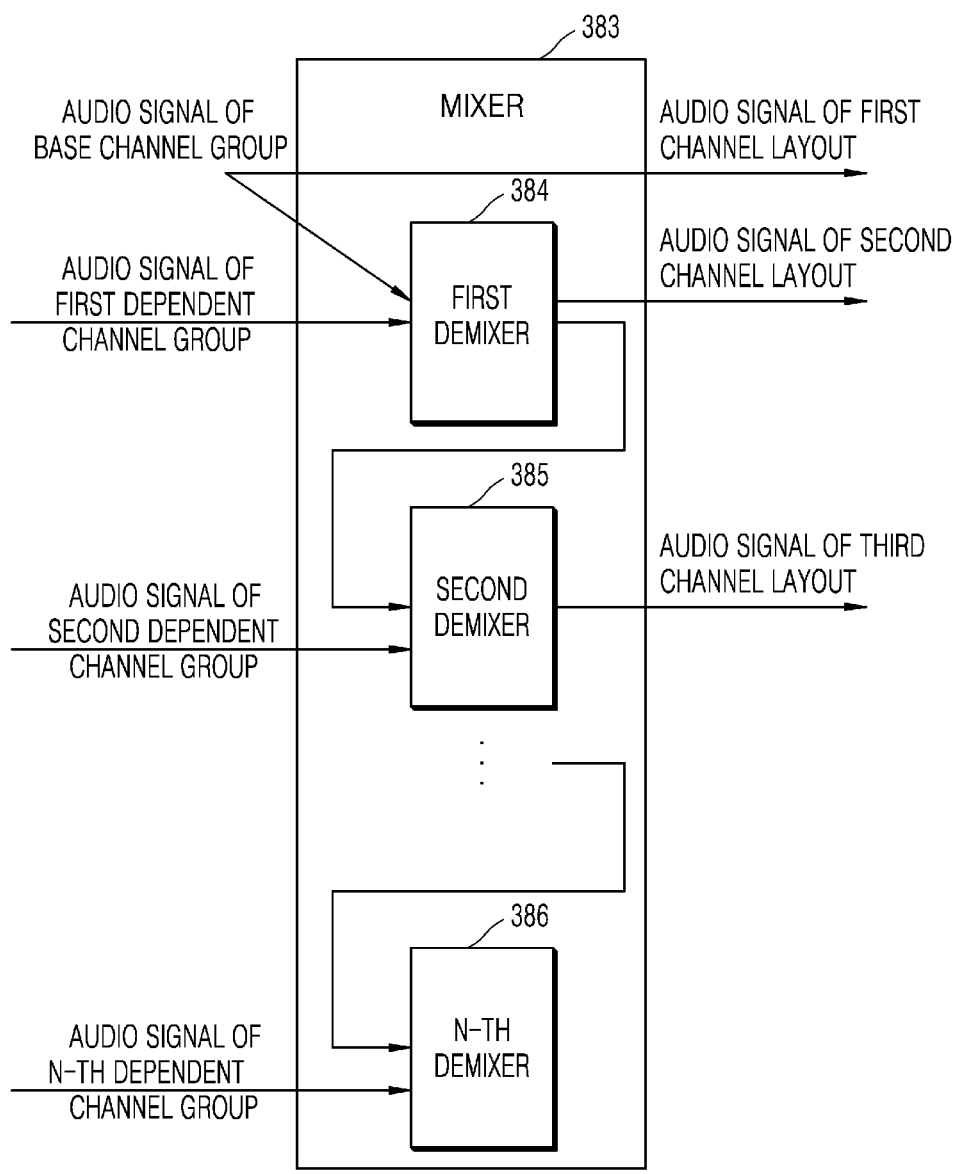
FIG. 3D is a block diagram for explaining an operation of a mixer of a multichannel audio signal reconstructor, according to an embodiment of the disclosure.

FIG. 3D is a block diagram for explaining an operation of the mixer 383 of the multichannel audio signal reconstructor 380 according to an embodiment of the disclosure.

The mixer 383 may obtain the audio signal of the predetermined channel layout by mixing the at least one audio signal of the base channel group with the audio signal of the at least one dependent channel group. The mixer 383 may obtain a weight sum of at least one audio signal of a base channel and at least one audio signal of a dependent channel as the audio signal of the at least one channel of the predetermined channel layout.

Referring to FIG. 3D, the mixer 383 may include a first demixer 384, a second demixer 385, through to an N-th demixer 386.

The mixer 383 may obtain the at least one audio signal of the base channel group as the audio signal of the first channel layout. The mixer 383 may bypass a mixing operation on the at least one audio signal of the base channel group.

The first demixer 384 may obtain the audio signal of the second channel layout from the at least one audio signal of the base channel group and the audio signal of the first dependent channel group. The first demixer 384 may obtain the audio signal of a channel included in the second channel layout by mixing at least one base channel audio signal and at least one first dependent channel audio signal.

For example, the second channel layout may be the 3.1.2 channel layout, the base channel group may include the L2 channel and the R2 channel constituting the stereo channel, and the first dependent channel group may include the Hfl3 channel, the Hfr3 channel, the LFE channel, and the C channel. In this case, the first demixer 384 may obtain a weight sum of the audio signal of the L2 channel included in the base channel group and the audio signal of the C channel included in the dependent channel group as the L3 channel audio signal of the 3.1.2 channel layout. The first demixer 384 may obtain a weight sum of the audio signal of the R2 channel included in the base channel group and the audio signal of the C channel included in the dependent channel group as the R3 channel audio signal of the 3.1.2 channel layout. The first demixer 384 may obtain the audio signal of the 3.1.2 channel layout from the audio signals of the Hfl3 channel, the Hfr3 channel, the LFE channel, and the C channels of the dependent channel group and the mixed L3 channel and R3 channel audio signals.

The second demixer 385 may obtain the audio signal of the third channel layout from the at least one audio signal of the base channel group, the audio signal of the first dependent channel group, and the audio signal of the second dependent channel group. The second demixer 385 may obtain the audio signal of a channel included in the third channel layout by mixing at least one of the audio signals of the second channel layout obtained by the first demixer 384 with at least one of the audio signals of the second dependent channel group.

For example, the third channel layout may be the 5.1.2 channel layout, and the second dependent channel group may include the L channel and the R channel. In this case, the second demixer 385 may obtain the audio signal of the Ls5 channel of the 5.1.2 channel layout by mixing the audio signal of the L3 channel included in the 3.1.2 channel layout with the audio signal of the L channel included in the dependent channel group. The second demixer 385 may obtain the audio signal of the Rs5 channel of the 5.1.2 channel layout by mixing the audio signal of the R3 channel included in the 3.1.2 channel layout with the audio signal of the R channel included in the dependent channel group. The second demixer 385 may obtain the audio signal of the Hl5 channel of the 5.1.2 channel layout by mixing the audio signal of the Hfl3 channel included in the 3.1.2 channel layout with a newly obtained audio signal of the Ls5 channel. The second demixer 385 may obtain the audio signal of the Hr5 channel of the 5.1.2 channel layout by mixing the audio signal of the Hfr3 channel included in the 3.1.2 channel layout with a newly obtained audio signal of the Rs5 channel.

The second demixer 385 may obtain the audio signal of the 5.1.2 channel layout from the audio signals of the LFE channel and the C channel of the first dependent channel group, the audio signals of the L channel and the R channel of the second dependent channel group, and the audio signals of the mixed Ls5 channel, the mixed Rs5 channel, the mixed Hl5 channel, and the mixed Hr5 channel.

FIG. 3D illustrates a case where the mixer 383 obtains all of the audio signal of the first channel layout, the audio signal of the second channel layout, and the audio signal of the third channel layout through a plurality of demixers, namely, the first and second demixers 384 and 385. However, embodiments of the disclosure are not limited thereto.

The mixer 383 may obtain the audio signal of the predetermined channel layout by mixing the at least one audio signal of the base channel group with the audio signal of the at least one dependent channel group. The predetermined channel layout of the audio signal obtained by the mixer 383 may include various multichannel layouts according to implementations.

As described above, the audio decoding apparatus 300 according to an embodiment of the disclosure may reconstruct an audio signal to not only a lower channel layout such as a mono channel layout or a stereo channel layout but also various channel layouts having a screen-centered 3D sound image, by reconstructing the multichannel audio signal from the audio signal of the base channel group and the audio signal of the at least one dependent channel group obtained from the bitstream.

To increase transmission efficiency, an audio encoding apparatus according to an embodiment may downsample and separately transmit an audio signal for an unused or less-used side channel when transforming a multi-channel audio signal into a channel layout having a screen-centered sound image. Therefore, heated aerosol may be effectively cooled. An audio decoding apparatus according to an embodiment of the disclosure may perform AI-based decoding in order to compensate for data loss caused by downsampling in an encoding terminal.

Figure 4A:
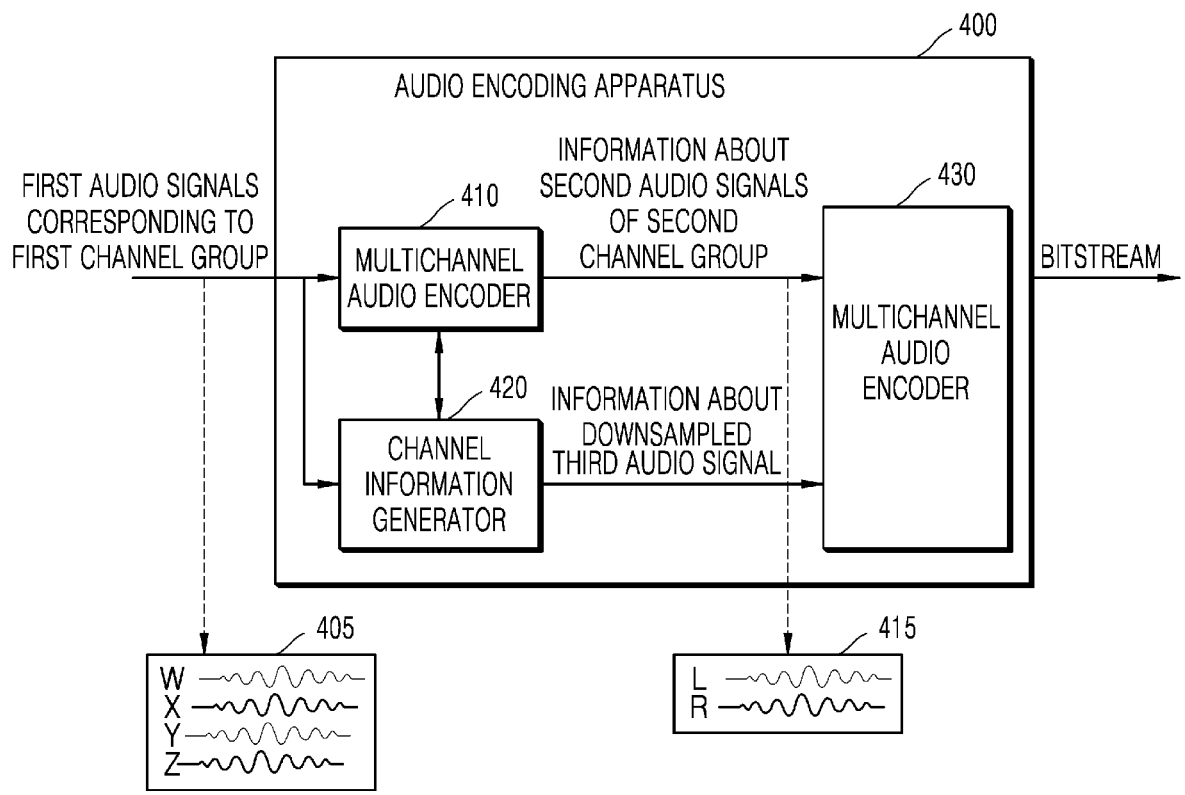
FIG. 4A is a block diagram of an audio encoding apparatus according to an embodiment of the disclosure.
Figure 4B:
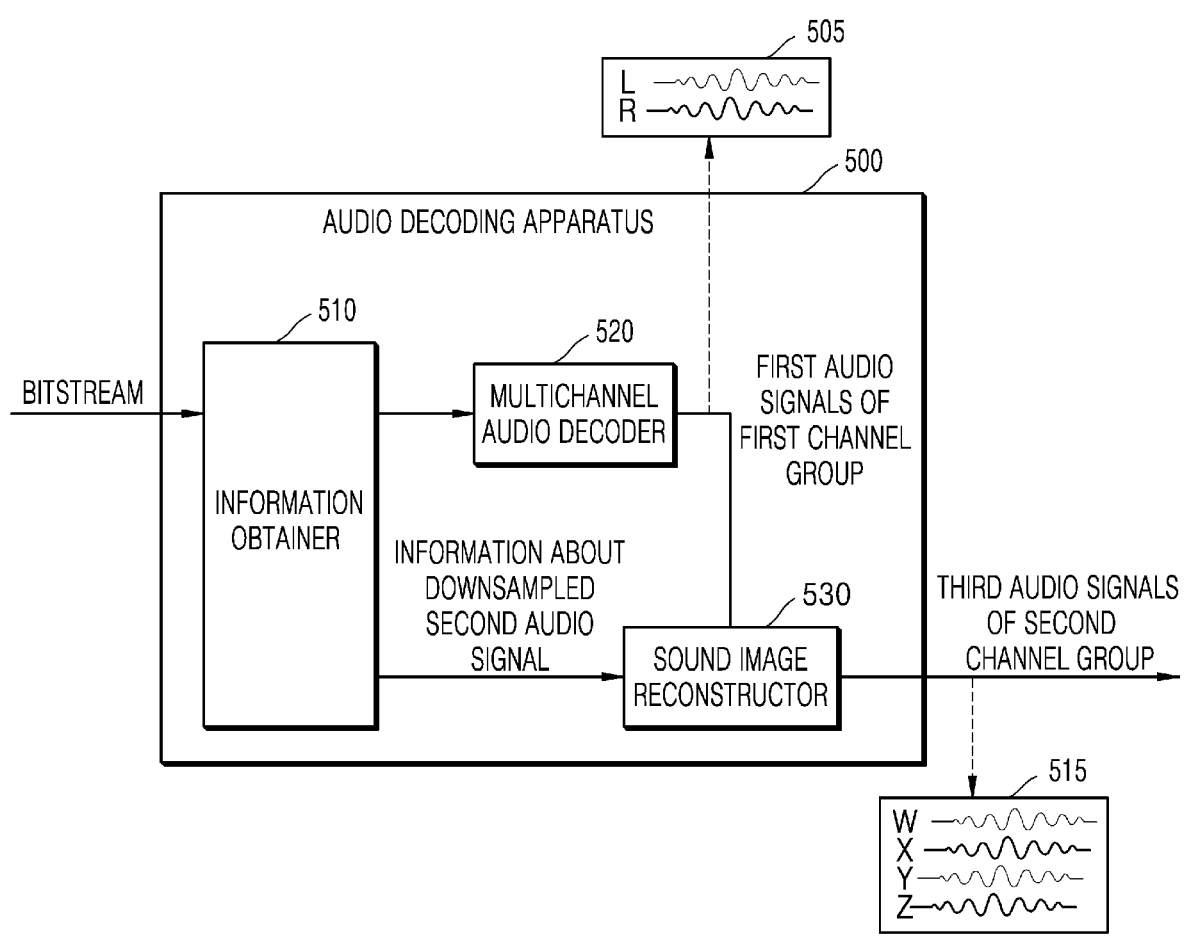
FIG. 4B is a block diagram of an audio decoding apparatus according to an embodiment of the disclosure.

FIG. 4A is a block diagram of an audio encoding apparatus 400 according to an embodiment of the disclosure, and FIG. 4B is a block diagram of an audio decoding apparatus 500 according to an embodiment of the disclosure.

The audio encoding apparatus 400 according to an embodiment may output a bitstream by encoding an audio signal. Referring to FIG. 4A, the audio encoding apparatus 400 according to an embodiment may include a multichannel audio encoder 410, a channel information generator 420, and a bitstream generator 430.

The multichannel audio encoder 410 of the audio encoding apparatus 400 may obtain second audio signals 415 corresponding to channels included in the second channel group (hereinafter, referred to as 'second audio signals corresponding to the second channel group'), which include a small number of channels, by downmixing first audio signals 405 corresponding to channels included in the first channel group (hereinafter, referred to as 'first audio signals corresponding to the first channel group'). The first channel group may include a channel group of the original audio signal, and the second channel group may be constructed by combining at least two channels from among the channels included in the first channel group. The multichannel audio encoder 410 according to an embodiment may obtain the second audio signals 415 corresponding to the second channel group, which are a listener front-centered (or screen-centered) multichannel audio signal, from the first audio signals 405 corresponding to the first channel group, which are a listener-centered multichannel audio signal).

The number of channels included in the second channel group of the second audio signals 415 obtained by the multichannel audio encoder 410 needs to be less than the number of channels included in the first channel group. In other words, the second channel group needs to be a lower channel group of the first channel group.

For example, the first channel group may include $S_n$ surround channels, $W_n$ subwoofer channels, and $H_n$ height channels, and the second channel group may include $S_{n-1}$ surround channels, $W_{n-1}$ subwoofer channels, and $H_{n-1}$ height channels. Here, n may be an integer equal to or greater than 1. $S_{n-1}$ needs to be less than or equal to $S_n$, $W_{n-1}$ needs to be less than or equal to $W_n$, and $H_{n-1}$ needs to be less than or equal to $H_n$, and a case where $S_{n-1}$ is equal to $S_n$, $W_{n-1}$ is equal to $W_n$, and $H_{n-1}$ is equal to $H_n$ is excluded. For example, when the first audio signals 405 are 7.1.4 channel audio signals, the second audio signals 415 may be 2 channel, 3.1.2 channel, 3.1.4 channel, 5.1.2 channel, 5.1.4 channel, or 7.1.2 channel audio signals. However, various embodiments of the disclosure are not limited thereto, and audio signals of various channel groups may be used. For example, the first audio signals 405 may include 5.1.4 channel, 5.1.2 channel, 3.1.4 channel, or 3.1.2 channel audio signals, and the second audio signals 415 may be the audio signal of the lower channel group of the first audio signals 405.

The multichannel audio encoder 410 may mix and compress the second audio signals 415 corresponding to the second channel group and output a result of the mixing and compression to the bitstream generator 430.

The channel information generator 420 of the audio encoding apparatus 400 may obtain, from a first audio signal, information about at least one channel that may be used by the audio decoding apparatus 500 to upmix the audio signal of the second channel group to the first channel group. The channel information generator 420 may identify at least one channel from among the channels of the first channel group and downsample a third audio signal corresponding to the identified at least one channel to obtain at least one downsampled third audio signal. The channel information generator 420 may compress the at least one downsampled third audio signal and output a result of the compression to the bitstream generator 430.

The bitstream generator 430 may generate a bitstream including information about the second audio signals 415 corresponding to the second channel group and information the at least one downsampled third audio signal and may output the bitstream to the audio decoding apparatus 500 of FIG. 4B.

Referring to FIG. 4B, the audio decoding apparatus 500 may include an information obtainer 510, a multichannel audio decoder 520, and a sound image reconstructor 530.

The audio decoding apparatus 500 may reconstruct a multichannel audio signal from the bitstream received from the audio encoding apparatus 400.

The information obtainer 510 of the audio decoding apparatus 500 may obtain information about the first audio signals corresponding to the first channel group and information about a downsampled second audio signal from the bitstream. The multichannel audio decoder 520 may decompress and mix a compressed audio signal to obtain first audio signals 505 corresponding to the first channel group.

The sound image reconstructor 530 may decompress and upsample information about a downsampled second audio signal to obtain at least one second audio signal corresponding to at least one channel from among the channels included in the second channel group. The sound image reconstructor 530 may reconstruct a third audio signal 515 corresponding to the second channel group of a greater number of channels than the number of channels of the first channel group from the first audio signals 505 corresponding to the first channel group and the at least one second audio signal.

Figure 5:
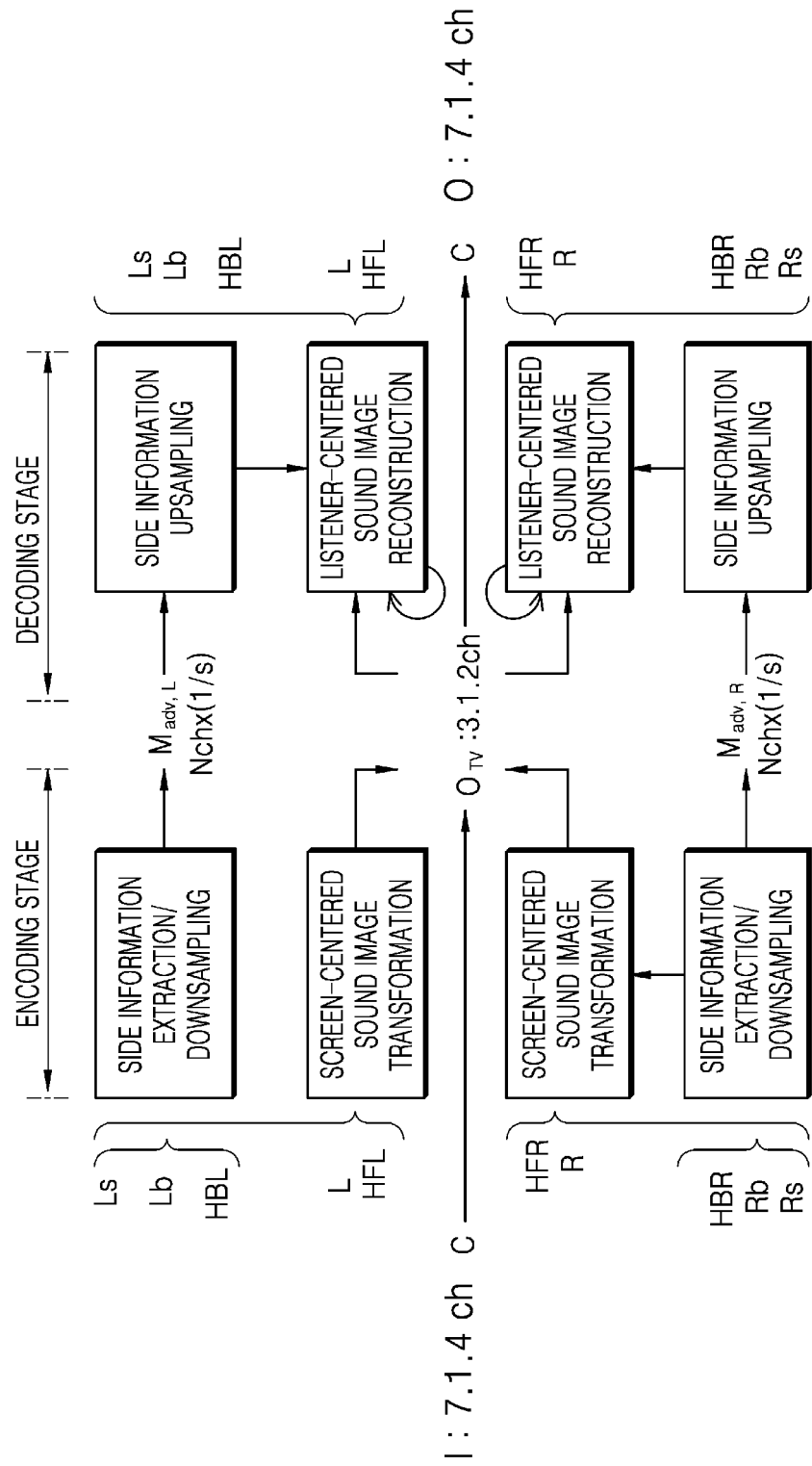
FIG. 5 illustrates an example of transformation between channel groups, which is performed in an audio processing system, according to an embodiment of the disclosure.

FIG. 5 illustrates an example of transformation between channel groups that is performed in an audio processing system according to an embodiment of the disclosure.

The audio encoding apparatus 400 according to an embodiment may receive a first audio signal of the first channel group as the original audio signal. For example, the audio encoding apparatus 400 may receive, as the original audio signal, a 7.1.4 channel audio signal including the Ls channel, the Lb channel, the HBL channel, the L channel, the HFL channel, the C channel, the LFE channel, the HFR channel, the R channel, the HBR channel, the Rb channel, and the Rs channel.

The audio encoding apparatus 400 may transform the first channel group of the original audio signal into the second channel group in which a sound image is implemented around the screen of the display device. For example, the audio encoding apparatus 400 may transform the original audio signal of the 7.1.4 channel into an audio signal $O_{f,v}$ of the 3.1.2 channel. The audio encoding apparatus 400 may include an audio signal transformed into the second channel group in the bitstream and transmit the bitstream to the audio decoding apparatus 500.

When transforming a channel group so that a sound image is implemented around the screen, the audio encoding apparatus 400 may determine, as a side channel, at least one channel that is not used or has least-used related information from among the channels of the first channel group. For example, the audio encoding apparatus 400 may determine, as side channels, the Ls channel, the Lb channel, the HBL channel, the HBR channel, the Rb channel, and the Rs channel from among the channels of the 7.1.4 channel group. The audio encoding apparatus 400 may determine, as a main channel, a channel other than the at least one channel determined as the side channel from among the channels of the first channel group.

The audio encoding apparatus 400 may downsample, on a time axis, an audio signal of the at least one channel determined as the side channel and transmit the downsampled audio signal to the audio decoding apparatus 500. The audio encoding apparatus 400 may further include, in the bitstream, a signal (or an audio signal) $M_{adv}$ obtained by downsampling N channels determined as side channels from among the channels of the first channel group by a factor of 1/s, and may transmit the bitstream to the audio decoding apparatus 500 (where N is an integer greater than 1 and s is a rational number greater than 1).

The audio decoding apparatus 500 may reconstruct the audio signal of the at least one side channel by upsampling the audio signal $M_{adv}$ of the at least one side channel that has been downsampled and transmitted. For example, the audio decoding apparatus 500 may reconstruct the audio signals of the Ls channel, the Lb channel, the HBL channel, the HBR channel, the Rb channel, and the Rs channel from among the channels of the 7.1.4 channel group, through upsampling.

The audio decoding apparatus 500 may reconstruct the audio signal of the first channel group in which a sound image is implemented around a listener, from the audio signal $O_{fv}$ of the second channel group, by using the reconstructed audio signal of the at least one side channel. The audio decoding apparatus 500 may reconstruct the audio signal of the first channel group by cross-improving the main channel and the side channel of the first channel group, from the audio signal $O_{fv}$ of the second channel group, by using the audio signal of the at least one side channel.

Each component of the audio encoding apparatus 400 will now be described in more detail with reference to FIG. 6.

Figure 6:
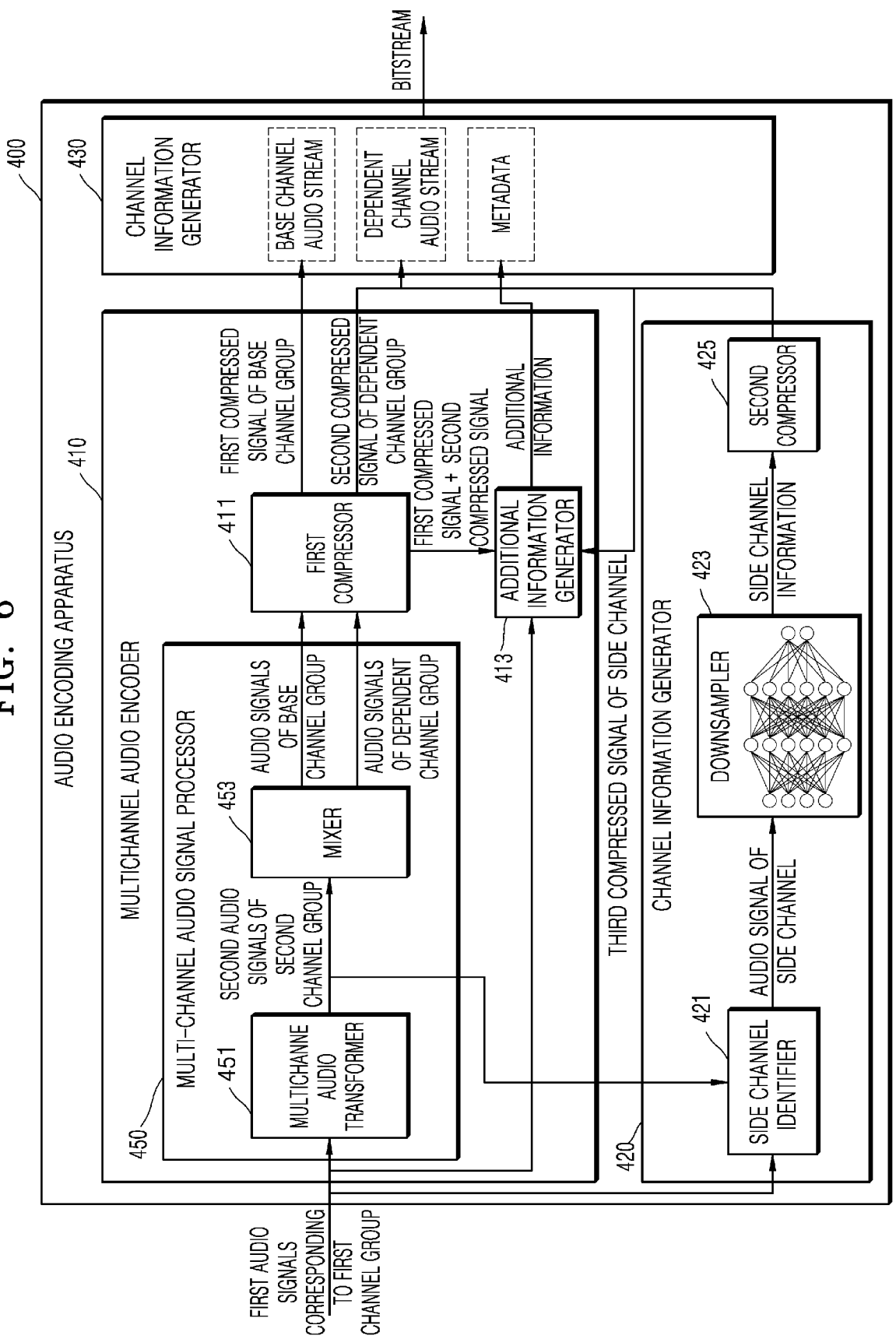
FIG. 6 is a block diagram of an audio encoding apparatus according to an embodiment of the disclosure.

FIG. 6 is a block diagram of the audio encoding apparatus 400 according to an embodiment of the disclosure.

The multichannel audio encoder 410 according to the audio encoding apparatus 400 according to an embodiment may transform and encode the first audio signals corresponding to the first channel group into the second audio signals corresponding to the second channel group to obtain a first compressed signal of the base channel group, a second compressed signal of the dependent channel group, and the additional information. The multichannel audio encoder 410 may include a multichannel audio signal processor 450, a first compressor 411, and an additional information generator 413.

A multichannel audio transformer 451 according to an embodiment may obtain the second audio signals corresponding to the second channel group by downmixing the first audio signals corresponding to the first channel group. The multichannel audio transformer 451 may obtain the audio signal of one channel included in the second channel group by mixing the audio signals of at least two channels included in the first channel group, according to a channel group transformation rule.

Figure 7A:
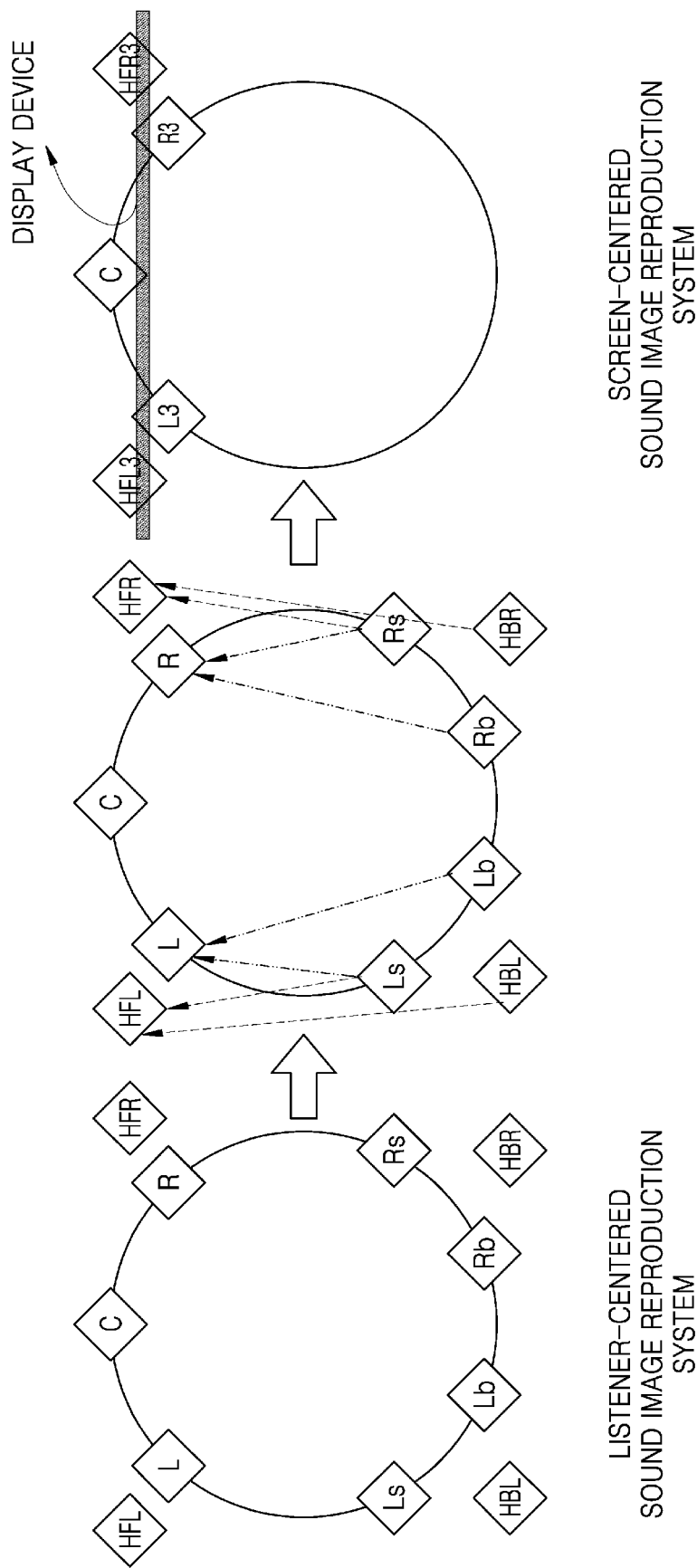
FIG. 7A illustrates an example of a rule of transformation between channel groups, which is performed in an audio encoding apparatus, according to an embodiment of the disclosure.

FIG. 7A illustrates an example of a rule of transformation between channel groups that is performed in an audio encoding apparatus according to an embodiment of the disclosure.

As shown in FIG. 7A, the first channel group is a channel group in which a sound image is configured around a listener, and may be a channel group suitable for a listener-centered sound image reproduction system. For example, the first channel group may be a 7.1.4 channel group including three surround channels (left channel L, center channel C, and right channel R) in front of the listener, four surround channels (side left channel Ls, side right channel Rs, back left channel Lb, and back right channel Rb) beside and behind the listener, one subwoofer channel (sub-woofer channel LFE) in front of the listener, two upper channels (height front left channel HFL and height front right channel HFR) in front of the listener, and two upper channels (height back left channel HBL and height back right channel HBR) behind the listener.

The second channel group is a channel group in which a sound image is configured around the screen of a display device, and may be a channel group suitable for a screen-centered sound image reproduction system. For example, the second channel group may be a 3.1.2 channel group having three surround channels (left channel L3, center channel C, and right channel R3) in front of the listener, one subwoofer channel (sub-woofer channel LFE) in front of the listener, and two upper channels (height front left channel HFL3 and height front right channel HFR3).

As shown in FIG. 7A, the multichannel audio transformer 451 may generate a screen-centered sound image signal corresponding to the channels included in the second channel group, according to a weighted summation of the audio signals of the channels arranged behind the first channel group with the audio signals of the channels arranged in front of the first channel group.

For example, the multichannel audio transformer 451 may obtain an audio signal for the left channel L3 of the 3.1.2 channel group by mixing an audio signal for the front left channel L, an audio signal for the left channel Ls, and an audio signal for the back left channel Lb from among the channels included in the 7.1.4 channel group. The multichannel audio transformer 451 may obtain an audio signal for the right channel R3 of the 3.1.2 channel group by mixing an audio signal for the front right channel R, an audio signal for the right channel Rs, and an audio signal for the back right channel Rb from among the channels included in the 7.1.4 channel group.

The multichannel audio transformer 451 may obtain an audio signal for the height front left channel HFL3 of the 3.1.2 channel group by mixing the audio signal for the left channel Ls, the audio signal for the back left channel Lb, an audio signal for the height front left channel HFL, and an audio signal for the height back left channel HBL from among the channels included in the 7.1.4 channel group. The multichannel audio transformer 451 may obtain an audio signal for the height front right channel HFR3 of the 3.1.2 channel group by mixing the audio signal for the right channel Rs, the audio signal for the back right channel Rb, an audio signal for the height front right channel HFR, and an audio signal for the height back right channel HBR from among the channels included in the 7.1.4 channel group.

Referring back to FIG. 6, the mixer 453 according to an embodiment may obtain the audio signals of the base channel group and the audio signals of the dependent channel group by mixing the second audio signals corresponding to the second channel group.

The mixer 453 according to an embodiment may transform the second audio signals corresponding to the second channel group into the audio signal of the base channel group and the audio signal of the dependent channel group so that a channel group having a screen-centered sound image, such as the second channel group, is compatible with a lower channel group such as a mono channel or a stereo channel, and may output the audio signal of the base channel group and the audio signal of the dependent channel group.

Thus, according to an output speaker layout of a decoding terminal, only the audio signal of the base channel group may be output, or the multichannel audio signal may be reconstructed and output based on the audio signal of the base channel group and the audio signal of the dependent channel group. A method of dividing multichannel audio signals into the base channel group and the dependent channel group and encoding the multichannel audio signals according to the base channel group and the dependent channel group is the dame as the method described above with reference to FIGS. 2A through 2D, and thus a detailed description thereof will be omitted.

The mixer 453 according to an embodiment may obtain the audio signal of the base channel by mixing signals of at least two channels included in the second audio signals corresponding to the second channel group. The mixer 453 may obtain, as the audio signals of the dependent channel group, the audio signals of channels other than at least one channel corresponding to the audio signal of the base channel group from among the channels included in the second channel group.

For example, when the second channel group is the 3.1.2 channel group and the base channel group includes the L2 channel and the R2 channel constituting the stereo channel, the mixer 453 may obtain the audio signals of the L2 channel and the R2 channel constituting the stereo channel, by mixing the audio signals of the left channel L3, the right channel R3, and the center channel C in the 3.1.2 channel group. The mixer 453 may obtain the audio signals of the L2 channel and the R2 channel constituting the stereo channel as the audio signals of the base channel group. The mixer 453 may obtain, as the audio signals of the dependent channel group, the audio signals of channels (i.e., the center channel C, the sub-woofer channel LFE, the height front left channel HFL3, and the height front right channel HFL3) other than the two channels (i.e., the left channel L3 and the right channel R3) corresponding to the stereo channel within the 3.1.2 channel group.

The first compressor 411 may obtain the first compressed signal by compressing the audio signals of the base channel group, and may obtain the second compressed signal by compressing the audio signals of the dependent channel group. The first compressor 411 may compress the audio signals through processing such as frequency transformation, quantization, and entropy. For example, an audio signal compression method such as the AAC standard or the OPUS standard may be used.

The additional information generator 413 according to an embodiment may obtain the additional information from the first audio signal, the first compressed signal of the base channel group, and the second compressed signal of the dependent channel group. The additional information may include information used to decode the multichannel audio signal, based on the audio signal of the base channel and the audio signal of the dependent channel, in the decoding terminal.

The additional information generator 413 according to an embodiment may obtain the additional information by individually decoding the first compressed signal, the second compressed signal, and a third compressed signal of side channel information, obtaining reconstructed audio signals corresponding to the channels included in the first channel group from decoded signals, and comparing the reconstructed audio signals with the first audio signals.

For example, the additional information generator 413 may obtain error removal-related information (for example, a scale factor for error removal) as the additional information so that an error between the reconstructed audio signals and the first audio signals is minimized.

As another example, the additional information may include an audio object signal indicating at least one of an audio signal, a position, or a direction of an audio object (sound source). Alternatively, the additional information may include information about the total number of audio streams including a base channel audio stream and a dependent channel audio stream. The additional information may include downmix gain information. The additional information may include channel mapping table information. The additional information may include volume information. The additional information may include LFE gain information. The additional information may include dynamic range control information. The additional information may include channel group rendering information. The additional information may include information of the number of other coupled audio streams, information indicating a multichannel group, information about whether a dialogue exists in an audio signal and a dialogue level, information indicating whether a LFE is output, information about whether an audio object exists on the screen, information about existence or absence of a continuous channel audio signal, and information about existence or absence of a discontinuous channel audio signal. The additional information may include information about demixing including at least one demixing weight parameter of a demixing matrix for reconstructing a multichannel audio signal.

The additional information may be various combinations of the aforementioned pieces of information. In other words, the additional information may include at least one of the aforementioned pieces of information.

The channel information generator 420 according to an embodiment may generate information about a not-used or less-used side channel when transforming the first audio signals corresponding to the first channel group into the second audio signals corresponding to the second channel group. The channel information generator 420 may generate information about the at least one side channel included in the first channel group. The channel information generator 420 may include a side channel identifier 421, a downsampler 423, and a second compressor 425.

The side channel identifier 421 according to an embodiment may identify the at least one side channel from the channels included in the first channel group, and may output the audio signal of the at least one side channel. The side channel identifier 421 may identify, as a side channel, a channel having a relatively low correlation with the channels included in the second channel group, from among the channels included in the first channel group. The side channel may be not used or may be least used in performing an audio signal formal transformation to change an original audio signal into a converted audio signal (e.g., from a listener-centered audio signal to a screen-centered audio signal, or vice versa), among a plurality of channels of the original signal. For example, the side channel identifier 421 may identify the channel having a relatively low correlation with the channels included in the second channel group from among the channels included in the first channel group, based on weights that are applied to the channels of the first channel group in order to transform the first channel group into the second channel group. For example, the side channel identifier 421 may identify, as a side channel, a channel to which a weight less than or equal to a predetermined value is applied, from among the channels of the first channel group.

Figure 7B:
FIG. 7B illustrates an example of a rule of transformation between channel groups, which is performed in an audio encoding apparatus, according to an embodiment of the disclosure.

FIG. 7B illustrates an example of a rule of transformation between channel groups that is performed in an audio encoding apparatus according to an embodiment of the disclosure.

FIG. 7B illustrates and explains a case where the first channel group includes a 7.1.4 channel having a listener-centered sound image and the second channel group includes a 3.1.2 channel having a listener front-centered (or screen-centered) sound image. The Ls channel, the Rs channel, the Lb channel, the Rb channel, the HBL channel, and the HBR channel in the 7.1.4 channel that are channels having a relatively low correlation with the 3.1.2 channel (i.e., channels far away from the front of the listener) may be identified as side channels.

The audio encoding apparatus 400 according to an embodiment may obtain an audio signal corresponding to a channel included in the second channel group, by applying a weight to at least one audio signal corresponding to at least one channel included in the first channel group. The audio encoding apparatus 400 may obtain an audio signal corresponding to a channel included in the second channel group, by computing a weighted sum of audio signals corresponding to at least two channels included in the first channel group. The audio encoding apparatus 400 may identify a side channel, based on weights applied to the audio signals corresponding to the first channel group in order to obtain the audio signals corresponding to the second channel group.

As shown in FIG. 7B, the audio signal of the L3 channel of the 3.1.2 channel group may be expressed as a weight sum of the audio signals of the L channel, the Ls channel, and the Lb channel of the 7.1.4 channel group. When a weight value w1 applied to the L channel is greater than weight values w2 and w3 applied to the Ls channel and the Lb channel, the audio encoding apparatus 400 may determine the Ls channel and the Lb channel as side channels.

In more detail, as described above with reference to FIG. 7A, the L3 channel of the 3.1.2 channel group may be constructed as a combination of the L channel, the Ls channel, and the Lb channel of the 7.1.2 channel group. In order for the display device to output an audio signal according to a 3.1.2 speaker channel layout in which a sound image is formed around the screen, back channels from among the channels included in the 7.1.2 channel group need to be mapped to front channels. Thus, the weight value w1 applied to the L channel arranged at the front of the 7.1.2 channel may be greater than the weight values w2 and w3 respectively applied to the Ls channel and the Lb channel. Based on the applied weight values, the Ls channel and the Lb channel may be determined as channels least correlated to the L3 channel and may be determined as side channels. A method of identifying a main channel and a side channel for the L3 channel may be expressed using an equation below.

$$M_{L3} = \underset{C}{\mathrm{argmax}} F(L3; C \in C_{L3}) \quad \text{[Equation]}$$

$$S_{L3} = \{C \mid C \in M_{L3}^c\}$$

In the equation, $M_{L3}$ indicates a main channel group including at least one main channel for the L3 channel, $S_{L3}$ indicates a side channel group including at least one side channel for the L3 channel, and $C_{L3}$ indicates the channels of the first channel group used to generate the L3 channel. For example, $C_{L3}$ may include the L channel, the Ls channel, and the Lb channel. In the above equation, F indicates a similarity function between two channels. F may include, for example, a cross correlation function.

According to the above equation, the audio encoding apparatus 400 may identify a highly correlated channel (for example, the L channel) from among the channels of the first channel group used to generate the L3 channel (for example, the L channel, the Ls channel, and the Lb channel), and may identify channels (for example, the Ls channel and the Lb channel) other than main channels.

In the same manner, the audio encoding apparatus 400 may determine that weight values w1, w6, and w8 are greater than weight values w2, w3, w4, and w7, by referring to a transformation rule shown in FIG. 7B. Based on this determination, the audio encoding apparatus 400 may determine, as main channels, the L channel, the R channel, the HFL channel, and the HFR channel from among the channels of the 7.1.4 channel group. The audio encoding apparatus 400 may determine, as side channels, the Ls channel, the Rs channel, the Lb channel, the Rb channel, the HBL channel, and the HBR channel from among the channels of the 7.1.4 channel group.

The disclosure is not limited to a channel transformation rule shown in FIG. 7B, and a weight applied to each channel may be variously changed according to implementations. For example, FIG. 7B illustrates that the same weight w1 is applied to the L channel and the R channel of the 7.1.4 channel group. However, various other weights are applicable.

Embodiments of the disclosure are not limited to an example of identifying a channel having a relatively low correlation to the channels included in the second channel group as a side channel, and a channel satisfying a certain criterion from among the channels of the first channel group may be identified, or a channel determined by a manufacturer of an audio signal in consideration of sound image reproduction performance may be identified as a side channel.

The downsampler 423 of FIG. 6 according to an embodiment downsamples the audio signal of the at least one side channel, thereby saving resources used to transmit the audio signal. The downsampler 423 may extract a first audio sample group and a second audio sample group from the audio signal of the at least one side channel. For example, the downsampler 423 may arrange audio samples constituting an audio signal for the side channel along a time axis, and extract the first audio sample group and the second audio sample group including a plurality of audio samples. The downsampler 423 may obtain downsampled information by synthesizing the first audio sample group with the second audio sample group.

Figure 8A:
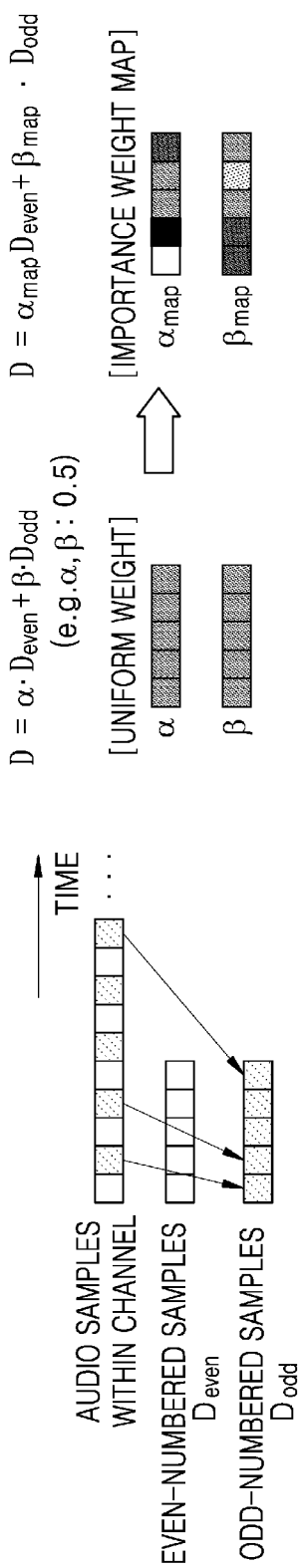
FIG. 8A is a view for explaining downsampling of a side channel audio signal, which is performed by an audio encoding apparatus, according to an embodiment of the disclosure.

FIG. 8A is a view for explaining downsampling of a side channel audio signal that is performed by an audio encoding apparatus according to an embodiment of the disclosure.

As shown in FIG. 8A, the audio encoding apparatus 400 according to an embodiment may extract a first audio sample group $D_{odd}$ of odd-numbered indexes and a second audio sample group $D_{even}$ of even-numbered indexes from audio samples that constitute the audio signal of the at least one side channel.

For example, the audio encoding apparatus 400 may use a uniform average filter considering a uniform importance for each group and for each time, when synthesizing the first audio sample group $D_{odd}$ with the second audio sample group $D_{even}$ in order to achieve downsampling. The audio encoding apparatus 400 may obtain a downsampled audio signal D of the at least one side channel by synthesizing the first audio sample group $D_{odd}$ with the second audio sample group $D_{even}$ by applying the same weight value (e.g., α, β=0.5) to all samples regardless of a sample group and time.

As another example, the audio encoding apparatus 400 may obtain down-sampled data capable of obtaining better performance by applying different weights to different audio samples. The audio encoding apparatus 400 may obtain the downsampled audio signal D of the at least one side channel by synthesizing the first audio sample group $D_{odd}$ with the second audio sample group $D_{even}$ by applying importance weight maps $α_{map}$ and $β_{map}$ in which different weight values are allocated to different sample groups and different time.

The downsampler 423 according to an embodiment may downsample at least one third audio signal by obtaining downsampling related information for the first audio sample group and the second audio sample group by using an AI model and applying the downsampling related information to the first audio sample group and the second audio sample group. For example, the downsampler 423 according to an embodiment calculates a weight to be differently applied to each audio sample by using the AI model, so that better performance may be obtained compared to a method of synthesizing audio samples by giving a uniform weight.

The downsampler 423 may obtain weight values that are respectively to be applied to the first audio sample group and the second audio sample group, by using the AI model. The downsampler 423 may extract a feature of each audio sample, determine an importance of each audio sample based on the extracted feature, and calculate a weight value that is to be applied to each audio sample, by using a pre-trained AI model. The downsampler 423 may obtain a weight map including weight values differently applied, over time or according to an audio sample group, to samples and apply the obtained weight map to the first audio sample group and the second audio sample group. The downsampler 423 may obtain, as the side channel information, a weight sum of the first audio sample group and the second audio sample group to which the weight map has been applied.

The downsampler 423 according to an embodiment may obtain respective weights for audio samples and may generate downsampled data by applying the obtained weights to the audio samples. The downsampler 423 may determine whether audio reconstruction performance in the decoding terminal is improved by applying the weights, and train a result of the determination. The downsampler 423 may derive the importance weight maps $α_{map}$ and $β_{map}$ capable of increasing an audio reconstruction rate, by using a trained AI model.

Figure 8B:
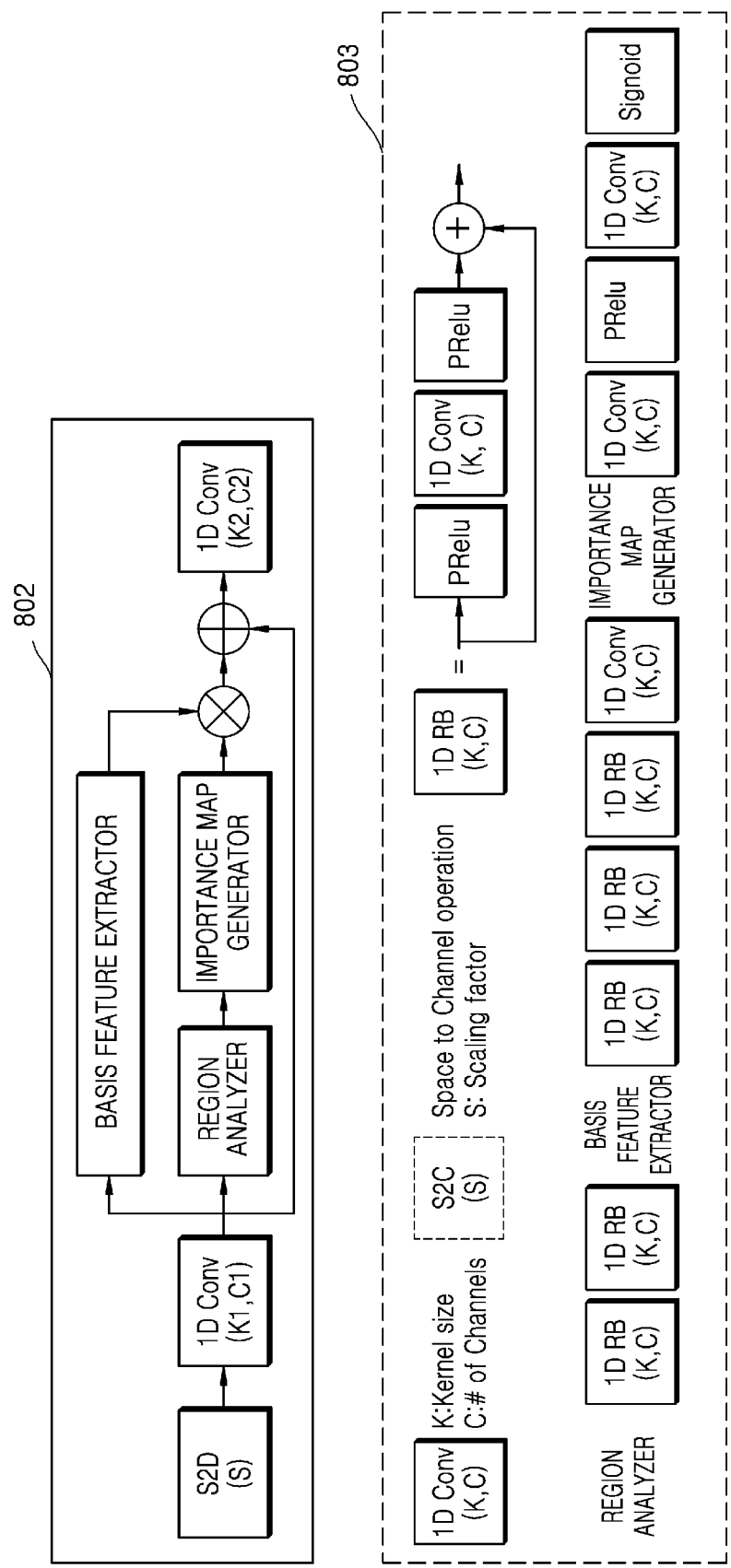
FIG. 8B is a block diagram for explaining an operation of a downsampler of an audio encoding apparatus, according to an embodiment of the disclosure.

FIG. 8B is a block diagram for explaining an operation of a downsampler of an audio encoding apparatus according to an embodiment of the disclosure.

FIG. 8B illustrates an AI model used by the downsampler 423 according to an embodiment. An AI model 802 for downsampling may sample an audio signal of at least one side channel, and may perform a convolution in which a kernel size is K1 and the numbers of channels are C1.

An S2D (space-to-depth) (S) of the AI model 802 refers to an operation of performing sampling by skipping input audio samples (S) one by one. As shown in a notation 803 of FIG. 8B, 1DConv(K1, C1) refers to a one-dimensional (1D) convolution layer, and refers to an operation of separating a signal sampled in S2D(S) into C1 multichannels. In FIG. 8B, 1DRB may refer to a 1D residual block, and Prelu may refer to an activation function.

A basis feature extractor of the AI model 802 may extract a feature from input data. For example, the first audio sample group $D_{odd}$ and the second audio sample group $D_{even}$ of FIG. 8A may be extracted as feature levels. A region analyzer may extract a local feature and perform a peripheral region analysis. An importance map generator may extract an importance value for each sample that is to be weighted to each feature. As shown in FIG. 8B, each module may include a plurality of convolution layers.

FIG. 8B is merely an example for explaining an operation of the downsampler 423. Embodiments of the disclosure are not limited to the example of FIG. 8B. The AI model used by the audio encoding apparatus 400 according to an embodiment may be autonomously determined and expanded through learning. The AI model used by the audio encoding apparatus 400 may be configured and trained in various ways in order to improve audio signal reconstruction performance Referring back to FIG. 6, the downsampler 423 may downsample the audio signal of the at least one side channel and may obtain the side channel information including the downsampled data. The second compressor 425 may obtain the third compressed signal by compressing the side channel information. The second compressor 425 may compress the side channel information through processing such as frequency transformation, quantization, and entropy. For example, an audio signal compression method such as the AAC standard or the OPUS standard may be used.

The bitstream generator 430 according to an embodiment may generate the bitstream from the first compressed signal of the base channel group, the second compressed signal of the dependent channel group, and the additional information output by the multichannel audio encoder 410 and the third compressed signal of the side channel generated by the channel information generator 420. The bitstream generator 430 may generate the bitstream via an encapsulation process with respect to the compressed signals. The bitstream generator 430 may generate the bitstream by performing encapsulation so that the first compressed signal of the base channel group is included in the base channel audio stream, the second compressed signal of the dependent channel group and the third compressed signal of the side channel are included in the dependent channel audio stream, and the additional information is included in metadata.

Figure 9:
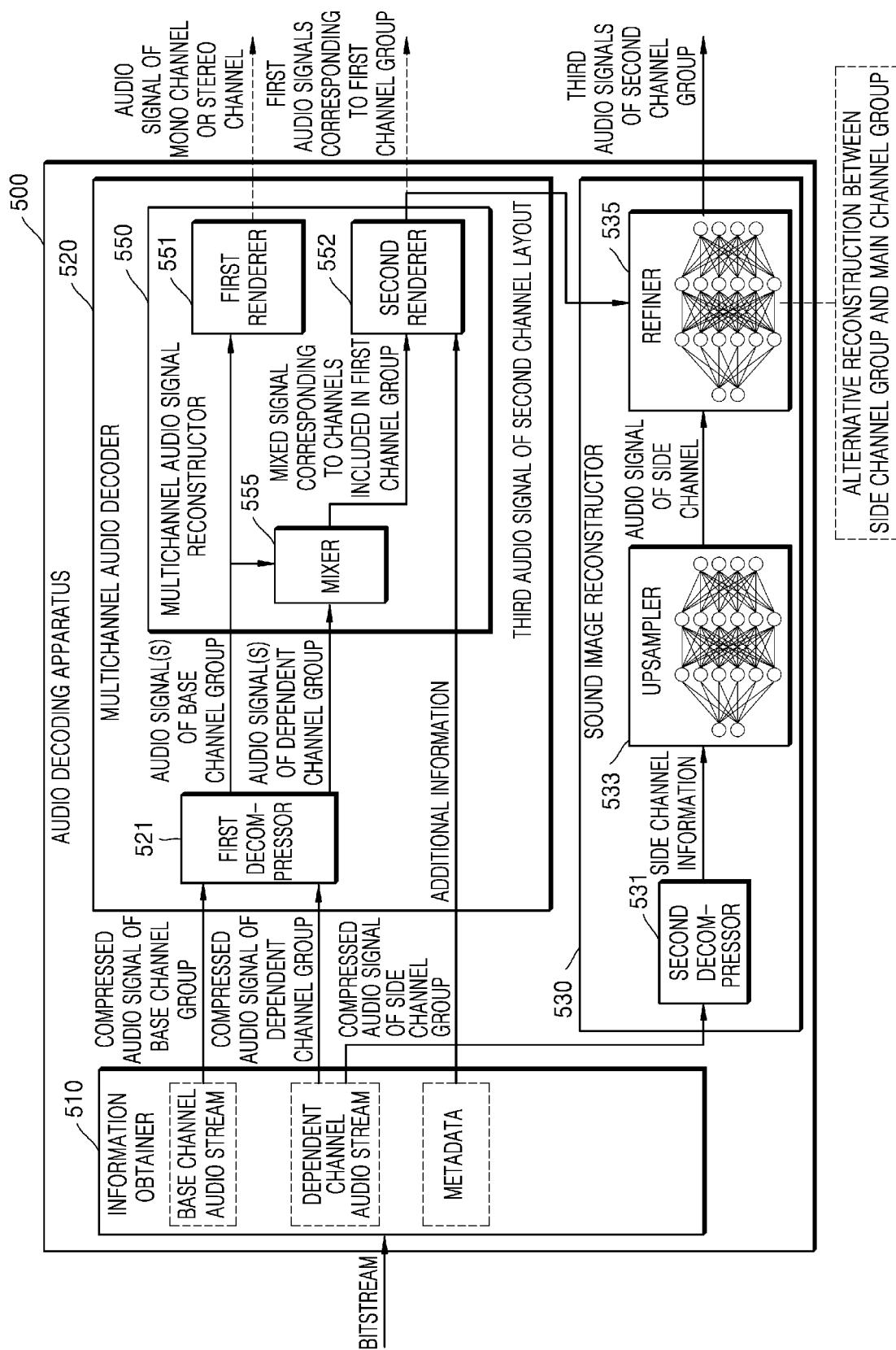
FIG. 9 is a block diagram of an audio decoding apparatus according to an embodiment of the disclosure.

FIG. 9 is a block diagram of an audio decoding apparatus according to an embodiment of the disclosure.

The information obtainer 510 of the audio decoding apparatus 500 according to an embodiment may identify the base channel audio stream, the dependent channel audio stream, and the metadata encapsulated in the bitstream.

The information obtainer 510 may obtain the compressed audio signal of the base channel group from the base channel audio stream, obtain the compressed audio signal of the dependent channel group and compressed side channel information from the dependent channel audio stream, and obtain the additional information from the metadata.

The multichannel audio decoder 520 of the audio decoding apparatus 500 according to an embodiment may obtain the first audio signals corresponding to the first channel group by decoding the compressed signals obtained from the bitstream. The multichannel audio decoder 520 may include a first decompressor 521 and a multichannel audio signal reconstructor 550.

The first decompressor 521 may obtain the at least one audio signal of the base channel group by performing decompression processes, such as entropy decoding, inverse-quantization, and frequency inverse-transformation, on the compressed audio signal of the base channel group. The first decompressor 521 may obtain the at least one audio signal of the at least one dependent channel group by performing decompression processes, such as entropy decoding, inverse-quantization, and frequency inverse-transformation, on the compressed audio signal of the dependent channel group. For example, an audio signal reconstruction method corresponding to an audio signal compression method such as the AAC standard or the OPUS standard may be used.

The multichannel audio signal reconstructor 550 according to an embodiment may reconstruct the first audio signals corresponding to the first channel group, based on the at least one audio signal of the base channel group, the at least one audio signal of the at least one dependent channel group, and the additional information.

A mixer 555 of the multichannel audio signal reconstructor 550 may obtain a mixed audio signal corresponding to the channels included in the first channel group, by mixing the at least one audio signal of the base channel group with the audio signal of the at least one dependent channel group. The mixer 555 may obtain, as the mixed audio signal, a weight sum of the at least one audio signal of the base channel and the audio signal of the at least one dependent channel.

For example, when the first channel group is the 3.1.2 channel group and the base channel group includes the L2 channel and the R2 channel constituting the stereo channel, the mixer 555 may obtain, as the audio signal of the L3 channel of the 3.1.2 channel group, a weight sum of the audio signal of the L2 channel included in the base channel group and the audio signal of the C channel included in the dependent channel group. The mixer 555 may obtain a weight sum of the audio signal of the R2 channel included in the base channel group and the audio signal of the C channel included in the dependent channel group as the audio signal of the R3 channel of the 3.1.2 channel layout.

A second rendering unit 552 may obtain the first audio signals corresponding to the first channel group, by rendering the mixed audio signal obtained by the mixer 555, based on the additional information. The additional information may include information calculated and transmitted by the audio encoding apparatus 400 in order to reduce occurrence of an error during audio signal reconstruction.

The sound image reconstructor 530 according to an embodiment may reconstruct the third audio signals of the second channel group of a greater number of channels than the number of channels of the first channel group from the first audio signals corresponding to the first channel group, by using the side channel information included in the bitstream. The sound image reconstructor 530 may include a second decompressor 531, an upsampler 533, and a refiner 535.

The second decompressor 531 may obtain the side channel information through decompression processes, such as entropy decoding, inverse-quantization, and frequency inverse-transformation, on the compressed side channel information. For example, an audio signal reconstruction method corresponding to an audio signal compression method such as the AAC standard or the OPUS standard may be used.

The side channel information may include at least one second audio signal corresponding to at least one channel included in the second channel group, which is usable to reconstruct the audio signals corresponding to the second channel group. The side channel may be a channel having a relatively low correlation with the channels included in the first channel group, from among the channels included in the second channel group.

For example, the first audio signals corresponding to the first channel group may include a multichannel audio signal having a sound image around the front of the listener, and the third audio signals corresponding to the second channel group may include a multichannel audio signal having a sound image around the listener. In this case, the side channel information may include a side channel component and a back channel component of the listener, which have relatively low correlations with the channels included in the first channel group composed of a listener front channel component, from among the channels included in the second channel group. The channels other than the side channels in the second channel group may be identified as main channels having relatively high correlation with the channels of the first channel group.

However, embodiments of the disclosure are not limited to an example in which a side channel includes a channel having a relatively low correlation to the channels included in the first channel group, and a channel satisfying a certain criterion from among the channels of the second channel group may be a side channel, or a channel intended by a manufacturer of an audio signal may be a side channel.

For example, when the first channel group is the 3.1.2 channel having a sound image around the front of the listener and the second channel group is the 7.1.4 channel having a sound image around the listener, information about at least six channels is needed to reconstruct the third audio signal corresponding to the second channel group from the first audio signals corresponding to the first channel group.

For example, information about the Ls channel, the Rs channel, the Lb channel, the Rb channel, the HBL channel, and the HBR channel that are channels having a relatively low correlation with the channels of the 3.1.2 channel group (i.e., channels far away from the front of the listener), from among the channels of the 7.1.4 channel group, may be included in the side channel information.

As another example, information about the L channel, the R channel, the HFL channel, the HFR channel, the C channel, and the LFE channel that are channels having a relatively high correlation with the channels of the 3.1.2 channel group, from among the channels of the 7.1.4 channel group, may be included in the side channel information.

The upsampler 533 according to an embodiment may obtain at least one second audio signal corresponding to at least one channel from among the channels included in the second channel group, by upsampling the side channel information. For example, the upsampler 533 may upsample the downsampled information included in the side channel information by using an AI model. The AI model used by the upsampler 533 of the audio decoding apparatus 500 may correspond to an AI model used by the downsampler 423 of the audio encoding apparatus 400, and may be an AI model trained to increase audio signal reconstruction performance.

The upsampler 533 may obtain the second audio signal corresponding to the at least one side channel by performing time axis upsampling.

The refiner 535 according to an embodiment may reconstruct the third audio signals corresponding to the second channel group from the first audio signals corresponding to the first channel group by using the second audio signal corresponding to the at least one side channel. The refiner 535 may refine the audio signal of the at least one side channel and the audio signal of the at least one main channel, based on AI, in order to downsample and transmit the audio signal of the side channel in the encoding terminal. The refiner 535 may alternately and repeatedly refine the audio signal of the at least one side channel and the audio signal of the at least one main channel, based on AI.

First, the refiner 535 may obtain the audio signal of the at least one main channel of the first channel group from the third audio signal and the audio signal of the at least one side channel, according to a rule of channel group transformation between the first channel group and the second channel group. The refiner 535 may set the audio signal for the at least one side channel and the audio signal for the at least one main channel as an initial condition. The refiner 535 may alternately refine the audio signal for the at least one side channel and the audio signal for the at least one main channel by applying the initial condition to a pre-trained AI model, and may obtain a fourth audio signal including a refined audio signal for the at least one side channel and a refined audio signal for the at least one main channel. The refiner 535 may increase sound image reproduction performance by repeatedly performing an operation of alternately refining an audio signal for a side channel and an audio signal for a main channel. An operation of the refiner 535 will be described later in more detail with reference to FIGS. 10A through 10C.

The audio decoding apparatus 500 according to an embodiment may support various channel layouts according to audio production environments.

The multichannel audio signal reconstructor 550 of the audio decoding apparatus 500 according to an embodiment may render and output the audio signals of the base channel group through a first renderer 551. For example, the first renderer 551 may output the mono channel audio signal or the stereo channel audio signal from the audio signals of the base channel group. The audio signals of the base channel group may be independently encoded and output without information about the audio signals of the dependent channel group.

The multichannel audio signal reconstructor 550 of the audio decoding apparatus 500 according to an embodiment may render and output the first audio signals corresponding to the first channel group through a second renderer 552. When audio content of the first channel group having a sound image around the front of the listener is consumed, the audio decoding apparatus 500 may not reconstruct a listener-centered sound image based on the side channel information, and may reconstruct and output the first audio signals corresponding to the first channel group.

The sound image reconstructor 530 of the audio decoding apparatus 500 according to an embodiment may reconstruct and output the third audio signals corresponding to the listener-centered second channel group from the first audio signals corresponding to the first channel group and the second audio signal corresponding to the at least one side channel.

Figure 10A:
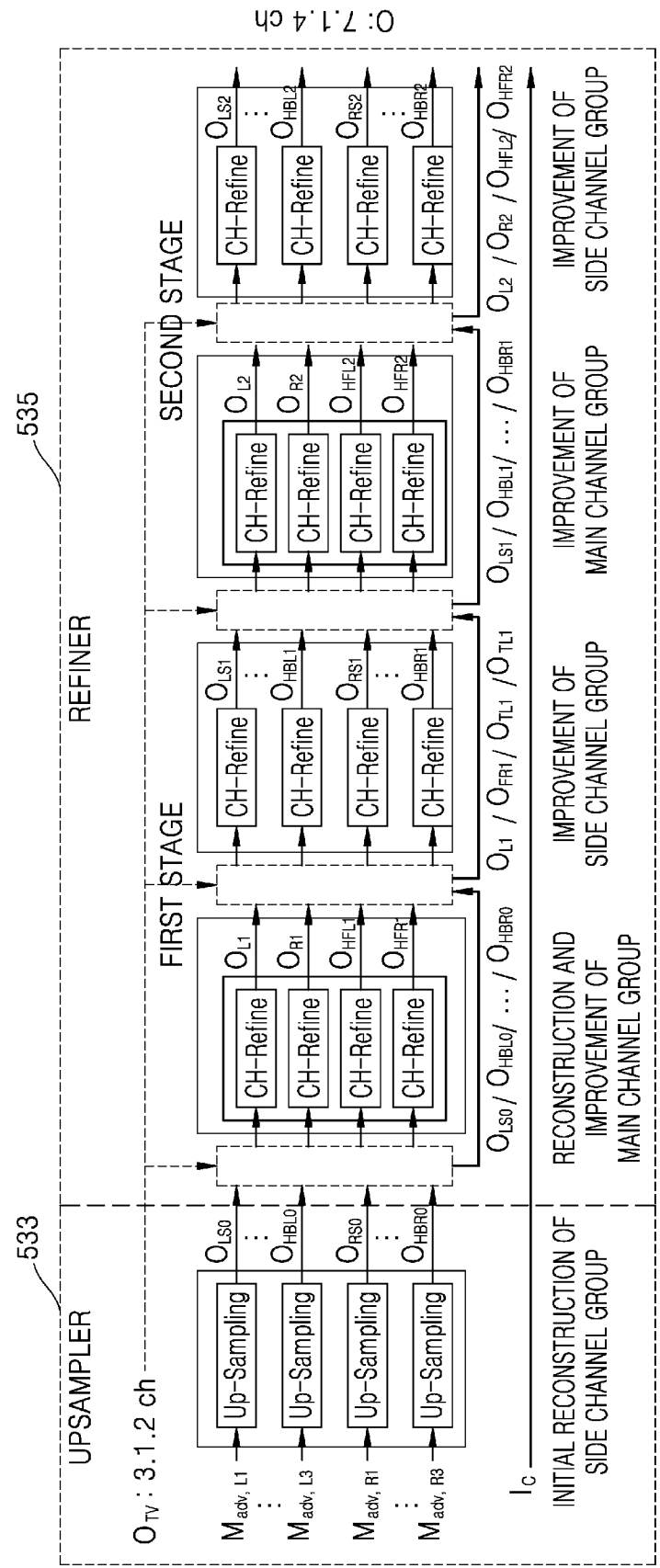
FIG. 10A is a block diagram for explaining an operation of a sound image reconstructor of an audio decoding apparatus, according to an embodiment of the disclosure.

FIG. 10A is a block diagram for explaining an operation of a sound image reconstructor of an audio decoding apparatus according to an embodiment of the disclosure.

FIG. 10A illustrates an example of a process, performed by the audio decoding apparatus according to an embodiment, of reconstructing the audio signals corresponding to the second channel group of the 7.1.4 channel from the audio signals corresponding to the first channel group of the 3.1.2 channel. However, FIG. 10A is merely an example for helping understanding of an operation of the disclosure. The type of side channel used according to an embodiment, the number of side channels used according to an embodiment, an input channel group, and a target channel group to be reconstructed may vary according to implementations.

The upsampler 533 of the audio decoding apparatus 500 according to an embodiment may reconstruct the audio signal of the at least one side channel by performing time axis-based upsampling on side channel information $M_{adv}$ downsampled and transmitted. The upsampler 533 according to an embodiment may upsample the downsampled side channel information $M_{adv}$, which is included in the bitstream, by using the AI model.

According to the example of FIG. 10A, through upsampling of the side channel information, audio signals $O_{LS0}$, $O_{RS0}$, $O_{LB0}$, $O_{RB0}$, $O_{HBL0}$, and $O_{HBR0}$ of the Ls channel, the Rs channel, the Lb channel, the Rb channel, the HBL channel, and the HBR channel from among the channels of the 7.1.4 channel group may be initially reconstructed as the audio signals of the side channel group.

The refiner 535 of the audio decoding apparatus 500 according to an embodiment may obtain audio signals $O_{L0}$, $O_{R0}$, $O_{HFL0}$, and $O_{HFR0}$ of the main channel group included in the second channel group from first audio signals $O_{TV}$ corresponding to the first channel group and the second audio signals $O_{LS0}$, $O_{RS0}$, $O_{LB0}$, $O_{RB0}$, $O_{HBL0}$, and $O_{HBR0}$ corresponding to the side channel group, according to a rule of channel group transformation between the first channel group and the second channel group. The refiner 535 may set the second audio signals $O_{LS0}$, $O_{RS0}$, $O_{LB0}$, $O_{RB0}$, $OH_{BL0}$, and $O_{HBR0}$ corresponding to the side channel group and the audio signals $O_{L0}$, $O_{R0}$, $O_{HFL0}$, and $O_{HFR0}$ of the main channel group as an initial condition. The refiner 535 may alternately refine the audio signals of the side channel group and the audio signals of the main channel group by using the AI model, based on the channel group transformation rule between the first channel group and the second channel group, the first audio signals $O_{TV}$ corresponding to the first channel group, and the initial condition.

The refiner 535 of the audio decoding apparatus 500 may obtain the audio signals $O_{L0}$, $O_{R0}$, $O_{HFL0}$, and $O_{HFR0}$ corresponding to the main channel group from the first audio signals $O_{TV}$ and the second audio signals $O_{LS0}$, $O_{RS0}$, $O_{LB0}$, $O_{RB0}$, $O_{HBL0}$, and $O_{HBR0}$ corresponding to the side channel group included in the second channel group, according to a transformation rule from the channels included in the second channel group to the channels included in the first channel group. The refiner 535 may refine the second audio signals $O_{LS0}$, $O_{RS0}$, $O_{LB0}$, $O_{RB0}$, $O_{HBL0}$, and $O_{HBR0}$ and the audio signals $O_{L0}$, $O_{R0}$, $O_{HFL0}$, and $O_{HFR0}$ by using the AI model.

The refiner 535 according to an embodiment may obtain refined audio signals $O_{L1}$, $O_{R1}$, $O_{HFL1}$, and $O_{HFR1}$ by refining the audio signals $O_{L0}$, $O_{R0}$, $O_{HFL0}$, and $O_{HFR0}$ through first layers within the AI model, and may obtain refined audio signals $O_{LS1}$, $O_{RS1}$, $O_{LB1}$, $O_{RB1}$, $O_{HBL1}$, and $O_{HBR1}$ by refining the second audio signals $O_{LS0}$, $O_{RS0}$, $O_{LB0}$, $O_{RB0}$, $OH_{BL0}$, and $O_{HBR0}$ through second layers within the AI model. The refiner 535 may obtain third audio signals $O_{LS2}$, $O_{RS2}$, $O_{LB2}$, $O_{RB2}$, $O_{HBL2}$, $O_{HBR2}$, $O_{L2}$, $O_{R2}$, $O_{HFL2}$, and $O_{HFR2}$ corresponding to the second channel group from the refined audio signals obtained through the AI model.

The AI model used to refine the audio signals of the side channel group and the audio signals of the main channel group is an AI model for reconstructing third audio signals corresponding to all of the channels of the second channel group from the first audio signals corresponding to the first channel group and the second audio signals corresponding to the side channel group, and may be an AI model trained to minimize an error of the reconstructed audio signal and the original audio signal.

The refiner 535 of FIG. 10A performs twice an operation of alternately refining the audio signals of the side channel group and the audio signals of the main channel group.

The refiner 535 may obtain, as a result of one refinement operation, the refined audio signals $O_{L1}$, $O_{R1}$, $O_{HFL1}$, and $O_{HFR1}$ of the main channel group and the refined audio signals $O_{LS1}$, $O_{RS1}$, $O_{LB1}$, $O_{RB1}$, $O_{HBL1}$, and $O_{HBR1}$ of the side channel group. The refiner 535 may obtain, as a result of two refinement operations, the refined audio signals $O_{L2}$, $O_{R2}$, $O_{HFL2}$, and $O_{HFR2}$ of the main channel group and the refined audio signals $O_{LS2}$, $O_{RS2}$, $O_{LB2}$, $O_{RB2}$, $O_{HBL2}$, and $O_{HBR2}$ of the side channel group.

Figure 10B:
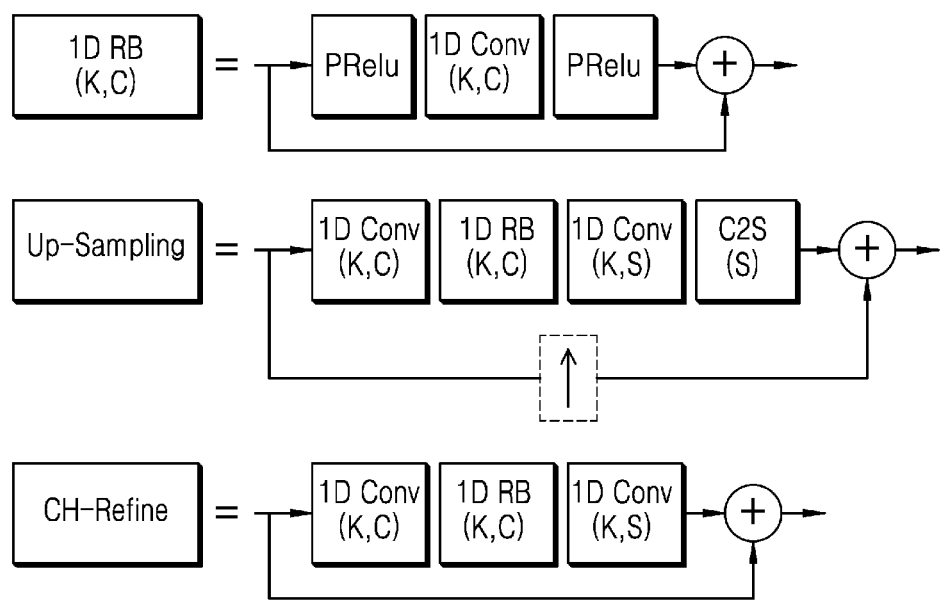
FIG. 10B is a block diagram for explaining respective operations of an upsampler and a refiner of an audio decoding apparatus, according to an embodiment of the disclosure.

FIG. 10B is a block diagram for explaining respective operations of an upsampler and a refiner of an audio decoding apparatus according to an embodiment of the disclosure.

FIG. 10B illustrates a block diagram of an AI model used by the upsampler 533 and the refiner 535 according to an embodiment. As shown in FIG. 10B, each module may include a plurality of convolution layers.

In FIG. 10B, 1DRB may refer to a 1D residual block, and 1DConv(K1, C1) may refer to a 1D convolution layer. K1 may refer to the number of kernels of the convolutional layer, and C1 may mean that an input to the convolutional layer is divided into C1 multichannels. Prelu may refer to an activation function.

The upsampler 533 according to an embodiment may upsample data for each channel included in the side channel information, by using an AI neural network. The AI model used by the upsampler 533 may correspond to an AI model used by the downsampler 423 of the audio encoding apparatus 400, and may be an AI model trained to increase audio signal reconstruction performance.

FIG. 10B is merely an example for explaining an operation of the upsampler 533 and the refiner 535. Embodiments of the disclosure are not limited to the example of FIG. 10B. The AI model used by the audio decoding apparatus 500 according to an embodiment may be autonomously determined and expanded through learning. The AI model used by the audio decoding apparatus 500 may be configured and trained in various ways in order to improve audio signal reconstruction performance The upsampler 533 may perform upsampling by calculating a weight for each channel included in the side channel information and applying the weight to the data for each channel included in the side channel information. The upsampler 533 may determine whether audio reconstruction performance in the decoding terminal is improved by applying the weights, and train a result of the determination. The upsampler 533 may derive a weight capable of increasing an audio reconstruction rate, by using a trained AI model.

Figure 10C:
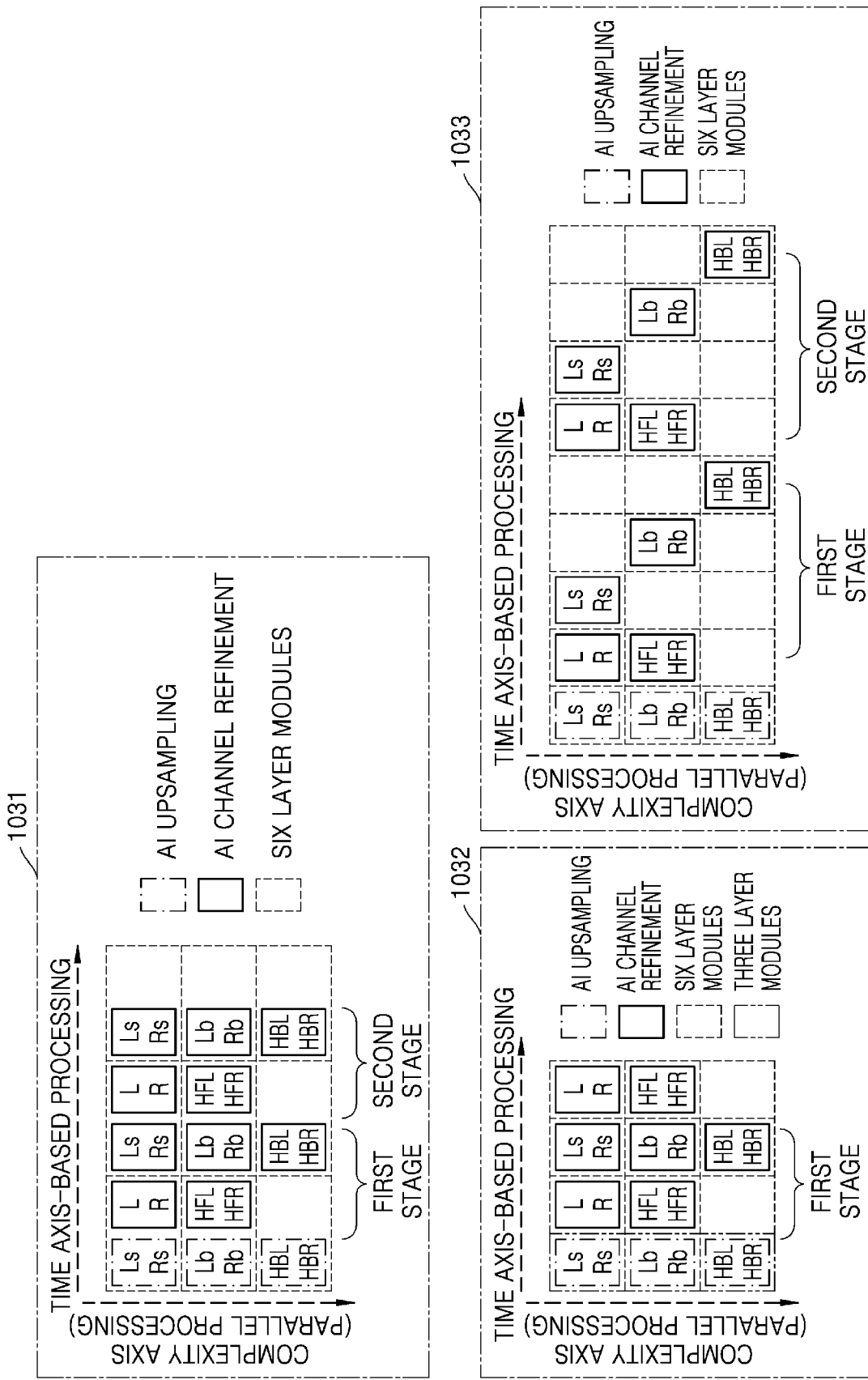
FIG. 10C is a block diagram for explaining an operation of a refiner of an audio decoding apparatus, according to an embodiment of the disclosure.

FIG. 10C is a block diagram for explaining an operation of a refiner of an audio decoding apparatus according to an embodiment of the disclosure.

FIG. 10A illustrates a case where the audio decoding apparatus according to an embodiment performs twice an operation of alternately refining the audio signals of the side channel group and the audio signals of the main channel group.

Referring to a graph 1031, the audio decoding apparatus 500 according to an embodiment may initially reconstruct, as the audio signals of the side channel group, the audio signals of the Ls channel, the Rs channel, the Lb channel, the Rb channel, the HBL channel, and the HBR channel from among the channels of the 7.1.4 channel group, through upsampling of the side channel information. The audio decoding apparatus 500 may obtain the refined audio signals of the main channel group (i.e., the L channel, the R channel, the HFL channel, and the HFR channel) and the refined audio signals of the side channel group, through a first stage of the refinement operation. The audio decoding apparatus 500 may obtain secondarily refined audio signals of the main channel group and secondarily refined audio signals of the side channel group, through a second stage of the refinement operation.

However, embodiments of the disclosure are not limited thereto. According to calculation environments and latency conditions, the stages and structure of the alternative reconstruction operation of the audio decoding apparatus 500 may vary.

The audio decoding apparatus 500 according to an embodiment may perform the alternative reconstruction operation only once.

Referring to a graph 1032, the audio decoding apparatus 500 according to an embodiment may initially reconstruct, as the audio signals of the side channel group, the audio signals of the Ls channel, the Rs channel, the Lb channel, the Rb channel, the HBL channel, and the HBR channel from among the channels of the 7.1.4 channel group, through upsampling of the side channel information. The audio decoding apparatus 500 may obtain the refined audio signals of the main channel group (i.e., the L channel, the R channel, the HFL channel, and the HFR channel) and the refined audio signals of the side channel group, through the first stage of the refinement operation.

The audio decoding apparatus 500 according to an embodiment may perform an alternative refinement operation on the audio signals of the side channels within the side channel group.

Referring to a graph 1033, the audio decoding apparatus 500 according to an embodiment may initially reconstruct, as the audio signals of the side channel group, the audio signals of the Ls channel, the Rs channel, the Lb channel, the Rb channel, the HBL channel, and the HBR channel from among the channels of the 7.1.4 channel group, through upsampling of the side channel information.

In the first stage of the refinement operation, first, the audio decoding apparatus 500 may obtain the refined audio signals of the main channel group (i.e., the L channel, the R channel, the HFL channel, and the HFR channel), based on initial audio signals of the side channel group. Next, the audio decoding apparatus 500 may obtain refined audio signals of the Ls channel and the Rs channel of the side channel group, based on the initial audio signals of the side channel group and the refined audio signals of the main channel group. Next, the audio decoding apparatus 500 may obtain refined audio signals of the Lb channel and the Rb channel of the side channel group, based on the initial audio signals of the side channel group, the refined audio signals of the main channel group, and the refined audio signals of the Ls channel and the Rs channel of the side channel group. Next, the audio decoding apparatus 500 may obtain refined audio signals of the HBL channel and the HBR channel of the side channel group, based on the initial audio signals of the side channel group, the refined audio signals of the main channel group, and the refined audio signals of the Ls channel, the Rs channel, the Lb channel, and the Rb channel of the side channel group.

In the second stage of the refinement operation, the audio decoding apparatus 500 may obtain secondarily refined audio signals of the main channel group (i.e., the L channel, the R channel, the HFL channel, and the HFR channel), based on the refined audio signals of the main channel group and the refined audio signals of the side channel group. Next, the audio decoding apparatus 500 may obtain secondarily refined audio signals of the Ls channel and the Rs channel of the side channel group, based on the refined audio signals of the side channel group and the secondarily refined audio signals of the main channel group. Next, the audio decoding apparatus 500 may obtain secondarily refined audio signals of the Lb channel and the Rb channel of the side channel group, based on the refined audio signals of the side channel group, the secondarily refined audio signals of the main channel group, and the secondarily refined audio signals of the Ls channel and the Rs channel of the side channel group. Next, the audio decoding apparatus 500 may obtain secondarily refined audio signals of the HBL channel and the HBR channel of the side channel group, based on the refined audio signals of the side channel group, the refined audio signals of the main channel group, and the secondarily refined audio signals of the Ls channel, the Rs channel, the Lb channel, and the Rb channel of the side channel group.

A method, performed by the audio encoding apparatus 400 according to an embodiment, of processing an audio signal will now be described with reference to a flowchart of FIG. 11. Each operation shown in FIG. 11 may be performed by at least one component included in the audio encoding apparatus 400, and a redundant description thereof will be omitted.

Figure 11:
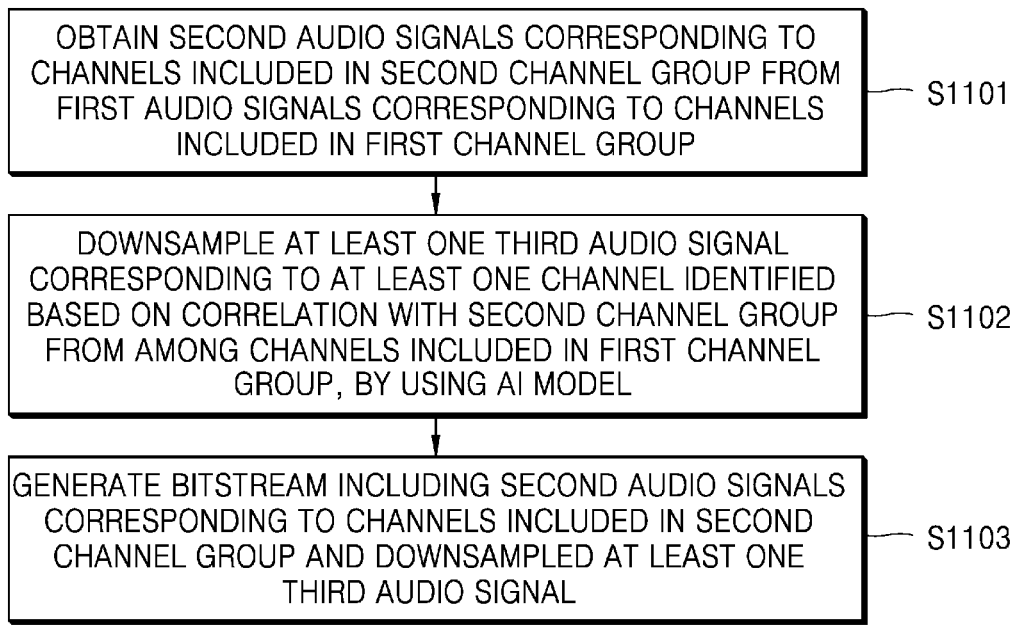
FIG. 11 is a flowchart of an audio signal encoding method performed by an audio encoding apparatus, according to an embodiment of the disclosure.

FIG. 11 is a flowchart of an audio signal encoding method performed by the audio encoding apparatus 400, according to an embodiment of the disclosure.

In operation S1101, the audio encoding apparatus 400 according to an embodiment may obtain the second audio signals corresponding to the channels included in the second channel group from the first audio signals corresponding to the channels included in the first channel group. The audio encoding apparatus 400 may obtain the second audio signals corresponding to the second channel group by downmixing the first audio signals corresponding to the first channel group. For example, the first channel group may include a channel group of the original audio signal, and the second channel group may be constructed by combining at least two channels from among the channels included in the first channel group.

The audio encoding apparatus 400 according to an embodiment may allocate weight values to the channels included in the first channel group, based on a correlation of each of the channels included in the first channel group with the second channel group. The audio encoding apparatus 400 may obtain the second audio signals from the first audio signals by computing a weighted sum of least two first audio signals from among the first audio signals, based on the weight values allocated to the channels included in the first channel group.

The audio encoding apparatus 400 according to an embodiment may downmix a first audio signal including a listener-centered multichannel audio signal to a second audio signal including a listener front-centered multichannel audio signal. The audio encoding apparatus 400 may transform the first audio signal of the first channel group to the second audio signal of the second channel group, based on a pre-determined channel group transformation rule. The audio encoding apparatus 400 may obtain the audio signal of one channel of the second channel group, by mixing the audio signals of at least two channels of the first channel group.

For example, the audio encoding apparatus 400 may obtain the second audio signal of the 3.1.2 channel group composed of six channels, by downmixing the first audio signal of the 7.1.4 channel group composed of twelve channels.

The 7.1.4 channel group may include an L (Left) channel, a C (Center) channel, a R(Right) channel, an Ls (Side Left) channel, a Rs (Side Right) channel, a Lb (Back Left) channel, an Rb (Back Right) channel, an LFE (Sub-woofer) channel, an HFL (Height Front Left) channel, an HFR (Height Front Right) channel, an HBL (Height Back Left) channel, and an HBR (Height Back Right) channel. The 3.1.2 channel group may include an L3 (Left) channel, a C (Center) channel, a R3 (Right) channel, an LFE channel, an HFL3 (Height Front Left) channel, and an HFR3 (Height Front Right) channel.

For example, the audio encoding apparatus 400 may obtain the audio signal of the left channel L3 of the 3.1.2 channel group by mixing the audio signal of the front left channel L, the audio signal of the left channel Ls, and the audio signal of the back left channel Lb from among the channels included in the 7.1.4 channel group. The audio encoding apparatus 400 may obtain the audio signal of the right channel R3 of the 3.1.2 channel group by mixing the audio signal of the front right channel R, the audio signal of the right channel Rs, and the audio signal of the back right channel Rb from among the channels included in the 7.1.4 channel group.

The audio encoding apparatus 400 may obtain the audio signal of the height front left channel HFL3 of the 3.1.2 channel group by mixing the audio signal of the left channel Ls, the audio signal of the back left channel Lb, the audio signal of the height front left channel HFL, and the audio signal of the height back left channel HBL from among the channels included in the 7.1.4 channel group. The audio encoding apparatus 400 may obtain the audio signal of the height front right channel HFR3 of the 3.1.2 channel group by mixing the audio signal of the right channel Rs, the audio signal of the back left channel Rb, the audio signal of the height front right channel HFR, and the audio signal of the height back right channel HBL from among the channels included in the 7.1.4 channel group. The audio encoding apparatus 400 may obtain the audio signal of the sub-woofer channel LFE and the audio signal of the center channel C of the 3.1.2 channel group by applying weights to the audio signal of the sub-woofer channel LFE and the audio signal of the center channel C from among the channels included in the 7.1.4 channel group.

In operation S1102, the audio encoding apparatus 400 according to an embodiment may downsample at least one third audio signal corresponding to at least one channel identified based on a correlation with the second channel group from among the channels included in the first channel group, by using the AI model. The audio encoding apparatus 400 may obtain the side channel information by downsampling the audio signal of the at least one side channel included in the first audio signals corresponding to the first channel group.

The audio encoding apparatus 400 according to an embodiment may identify the at least one side channel from among the channels included in the first channel group, based on correlations between the channels included in the first channel group and the channels included in the second channel group. Alternatively, the audio encoding apparatus 400 may identify, as a side channel, at least one channel of which a correlation with the second channel group is less than a preset value, from among the channels included in the first channel group. The audio encoding apparatus 400 may identify, as a main channel, a channel other than the at least one side channel from among the channels included in the first channel group.

The audio encoding apparatus 400 according to an embodiment may obtain the second audio signal of the second channel group, by downmixing the first audio signal of the first channel group, based on the weight values allocated to the channels of the first channel group. The audio encoding apparatus 400 may identify the at least one side channel and the at least one main channel from the channels included in the first channel group, based on the weight values allocated to the channels of the first channel group.

The main channels from among the channels included in the first channel group may be referred to as channels of a first subgroup, and the side channels from among the channels included in the first channel group may be referred to as channels of a second subgroup. When obtaining the audio signal corresponding to one channel of the second channel group by computing a weighted sum of the audio signals corresponding to the at least two channels of the first channel group, the audio encoding apparatus 400 may identify as a main channel a channel having a maximum allocated weight value from among the at least two channels of the first channel group and identify as a side channel the other channel from among the at least two channels of the first channel group.

For example, when the first channel group is the 7.1.4 channel group and the second channel group is the 3.1.2 channel group, the audio encoding apparatus 400 may determine, as side channels, the Ls channel, the Rs channel, the Lb channel, the Rb channel, the HBL channel, and the HBR channel of the first channel group. The audio encoding apparatus 400 may determine, as main channels, the L channel, the R channel, the HFL channel, and the HFR channel, which are the remaining channels from among the channels of the first channel group.

The audio encoding apparatus 400 may encode and output only the audio signal of the at least one side channel, except for the audio signals of the main channels, from among the channels of the first channel group. At this time, the audio encoding apparatus 400 may downsample the audio signal of the at least one side channel in order to increase transmission efficiency.

The audio encoding apparatus 400 according to an embodiment may extract the first audio sample group and the second audio sample group from the audio signal of the at least one side channel. The audio encoding apparatus 400 may downsample the audio signal of the at least one side channel by obtaining a weight sum of the first audio sample group and the second audio sample group.

For example, the audio encoding apparatus 400 may downsample the audio signal of the at least one side channel by applying a uniform weight value for each audio sample included in the first audio sample group and the second audio sample group and the audio sample group and for each audio sample group.

As another example, the audio encoding apparatus 400 may downsample the audio signal of the at least one side channel by applying different weight values for each audio sample included in the first audio sample group and the second audio sample group and the audio sample group and for each audio sample group.

The audio encoding apparatus 400 according to an embodiment may obtain downsampling-related information with respect to the first audio sample group and the second audio sample group, by using the AI model. The audio encoding apparatus 400 may downsample the at least one third audio signal by applying the downsampling-related information to the first audio sample group and the second audio sample group. In this case, the AI model may be an AI model trained to obtain the downsampling-related information minimizing an error between reconstructed audio signals reconstructed based on the second audio signals and the downsampled at least one third audio signal and the original audio signals.

For example, the audio encoding apparatus 400 may obtain weight values that are respectively to be applied to the first audio sample group and the second audio sample group, by using the AI model. The AI model may be an AI model trained to obtain weight values that minimize an error between reconstructed audio signals of all of the channels of the first channel group that are to be reconstructed based on the second audio signal and the side channel information, and the first audio signal.

In operation S1103, the audio encoding apparatus 400 according to an embodiment may generate a bitstream including the second audio signals corresponding to the channels included in the second channel group and the downsampled at least one third audio signal. The audio encoding apparatus 400 may generate a bitstream by encoding the second audio signals and the downsampled at least one third audio signal.

The audio encoding apparatus 400 according to an embodiment may obtain the audio signals of the base channel group and the audio signals of the dependent channel group by mixing the second audio signal. The audio encoding apparatus 400 may obtain the first compressed signal by compressing the audio signals of the base channel group, obtain the second compressed signal by compressing the audio signals of the dependent channel group, and obtain the third compressed signal by compressing the side channel information. The audio encoding apparatus 400 may generate a bitstream including the first compressed signal, the second compressed signal, and the third compressed signal.

For example, the base channel group may include a left channel and a right channel that constitute a stereo channel. The dependent channel group may include channels other than two channels corresponding to the base channel group, from among the channels included in the second channel group.

The audio encoding apparatus 400 according to an embodiment may obtain the additional information, which is information used to decode the multichannel audio signal, based on the audio signal of the base channel and the audio signal of the dependent channel, in the decoding terminal.

For example, the audio encoding apparatus 400 may decode the first compressed signal, the second compressed signal and the third compressed signal, and may obtain the reconstructed audio signal corresponding to the first channel group from decoded signals. The audio encoding apparatus 400 may obtain additional information by comparing the reconstructed audio signal with the first audio signal. The audio encoding apparatus 400 may obtain, as the additional information, a scale factor that may be applied to the audio signal of a channel included in the reconstructed audio signal so that an error between the reconstructed audio signal and the first audio signal is minimum.

The audio encoding apparatus 400 may generate a bitstream further including the additional information in addition to the first compressed signal, the second compressed signal, and the third compressed signal.

A method, performed by the audio decoding apparatus 500 according to an embodiment, of reconstructing an audio signal from a received bitstream will now be described with reference to a flowchart of FIG. 12. Each operation shown in FIG. 12 may be performed by at least one component included in the audio decoding apparatus 500, and a redundant description thereof will be omitted.

Figure 12:
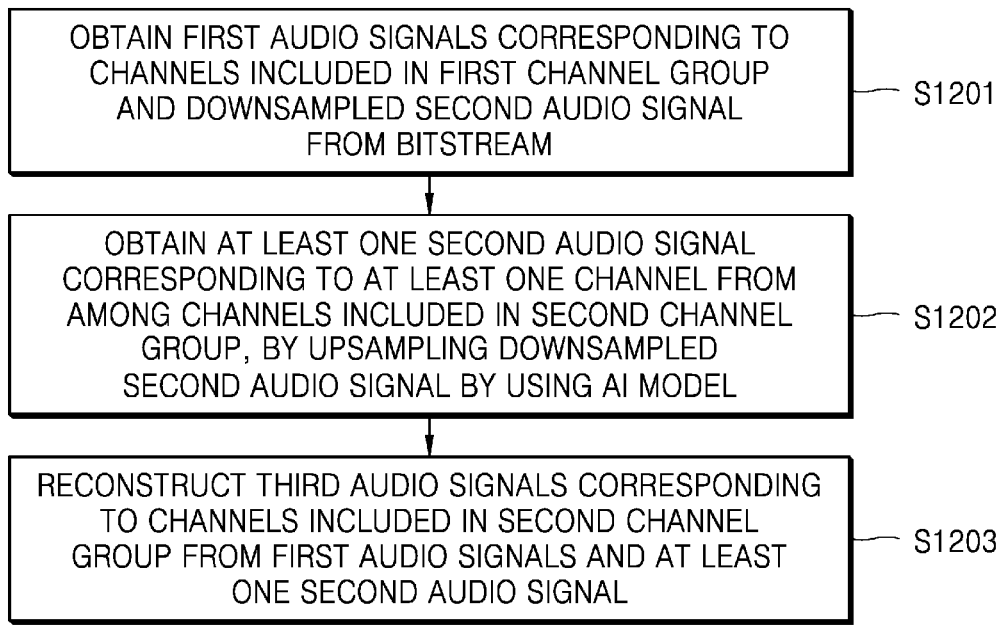
FIG. 12 is a flowchart of an audio signal decoding method performed by an audio decoding apparatus, according to an embodiment of the disclosure.

FIG. 12 is a flowchart of an audio signal decoding method performed by the audio decoding apparatus 500, according to an embodiment of the disclosure.

In operation S1201, the audio decoding apparatus 500 according to an embodiment may obtain the first audio signals corresponding to the channels included in the first channel group and the downsampled second audio signal by decoding the bitstream. The audio decoding apparatus 500 may obtain the side channel information including the first audio signals corresponding to the first channel group and the downsampled second audio signal.

The audio decoding apparatus 500 according to an embodiment may obtain the audio signals of the base channel group and the audio signals of dependent channels by decompressing the bitstream. The audio decoding apparatus 500 may obtain the first audio signals corresponding to the first channel group, based on the additional information, the audio signals of the base channel group, and the audio signals of the dependent channels included in the bitstream.

According to an embodiment, the base channel group may include a left channel and a right channel that constitute a stereo channel, and the dependent channel group may include channels other than the two left and right channels corresponding to the base channel group from among the channels included in the first channel group.

The audio decoding apparatus 500 according to an embodiment may obtain mixed audio signals corresponding to the first channel group by mixing the audio signals of the base channel group and the audio signals of the dependent channels. The audio decoding apparatus 500 may obtain the first audio signals corresponding to the first channel group by rendering the mixed audio signals based on the additional information.

According to an embodiment, the first audio signals corresponding to the first channel group may include the listener front-centered multichannel audio signal. For example, the first channel group may include the 3.1.2 channel including the L3 channel, the C channel, the R3 channel, the LFE channel, the HFL3 channel, and the HFR3 channel.

In operation S1202, the audio decoding apparatus 500 according to an embodiment may obtain the at least one second audio signal corresponding to the at least one channel from among the channels included in the second channel group, by upsampling the downsampled second audio signal by using the AI model. The audio decoding apparatus 500 may obtain the audio signal of the at least one side channel included in the second channel group by upsampling the side channel information. The first channel group may be a lower channel group including a smaller number of channels than the second channel group.

The audio decoding apparatus 500 according to an embodiment may obtain the audio signal of the at least one side channel by upsampling the downsampled second audio signal included in the side channel information, by using the AI model.

According to an embodiment, the AI model is an AI model for reconstructing the audio signals of all of the channels of the second channel group from the first audio signals corresponding to the first channel group and the second audio signal of the at least one side channel from among the channels included in the second channel group, and may be an AI model trained to minimize an error between the reconstructed audio signal and the original audio signal.

The channels included in the second channel group may be classified into the channels of the first subgroup having a relatively high correlation with the first channel group and the channels of the second subgroup having a relatively low correlation with the first channel group, based on a correlation of each of the channels included in the second channel group with the first channel group. The channels of the first subgroup may be referred to as main channels, and the channels of the second subgroup may be referred to as side channels.

The audio decoding apparatus 500 according to an embodiment may obtain the audio signal of the at least one main channel included in the first channel group from the first audio signals corresponding to the first channel group and the audio signal of the at least one side channel, according to a rule of a channel group transformation between the first channel group and the second channel group.

The audio decoding apparatus 500 according to an embodiment may refine the audio signal of the at least one side channel and the audio signal of the at least one main channel by using the AI model. The audio decoding apparatus 500 may obtain the third audio signals corresponding to the second channel group, based on the refined audio signal of the side channel and the refined audio signal of the main channel.

According to an embodiment, the third audio signals corresponding to the second channel group may include the listener-centered multichannel audio signal. For example, the second channel group may include the 7.1.4 channel including the L (Left) channel, the C (Center) channel, the R(Right) channel, the Ls (Side Left) channel, the Rs (Side Right) channel, the Lb (Back Left) channel, the Rb (Back Right) channel, the LFE (Sub-woofer) channel, the HFL (Height Front Left) channel, the HFR (Height Front Right) channel, the HBL (Height Back Left) channel, and the HBR (Height Back Right) channel. In this case, the audio signal of the at least one side channel may include the audio signals of the Ls channel, the Rs channel, the Lb channel, the Rb channel, the HBL channel, and the HBR channel of the second channel group.

The audio decoding apparatus 500 according to an embodiment may obtain fourth audio signals corresponding to the main channels from the first audio signals and the second audio signals corresponding to the second channels, according to a transformation rule from the channels included in the second channel group to the channels included in the first channel group. The audio decoding apparatus 500 may refine the second audio signals and the fourth audio signals by using the AI model. The audio decoding apparatus 500 may obtain the third audio signals corresponding to all of the channels included in the second channel group, from the refined second audio signals and the refined fourth audio signals.

For example, the fourth audio signals may be refined through the first layers within the AI model, and the second audio signals may be refined through the second layers within the AI model. The refined fourth audio signals may be obtained by inputting the first audio signals, the second audio signals, and the fourth audio signals to the first layers. The refined second audio signals may be obtained by inputting the first audio signals, the second audio signals, the refined fourth audio signals, and values output by the first layers to the second layers.

In operation S1203, the audio decoding apparatus 500 according to an embodiment may reconstruct the third audio signals corresponding to the second channel group, based on the first audio signals corresponding to the first channel group and the second audio signal of the at least one side channel.

As described above, when transforming a channel group so that a sound image is implemented around the screen, the audio encoding apparatus 400 according to an embodiment may determine, as a side channel, a channel that is not used or has least-used related information from among the channels of the second channel group. However, embodiments of the disclosure are not limited thereto. The audio encoding apparatus 400 according to an embodiment may further include a sound image characteristic analysis module to change the type of side channel and the number of side channels according to a change in sound image characteristics of an input audio signal over time.

Figure 13:
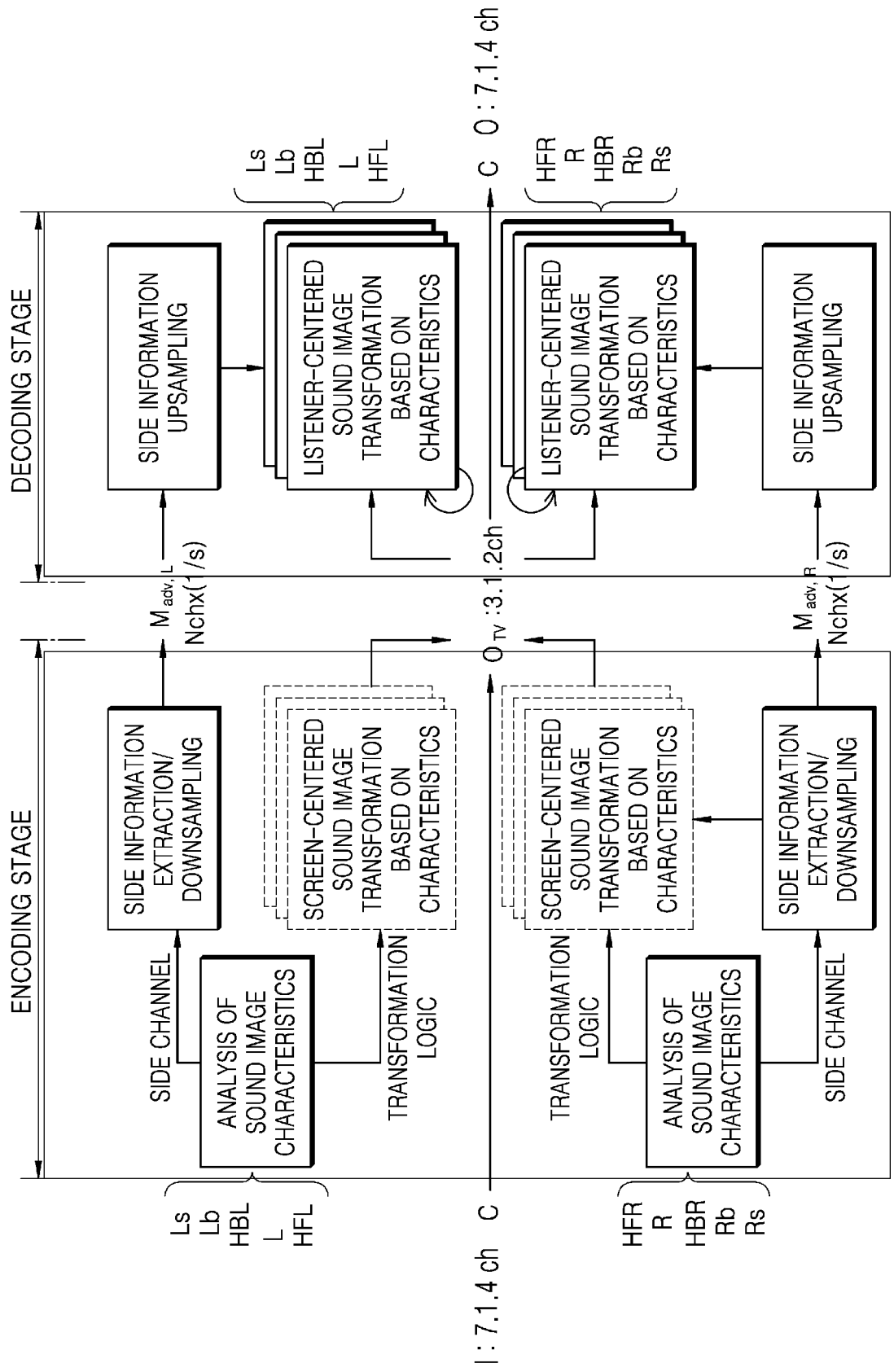
FIG. 13 illustrates an example of transformation between channel groups that is performed based on a sound image characteristic analysis in an audio processing system, according to an embodiment of the disclosure.

FIG. 13 illustrates an example of transformation between channel groups that is performed based on a sound image characteristic analysis in an audio processing system according to an embodiment of the disclosure.

The audio encoding apparatus 400 according to an embodiment may receive an audio signal corresponding to the first channel group as the original audio signal. For example, as shown in FIG. 13, the audio encoding apparatus 400 may receive, as the original audio signal, an audio signal of the 7.1.4 channel including the Ls channel, the Lb channel, the HBL channel, the L channel, the HFL channel, the C channel, the LFE channel, the HFR channel, the R channel, the HBR channel, the Rb channel, and the Rs channel.

The audio encoding apparatus 400 according to an embodiment may analyze the sound image characteristics of an input original audio signal. The audio encoding apparatus 400 may transform the first channel group of the original audio signal into the second channel group in which a sound image is implemented around the screen of the display device, based on the sound image characteristics. For example, the audio encoding apparatus 400 may transform the original audio signal of the 7.1.4 channel group into the audio signal $O_{tv}$ of the 3.1.2 channel group. The audio encoding apparatus 400 may include the audio signal transformed into the second channel group in the bitstream and transmit the bitstream to the audio decoding apparatus 500.

The audio encoding apparatus 400 may determine the at least one side channel from the channels of the first channel group, based on the sound image characteristics.

The audio encoding apparatus 400 according to an embodiment may analyze sound source characteristics of the original audio signal in each time unit, by using the AI model. For example, the audio encoding apparatus 400 may analyze whether the original audio signal is a signal including conversation information of a plurality of speakers or a signal including information uttered by one speaker. Alternatively, the audio encoding apparatus 400 may analyze a sound source distribution feature in a horizontal direction or a vertical direction with respect to the listener.

Based on a result of the analysis, the audio encoding apparatus 400 may determine at least one side channel capable of maximizing audio reconstruction performance in the decoding terminal. The audio encoding apparatus 400 may downsample an audio signal of the at least one side channel along a time axis and transmit the downsampled audio signal to the audio decoding apparatus 500.

When the sound image characteristic of the original audio signal varies with time, the type and number of channels determined as side channels by the audio encoding apparatus 400 from among the channels of the first channel group may vary.

The audio encoding apparatus 400 may further include, in the bitstream, a signal $M_{adv}$ obtained by downsampling N channels determined as side channels from among the channels of the first channel group by a factor of 1/s, and may transmit the bitstream to the audio decoding apparatus 500 (where N is an integer greater than 1 and s is a rational number greater than 1).

The audio decoding apparatus 500 may reconstruct the audio signal of the at least one side channel by upsampling the audio signal $M_{adv}$ of the at least one side channel that has been downsampled and transmitted.

The audio decoding apparatus 500 may reconstruct the audio signal of the first channel group in which a sound image is implemented around a listener, from the audio signal $O_{tv}$ of the second channel group, by using the reconstructed audio signal of the at least one side channel. At this time, the audio decoding apparatus 500 may reconstruct the audio signal of the first channel group by reflecting the sound image characteristics.

Figure 14:
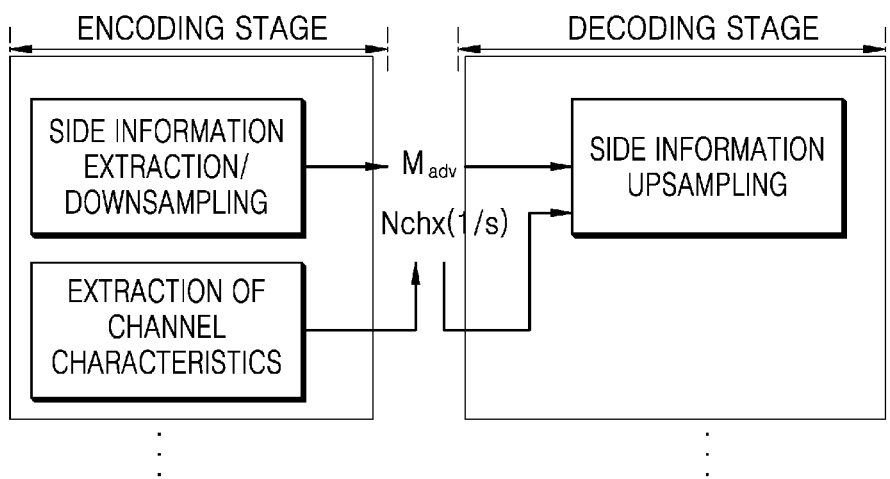
FIG. 14 illustrates an example in which an audio processing system according to an embodiment of the disclosure downsamples the audio signal of a side channel, based on the characteristics of a channel.

FIG. 14 illustrates an example in which an audio processing system according to an embodiment downsamples the audio signal of a side channel, based on the characteristics of a channel.

The audio encoding apparatus 400 according to an embodiment may perform downsampling on the audio signal of the at least one side channel, based on a pre-determined rule. When performing downsampling, based on the pre-determined rule, the audio encoding apparatus 400 may be advantageous for real-time processing without delay.

According to another embodiment, as shown in FIG. 14, the audio encoding apparatus 400 may extract the characteristics (for example, sparsity) of the side channel, and may downsample the audio signal of the side channel, based on the characteristics of the side channel.

As described above, the audio encoding apparatus 400 according to an embodiment may transform the first audio signal including the listener-centered multichannel audio signal into the second audio signal including the listener front-centered multichannel audio signal, and may transmit the second audio signal including the listener front-centered multichannel audio signal. The audio decoding apparatus 500 may reconstruct the screen-centered multichannel audio signal or the listener-centered multichannel audio signal according to a change in a content consumption environment. However, embodiments of the disclosure are not limited to an embodiment in which the original input audio signal includes the listener-centered multichannel audio signal and the transmitted bitstream includes the screen-centered multichannel audio signal.

Figure 15:
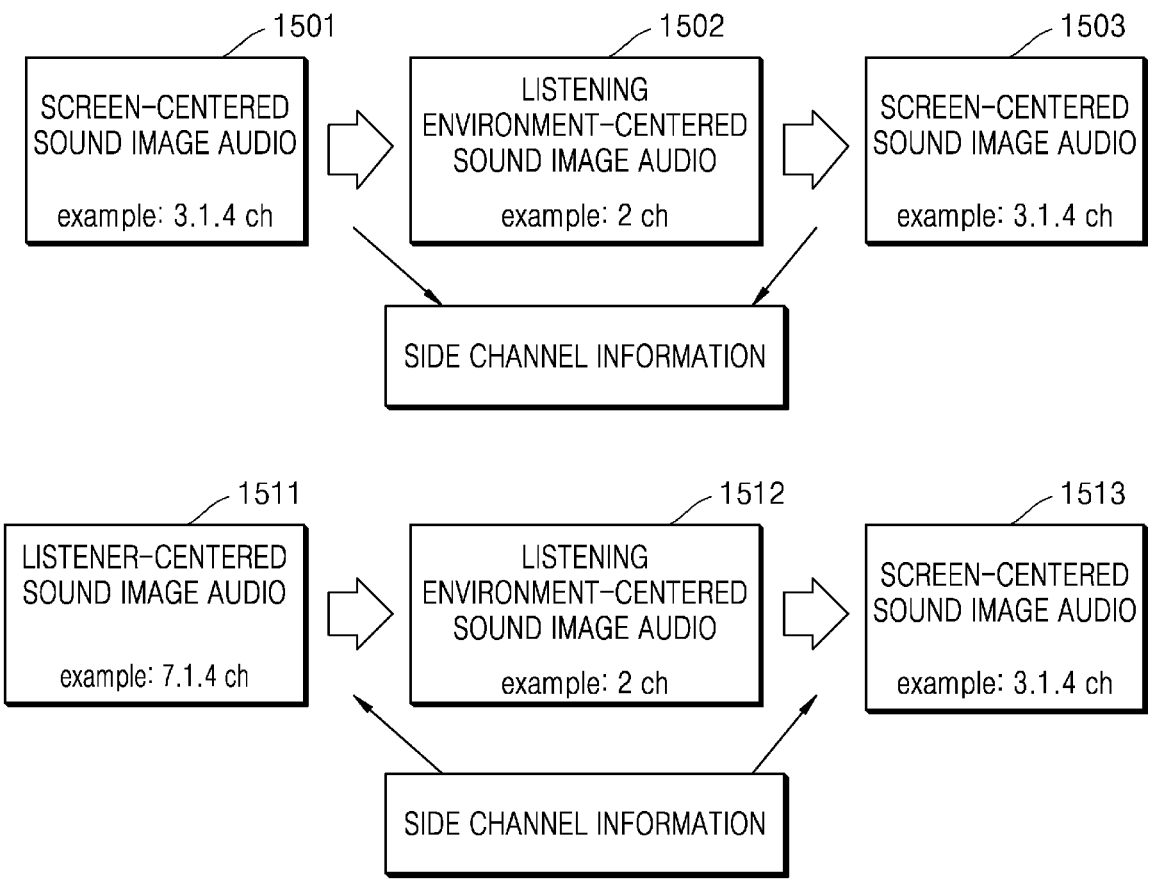
FIG. 15 illustrates embodiments applicable to an audio processing method according to an embodiment of the disclosure.

FIG. 15 illustrates embodiments applicable to an audio processing method according to an embodiment of the disclosure.

For example, when an input audio constitutes a screen-centered sound image, the audio encoding apparatus 400 may obtain an "intermediate result audio signal in which the sound image is transformed around a listening environment (e.g., a listening environment using a general 2-channel speaker or a listening environment using a 2-channel earphone)" from the input audio, and may extract side channel information having a least correlation with the intermediate result audio signal. The audio encoding apparatus 400 may compress and transmit the intermediate result audio signal and the side channel information. The audio decoding apparatus 500 may re-reconstruct "audio signals constituting a screen-centered sound image" from the intermediate result audio signal and the side channel information.

Referring to FIG. 15, the audio encoding apparatus 400 may transform an audio signal 1501 constituting a screen-centered sound image into an audio signal 1502 constituting a listening environment-centered sound image, and may transmit the audio signal 1502. At this time, the audio encoding apparatus 400 may also transmit the audio signal of a side channel least-correlated with the audio signal 1502. The audio decoding apparatus 500 may reconstruct the audio signal 1502 constituting a listening environment-centered sound image from the transmitted bitstream. The audio decoding apparatus 500 may also reconstruct the audio signal 1502 into an audio signal 1503 constituting a screen-centered sound image, by using the audio signal of the side channel.

As another example, when the input audio constitutes a listener-centered sound image, the audio encoding apparatus 400 may obtain an intermediate result audio signal according to a listening environment of a user through a device, and may extract side channel information having a least correlation with the intermediate result audio signal. The audio encoding apparatus 400 may compress and transmit the intermediate result audio signal and the side channel information. The audio decoding apparatus 500 may re-reconstruct "audio signals constituting a screen-centered sound image" from the intermediate result audio signal and the side channel information.

Referring to FIG. 15, the audio encoding apparatus 400 may transform an audio signal 1511 constituting a listener-centered sound image into an audio signal 1512 constituting a listening environment-centered sound image, and may transmit the audio signal 1512. For example, the audio signal 1512 constituting the listening environment-centered sound image may include the audio signals of the 2 channel layout. The audio signal 1512 constituting the listening environment-centered sound image may be an intermediate result audio signal in which a sound effect such as channel transformation is emphasized while maintaining the listener-centered sound image. The audio encoding apparatus 400 may also transmit the audio signal of the side channel least-correlated with the audio signal 1512 constituting the listening environment-centered sound image. The audio decoding apparatus 500 may reconstruct the audio signal 1512 constituting the listening environment-centered sound image from the transmitted bitstream. The audio decoding apparatus 500 may also reconstruct the audio signal 1512 constituting the listening environment-centered sound image into an audio signal 1513 constituting the screen-centered sound image, by using the audio signal of the side channel.

The machine-readable storage medium may be provided as a non-transitory storage medium. Here, a 'non-transitory storage medium' is a tangible device and only means that it does not contain a signal (e.g., electromagnetic waves). This term does not distinguish a case in which data is stored semi-permanently in a storage medium from a case in which data is temporarily stored. For example, the non-transitory storage medium may include a buffer in which data is temporarily stored.

According to an embodiment of the disclosure, methods according to various disclosed embodiments may be provided by being included in a computer program product. Computer program products are commodities and thus may be traded between sellers and buyers. Computer program products are distributed in the form of device-readable storage media (e.g., compact disc read only memory (CD-ROM)), or may be distributed (e.g., downloaded or uploaded) through an application store or between two user devices (e.g., smartphones) directly and online. In the case of online distribution, at least a portion of the computer program product (e.g., a downloadable app) may be stored at least temporarily in a device-readable storage medium, such as a memory of a manufacturer's server, a server of an application store, or a relay server, or may be temporarily generated.

What is claimed is:

1. An audio processing apparatus comprising:
a memory storing one or more instructions; and
a processor configured to execute the one or more instructions to
obtain from first audio signals corresponding to first channels included in a first channel group of an original audio signal, second audio signals corresponding to second channels included in a second channel group, the second channels being obtained by combining at least two channels of the first channels included in the first channel group,
downsample at least one third audio signal corresponding to at least one channel that is identified, from among the first channels included in the first channel group, based on a correlation between the at least one channel and the second channel group, by using an artificial intelligence (AI) model, and
generate a bitstream comprising the second audio signals corresponding to the second channels included in the second channel group and the downsampled at least one third audio signal.

2. The audio processing apparatus of claim 1, wherein the processor is further configured to identify the at least one channel of which the correlation with the second channel group is lower than a predetermined value, from among the first channels included in the first channel group.

3. The audio processing apparatus of claim 1, wherein the processor is further configured to:
allocate weight values to the first channels included in the first channel group, based on the correlation of each of the first channels included in the first channel group with the second channel group;
obtain the second audio signals from the first audio signals by computing a weighted sum of at least two first audio signals from among the first audio signals, based on the weight values allocated to the first channels included in the first channel group; and
identify the at least one channel from among the first channels included in the first channel group, based on the weight values allocated to the first channels included in the first channel group.

4. The audio processing apparatus of claim 3, wherein the processor is further configured to:
obtain an audio signal corresponding to one channel from among the second channels included in the second channel group, by summing audio signals corresponding to the at least two channels from among the first channels included in the first channel group, based on the weight values allocated to the at least two channels; and identify a channel having a maximum allocated weight value from among the at least two channels as a channel corresponding to a first subgroup of the first channel group, and identify a remaining channel from among the at least two channels as a channel corresponding to a second subgroup of the first channel group.

5. The audio processing apparatus of claim 1, wherein the processor is further configured to:

extract a first audio sample group and a second audio sample group from the at least one third audio signal;

obtain downsampling-related information with respect to the first audio sample group and the second audio sample group, by using the AI model; and downsample the at least one third audio signal by applying the downsampling-related information to the first audio sample group and the second audio sample group.

6. The audio processing apparatus of claim 5, wherein the AI model is trained to obtain the downsampling-related information by minimizing an error between reconstructed audio signals and the first audio signals, the reconstructed audio signals being reconstructed based on the second audio signals and the downsampled at least one third audio signal.

7. The audio processing apparatus of claim 1, wherein the processor is further configured to:

obtain audio signals of a base channel group and audio signals of a dependent channel group from the second audio signals corresponding to the second channels included in the second channel group;

obtain a first compressed signal by compressing the audio signals of the base channel group;

obtain a second compressed signal by compressing the audio signals of the dependent channel group;

obtain a third compressed signal by compressing the downsampled at least one third audio signal; and generate the bitstream comprising the first compressed signal, the second compressed signal, and the third compressed signal.

8. The audio processing apparatus of claim 7, wherein the base channel group comprises two channels for stereo reproduction, and the dependent channel group comprises channels other than two channels having relatively high correlations with the two channels for stereo reproduction, from among the second channels included in the second channel group.

9. The audio processing apparatus of claim 1, wherein the first audio signals corresponding to the first channels included in the first channel group comprise a listener-centered multichannel audio signal, and the second audio signals corresponding to the second channels included in the second channel group comprise a listener front-centered multichannel audio signal.

10. The audio processing apparatus of claim 1, wherein the first channel group comprises a 7.1.4 channel including a front left channel, a front right channel, a center channel, a left channel, a right channel, a back left channel, a back right channel, a subwoofer channel, a front left height channel, a front right height channel, a back left height channel, and a back right height channel, the second channel group comprises a 3.1.2 channel including a front left channel, a front right channel, a subwoofer channel, a front left height channel, and a front right height channel, and the processor is further configured to identify, as the second channels of the second subgroup, the left channel, the right channel, the back left channel, the back right channel, the back left height channel, and the back right height channel having relatively low correlations with the second channel group, from among the first channels included in the first channel group.

11. An audio processing method comprising:

performing audio signal format transformation on an original audio signal to convert the original audio signal into a converted audio signal by combining at least two channels of a plurality of channels included in the original audio signal;

identifying at least one side channel signal and a plurality of base channel signals of the original audio signal, based on a correlation of each of the plurality of channels of the original audio signal with the audio signal format transformation;

downsampling the at least one side channel signal, by using an artificial intelligence (AI) model; and generating a bitstream comprising the converted audio signal and the downsampled at least one side channel signal.

* * * * *